July 9, 1940.  R. S. SMITH  2,207,182
FLUID FLOW MECHANISM
Filed Oct. 15, 1934  29 Sheets-Sheet 1
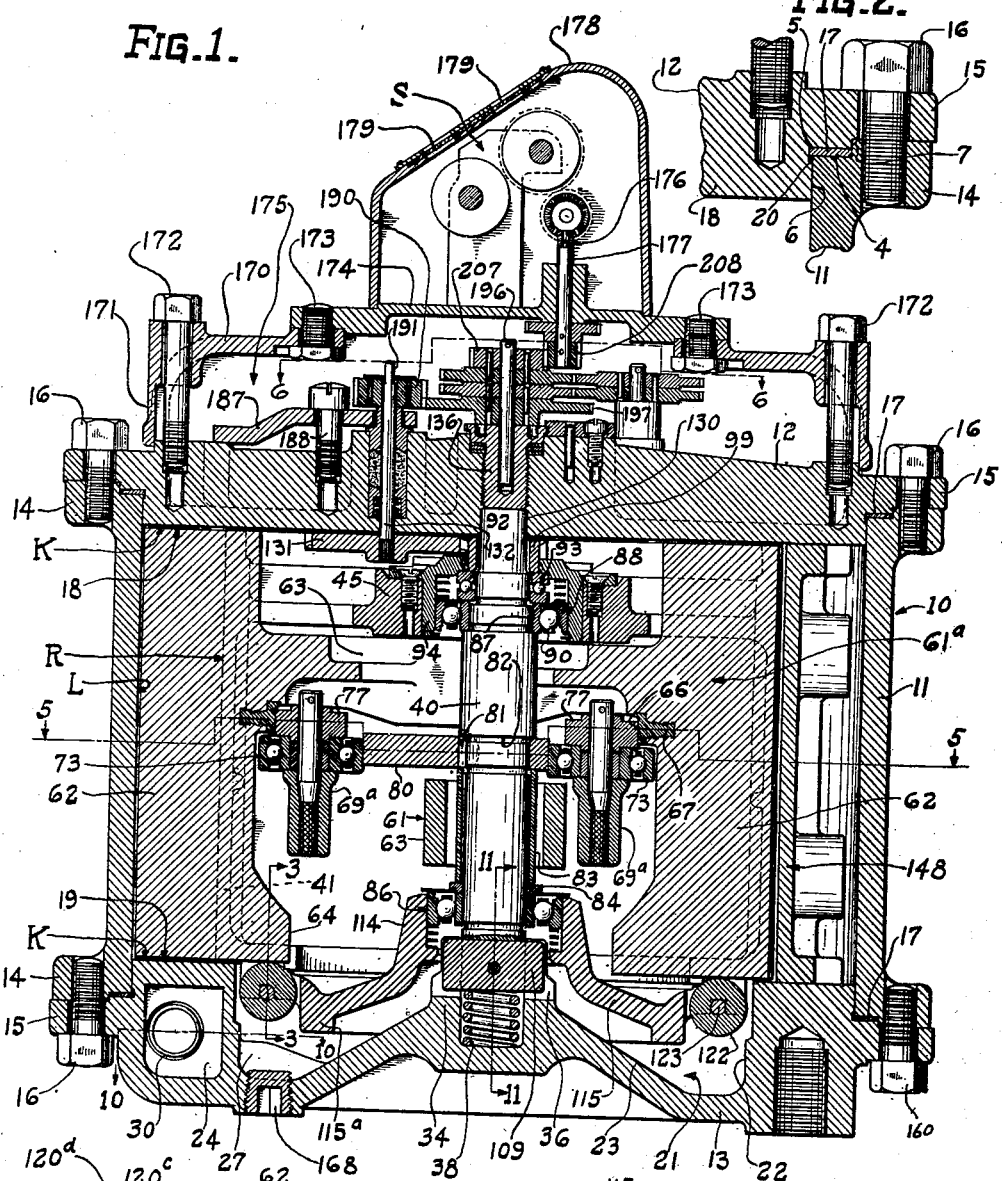
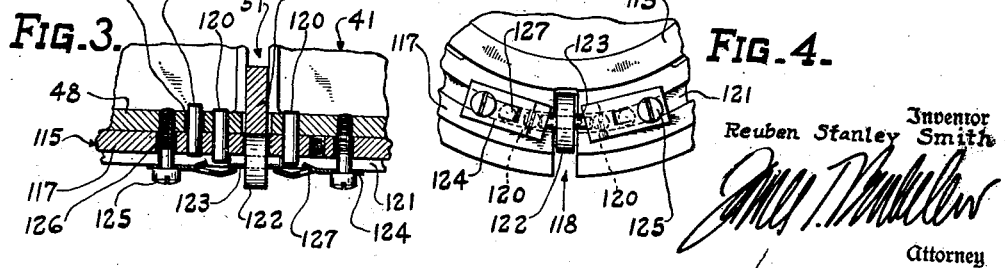
Inventor
Reuben Stanley Smith
Attorney

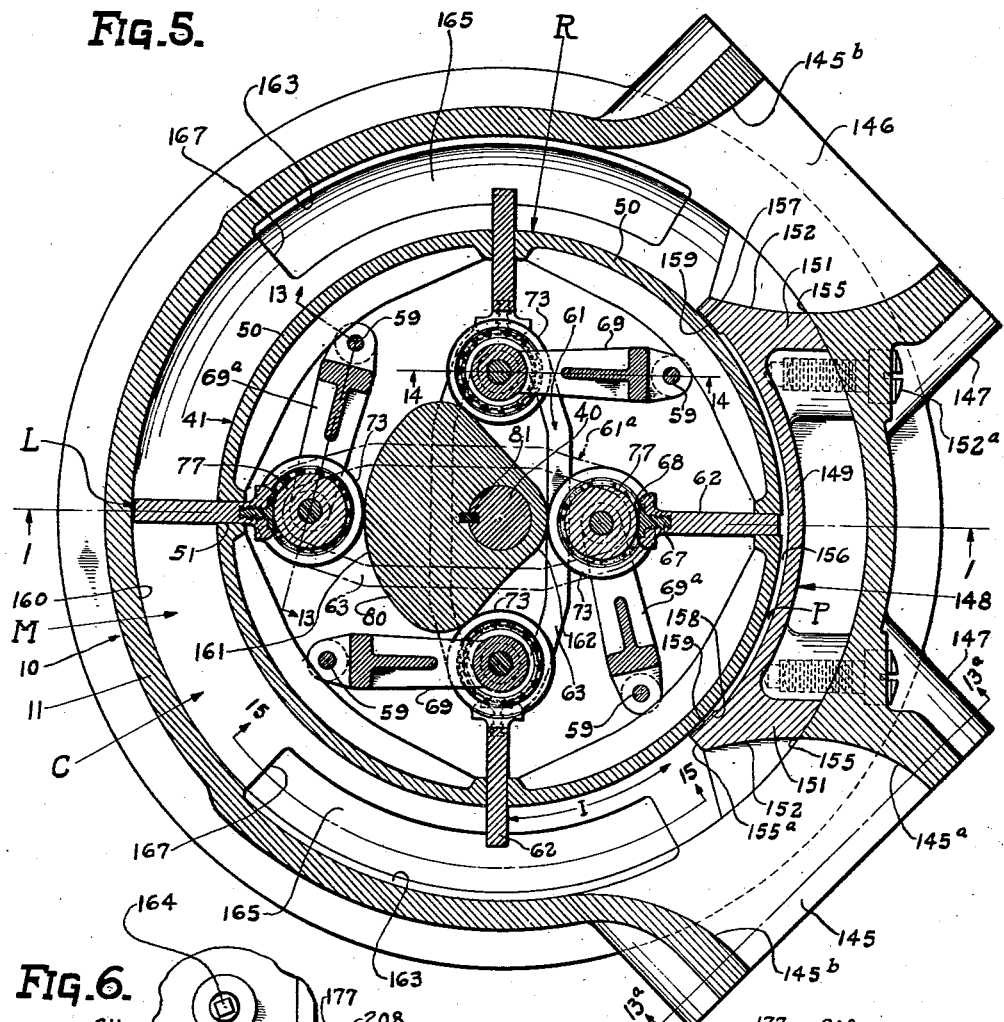
Fig.5.
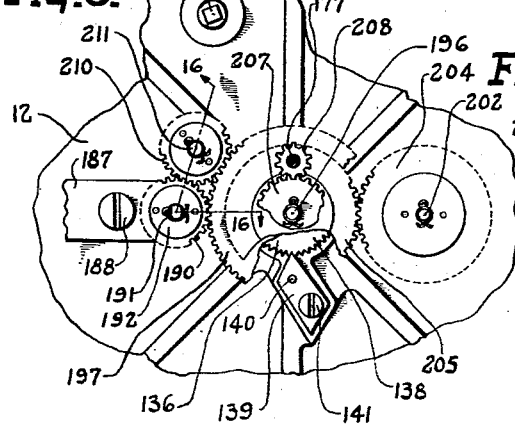
Fig.6.
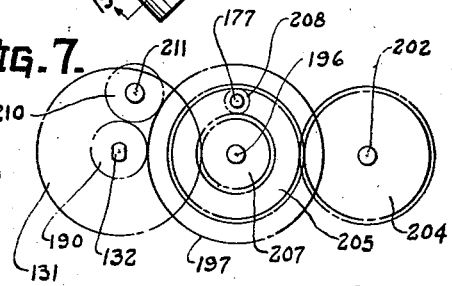
Fig.7.
Inventor
Reuben Stanley Smith
By
Attorney July 9, 1940.  R. S. SMITH  2,207,182
FLUID FLOW MECHANISM
Filed Oct. 15, 1934   29 Sheets—Sheet 3

Inventor
Reuben Stanley Smith
By
Attorney

July 9, 1940.                R. S. SMITH                2,207,182
                         FLUID FLOW MECHANISM
                         Filed Oct. 15, 1934          29 Sheets-Sheet 4
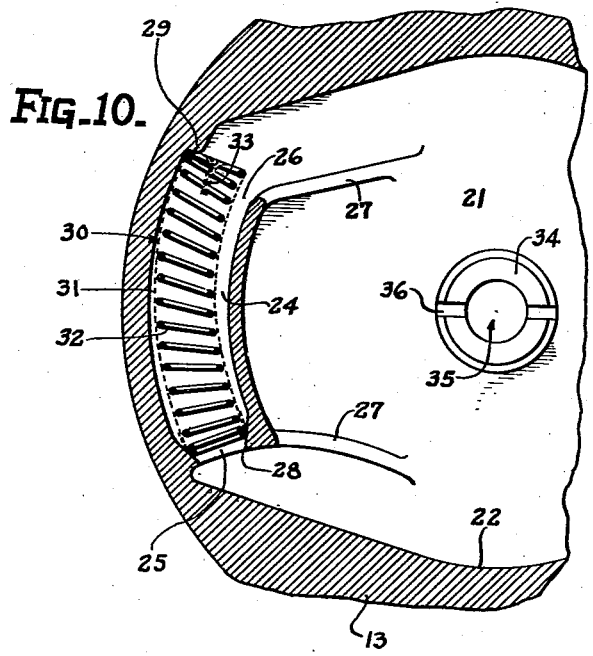
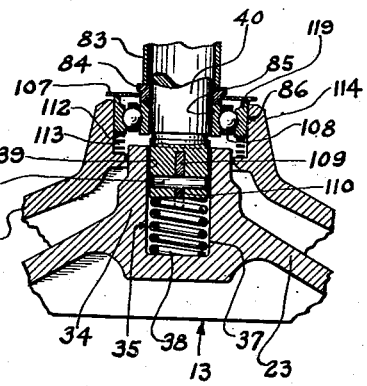
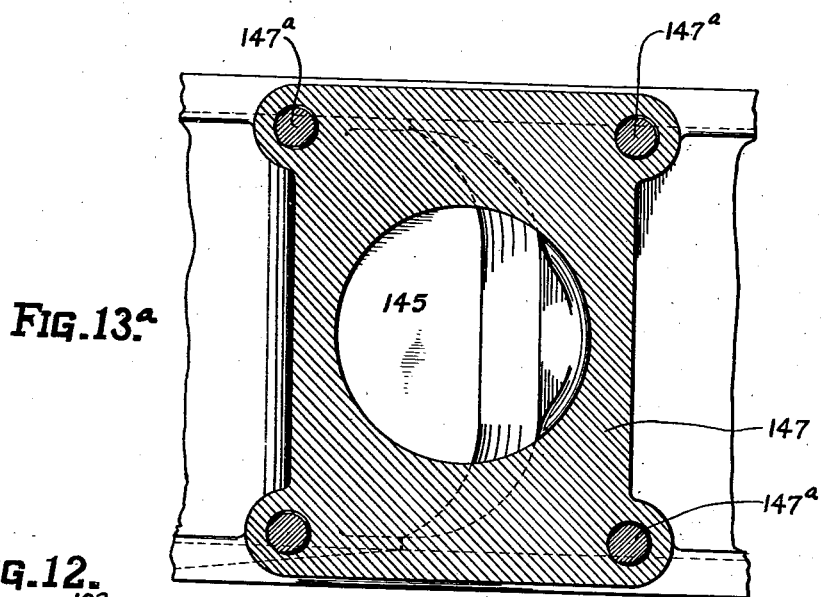
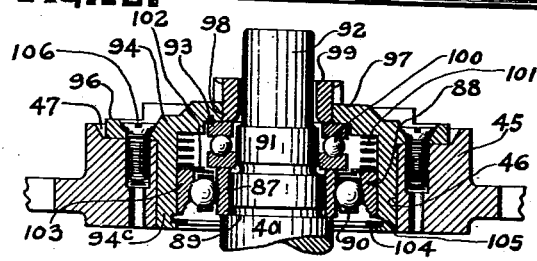
INVENTOR.
Reuben Stanley Smith
BY
ATTORNEY July 9, 1940.  R. S. SMITH  2,207,182
FLUID FLOW MECHANISM
Filed Oct. 15, 1934  29 Sheets-Sheet 5
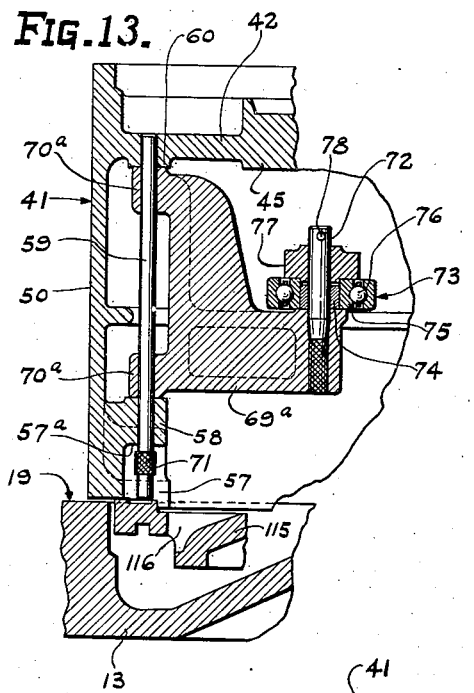
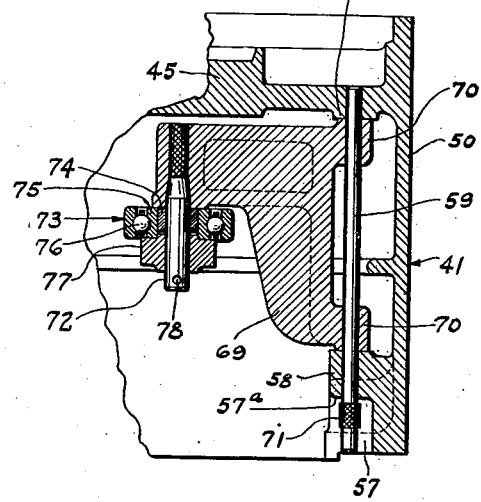
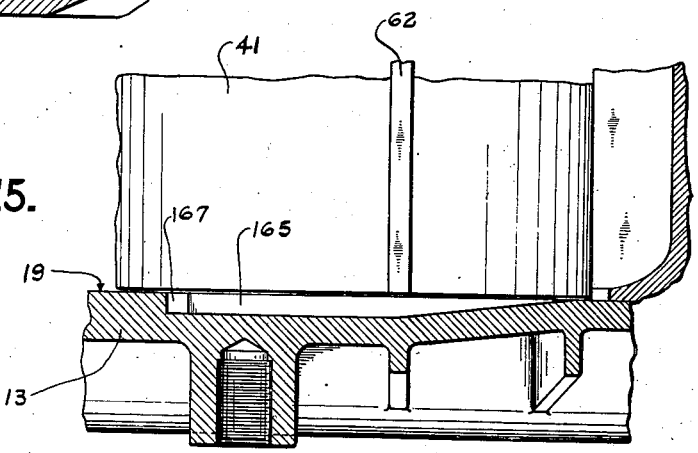
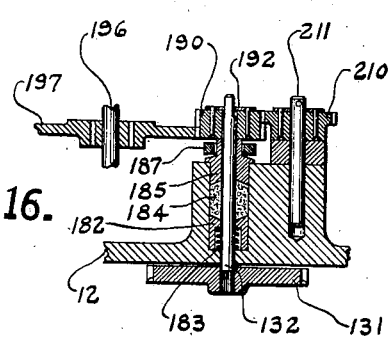
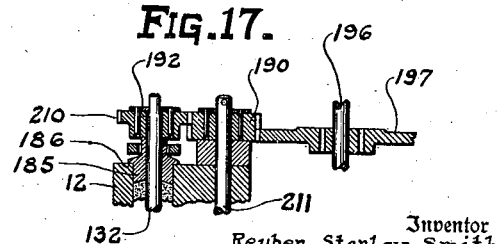
Inventor
Reuben Stanley Smith
By
Attorney July 9, 1940.  R. S. SMITH  2,207,182
FLUID FLOW MECHANISM
Filed Oct. 15, 1934    29 Sheets-Sheet 6
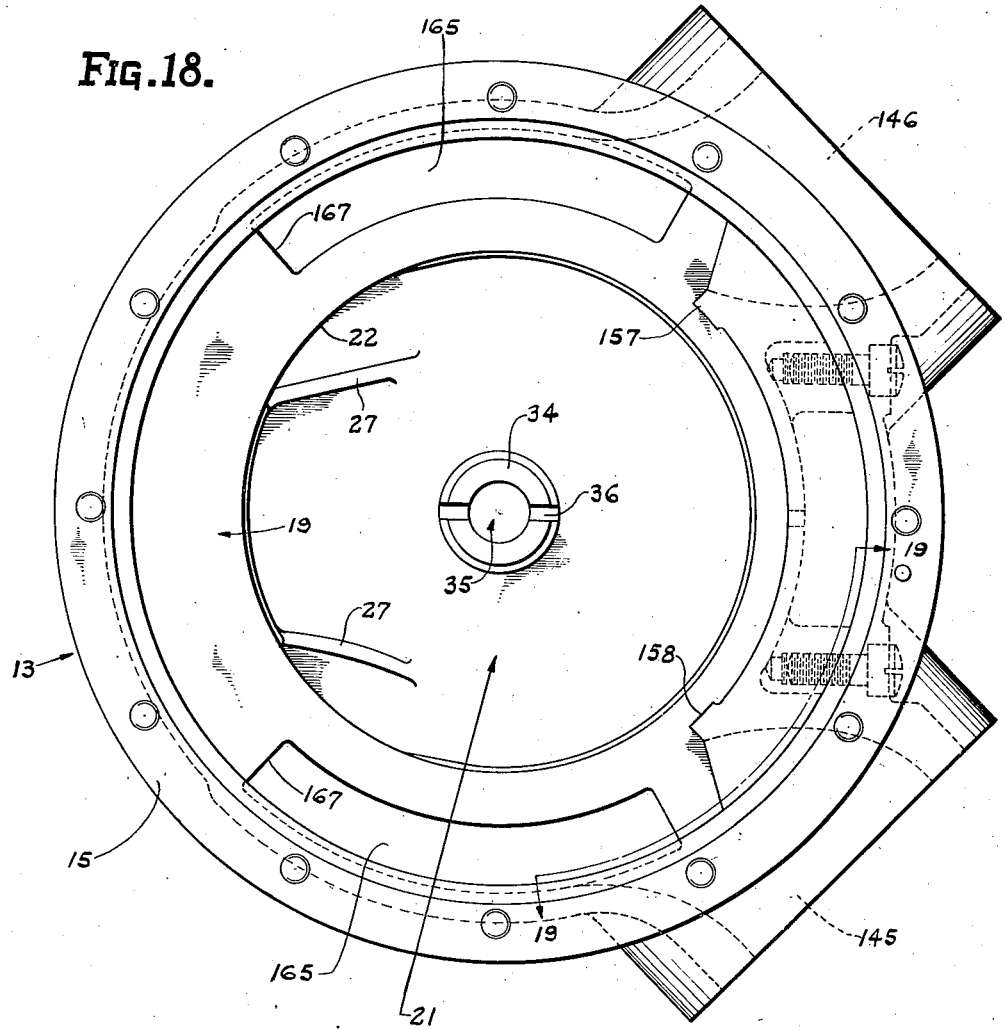
Fig.18.
INVENTOR.
Reuben Stanley Smith
BY 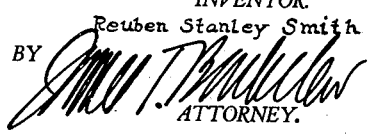
ATTORNEY.

July 9, 1940.   R. S. SMITH   2,207,182
FLUID FLOW MECHANISM
Filed Oct. 15, 1934   29 Sheets-Sheet 9
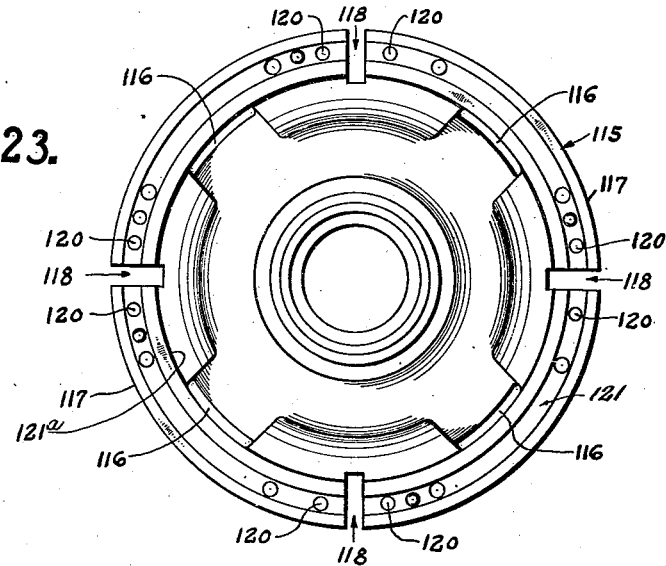
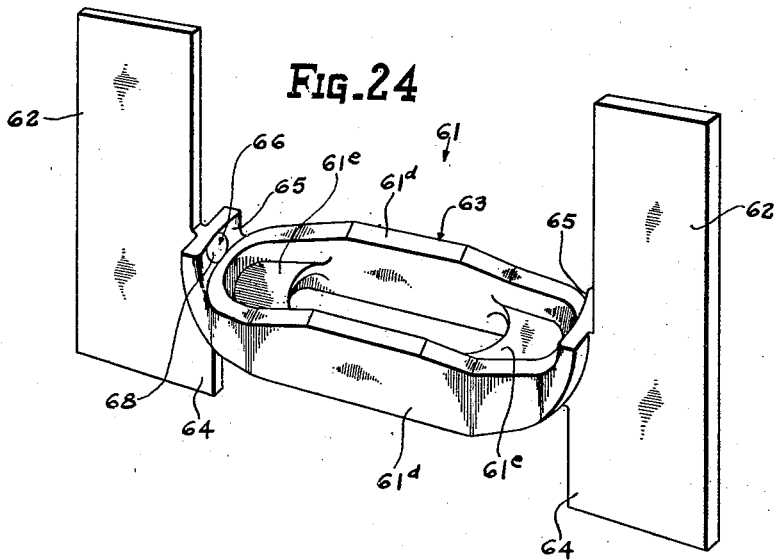
INVENTOR
Reuben Stanley Smith
BY
ATTORNEY July 9, 1940.   R. S. SMITH   2,207,182
FLUID FLOW MECHANISM
Filed Oct. 15, 1934   29 Sheets-Sheet 10

INVENTOR
Reuben Stanley Smith
BY
ATTORNEY

July 9, 1940.   R. S. SMITH   2,207,182
FLUID FLOW MECHANISM
Filed Oct. 15, 1934   29 Sheets-Sheet 11
Fig. 28.
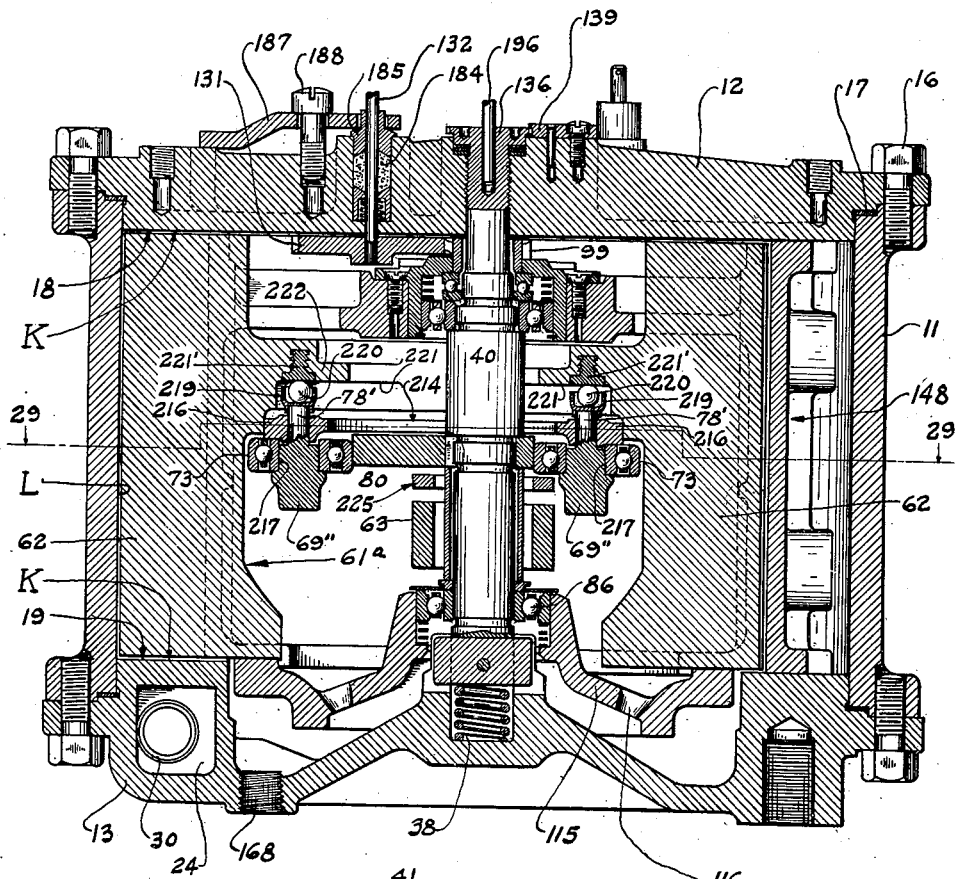
Fig. 27.
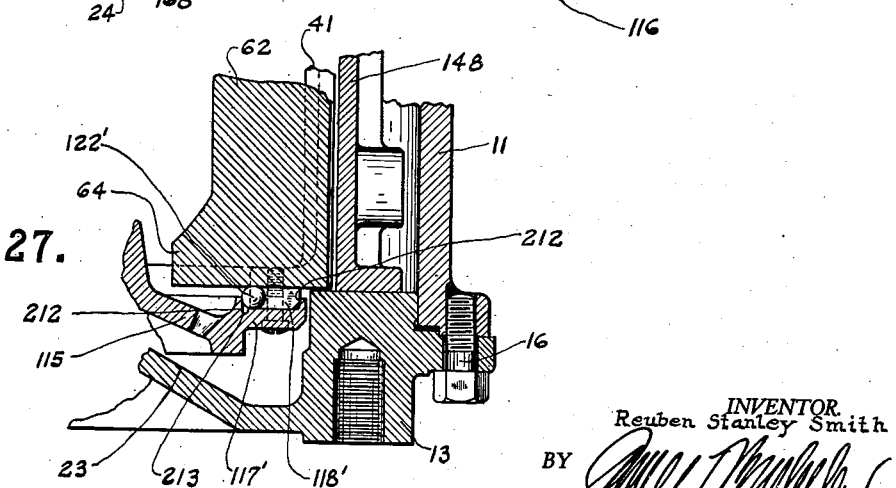
INVENTOR.
Reuben Stanley Smith
BY
ATTORNEY.

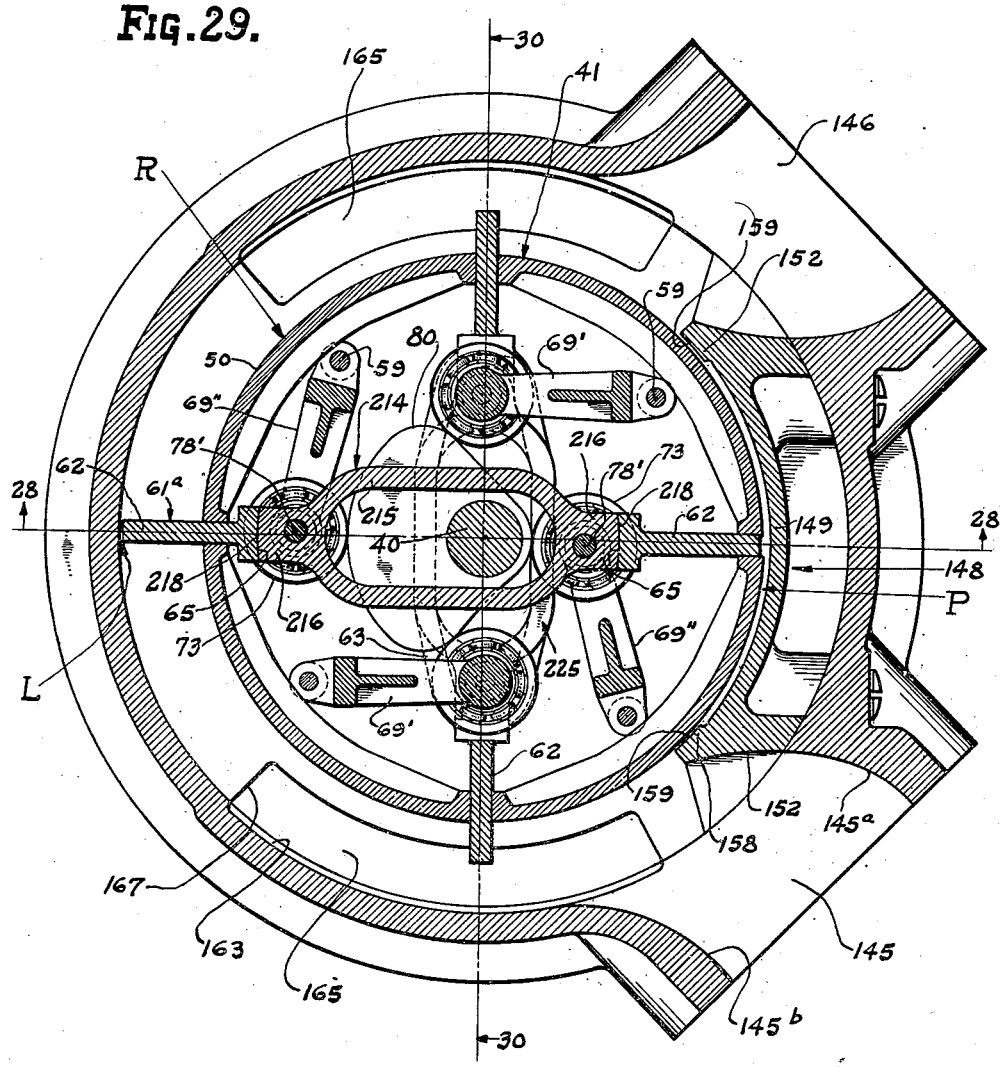

July 9, 1940.  R. S. SMITH  2,207,182
FLUID FLOW MECHANISM
Filed Oct. 15, 1934    29 Sheets-Sheet 13
FIG. 30.
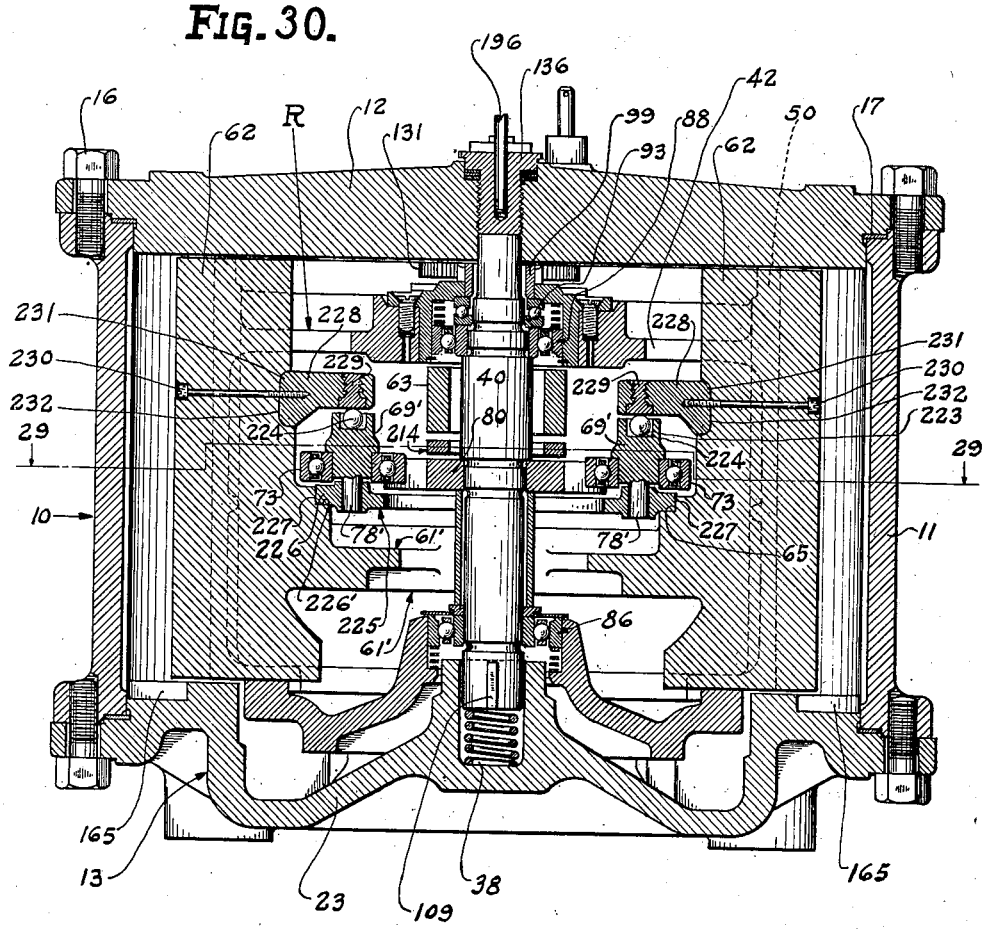
INVENTOR.
Reuben Stanley Smith.
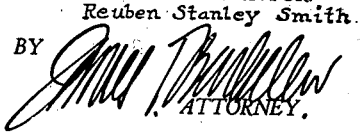
ATTORNEY.

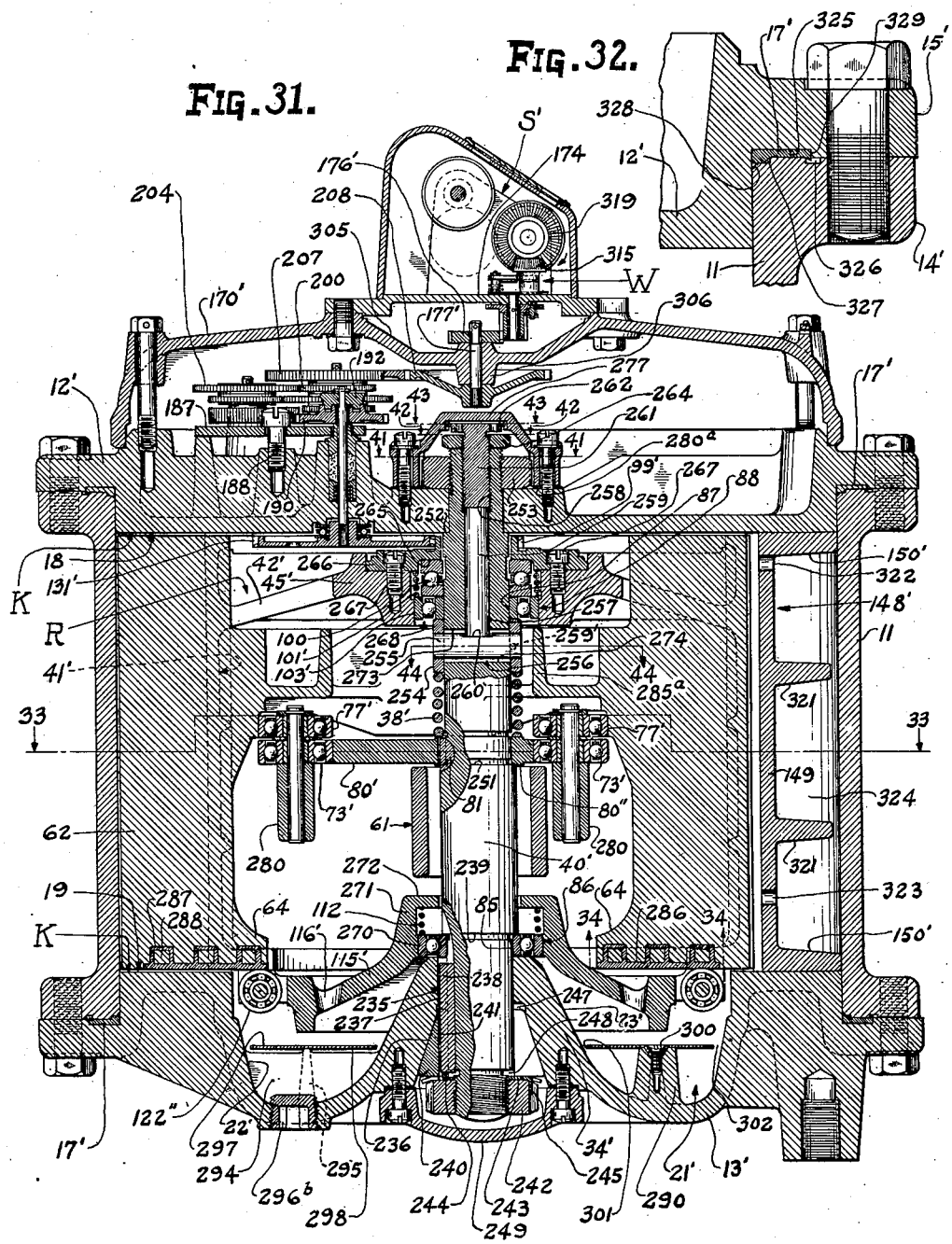

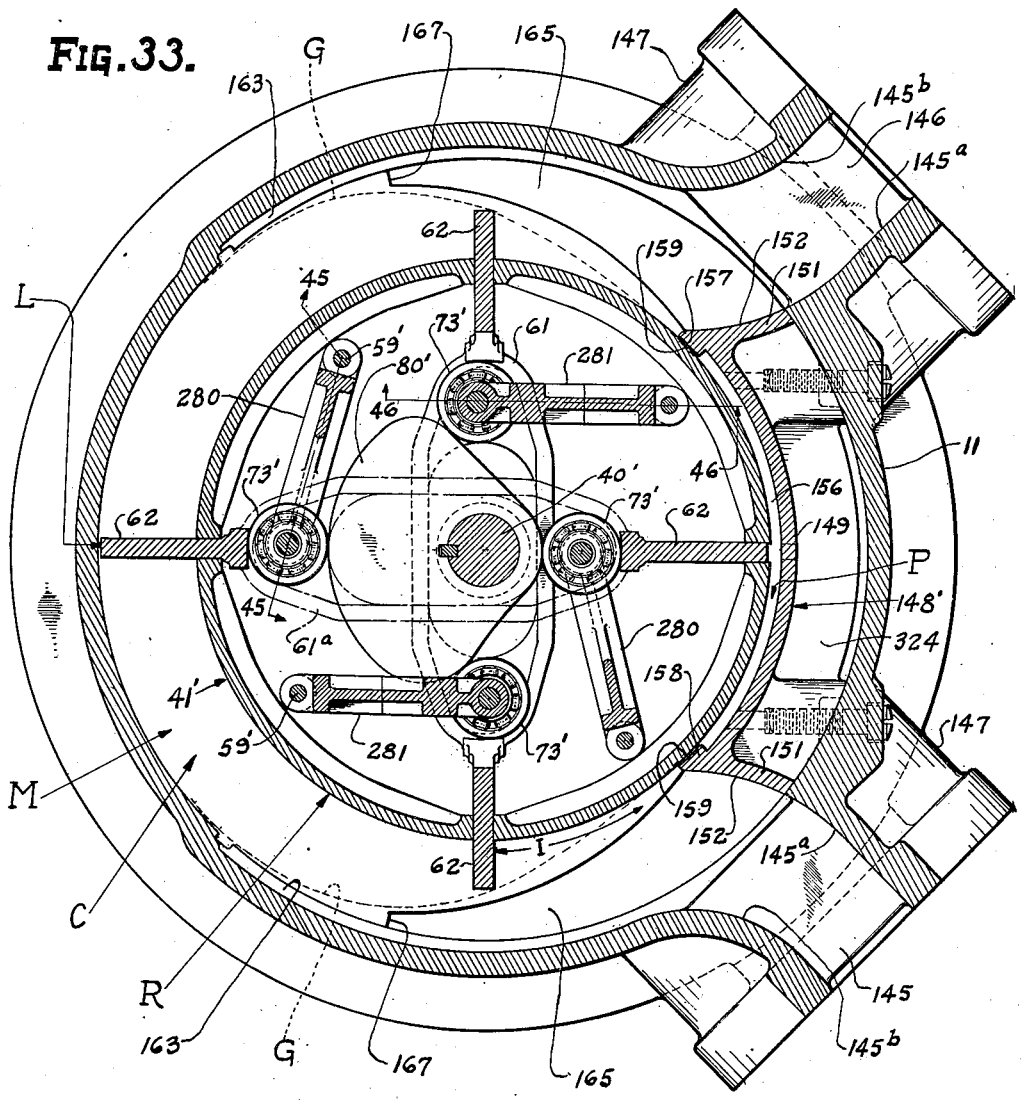
FIG. 33.
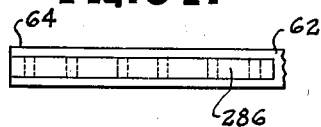
FIG. 34.
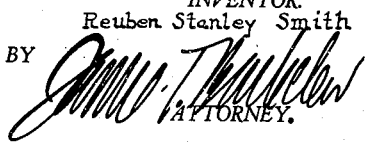
INVENTOR.
Reuben Stanley Smith
BY
ATTORNEY.

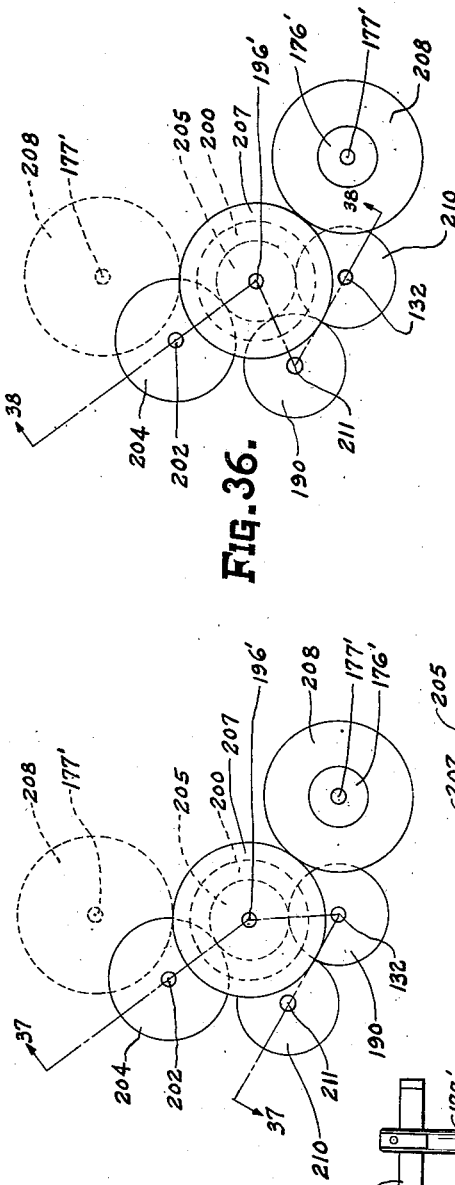
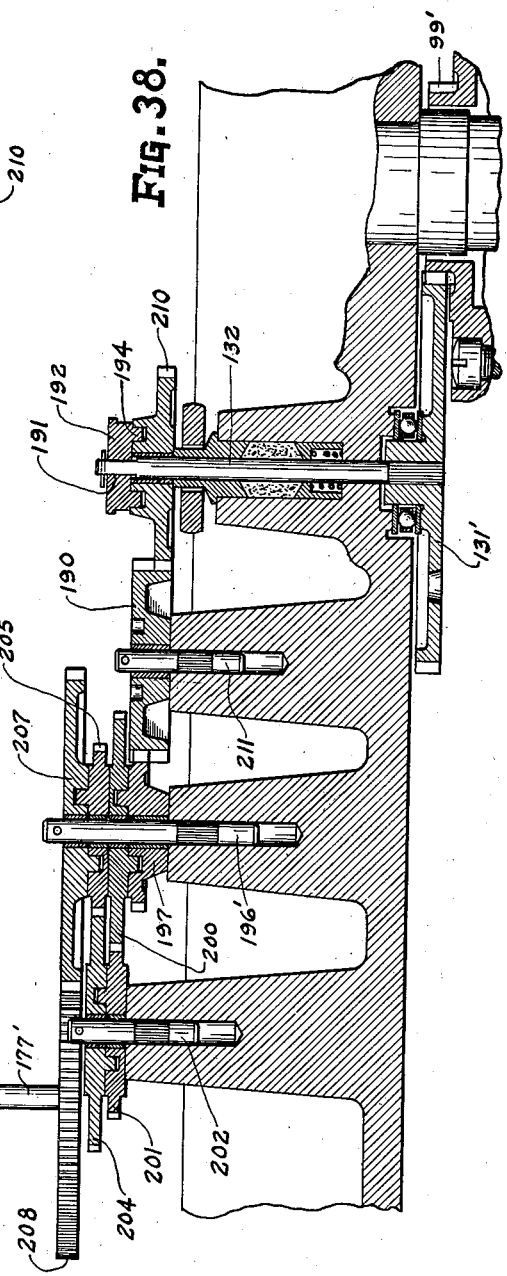

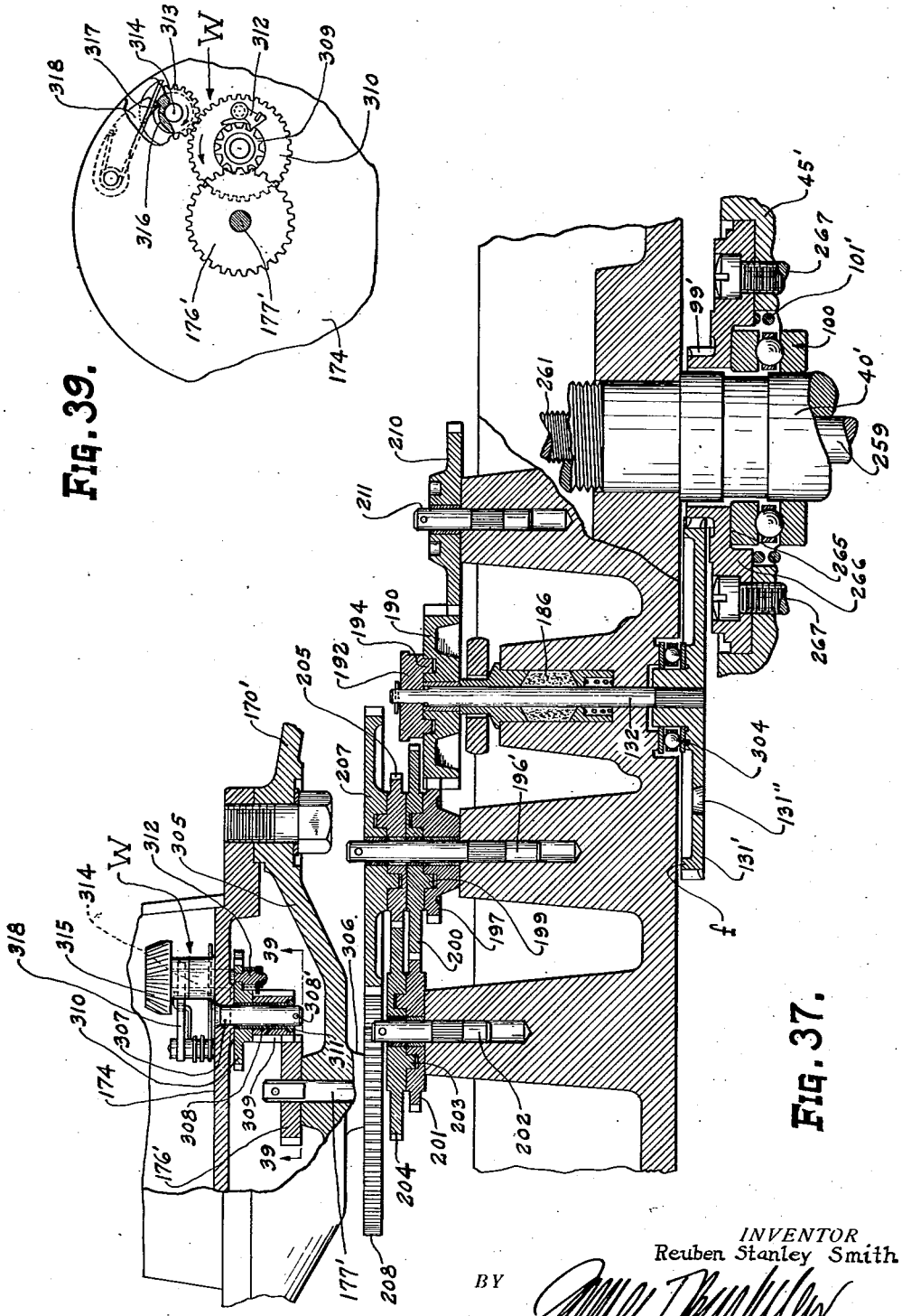

July 9, 1940.　　　　　R. S. SMITH　　　　　2,207,182
FLUID FLOW MECHANISM
Filed Oct. 15, 1934　　　　29 Sheets-Sheet 18
FIG. 40.
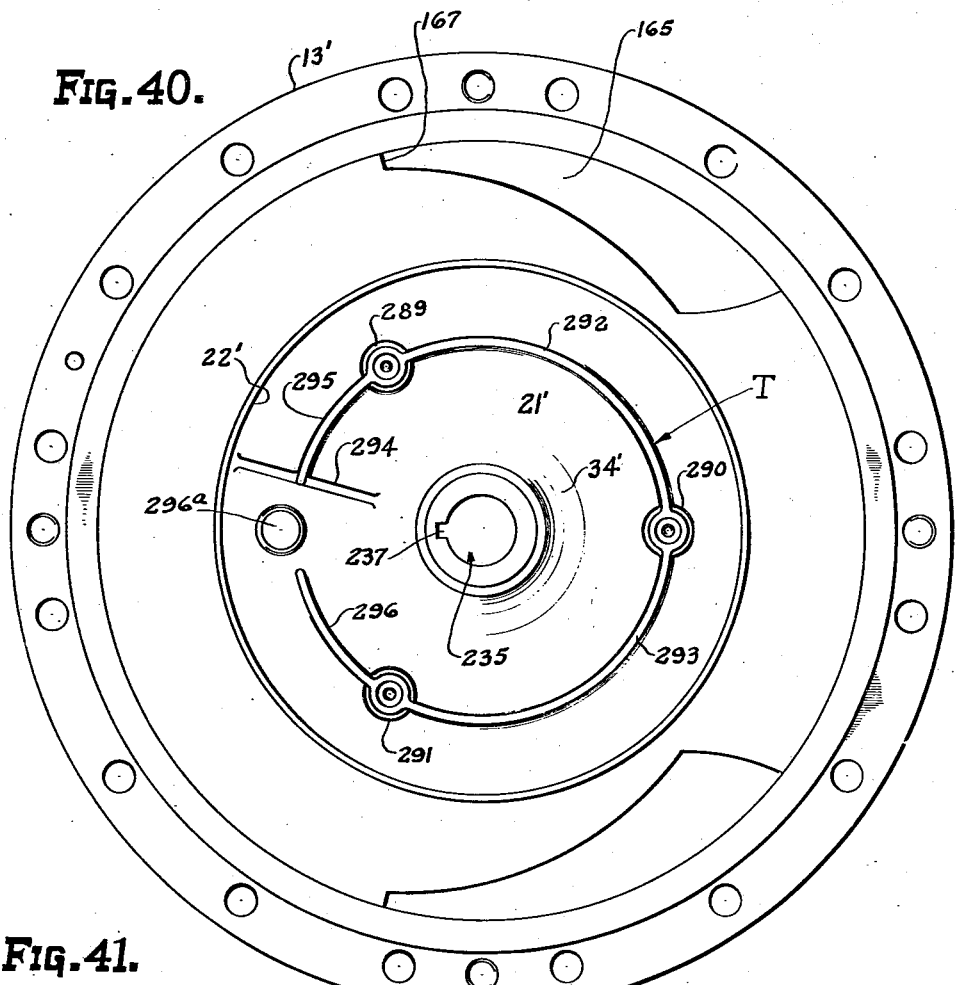
FIG. 41.
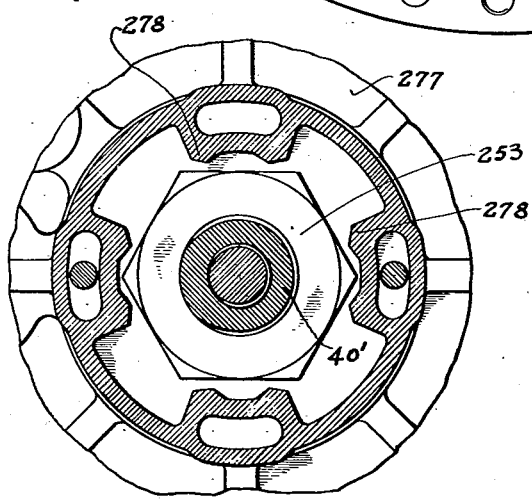
FIG. 42.
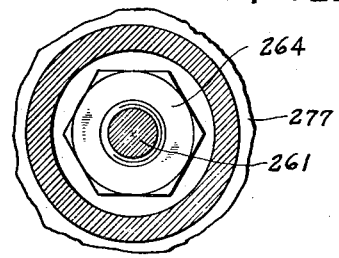
INVENTOR.
Reuben Stanley Smith
BY
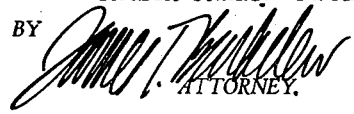
ATTORNEY.

July 9, 1940.  R. S. SMITH  2,207,182
FLUID FLOW MECHANISM
Filed Oct. 15, 1934  29 Sheets-Sheet 19
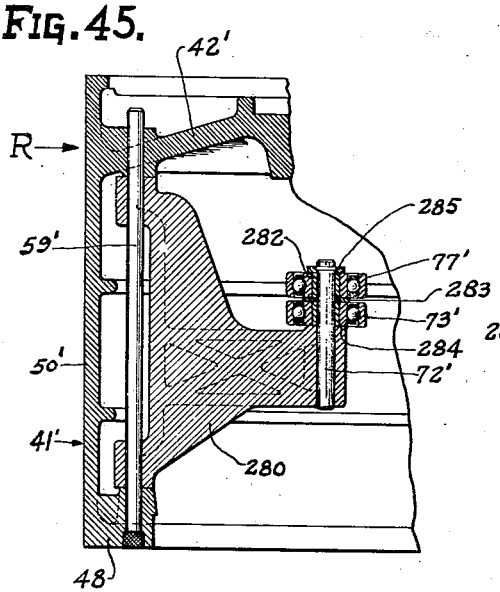
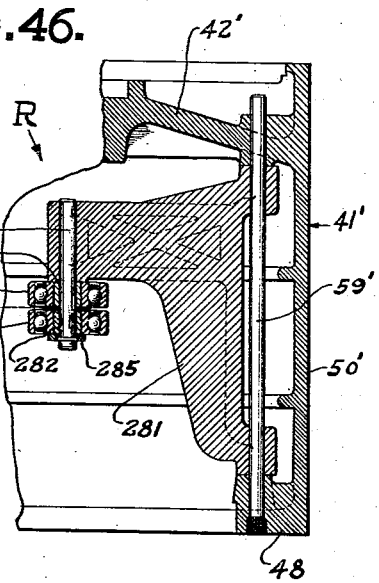
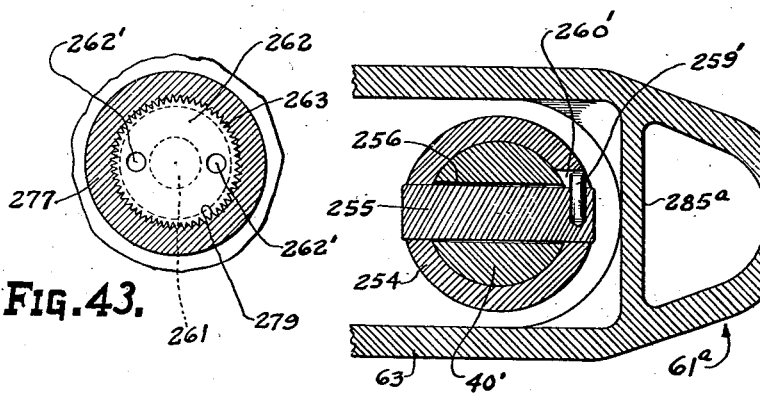
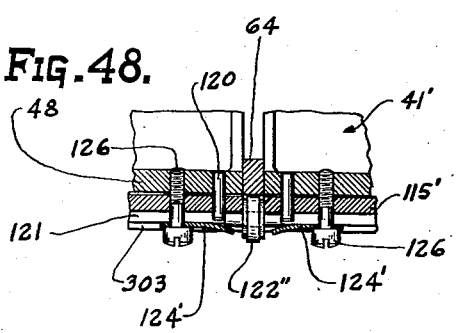
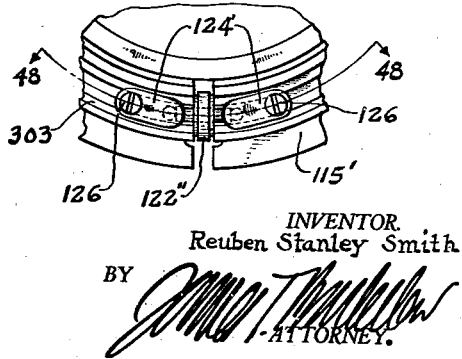
INVENTOR.
Reuben Stanley Smith
BY
ATTORNEY.

July 9, 1940.　　　　R. S. SMITH　　　　2,207,182
FLUID FLOW MECHANISM
Filed Oct. 15, 1934　　29 Sheets-Sheet 20
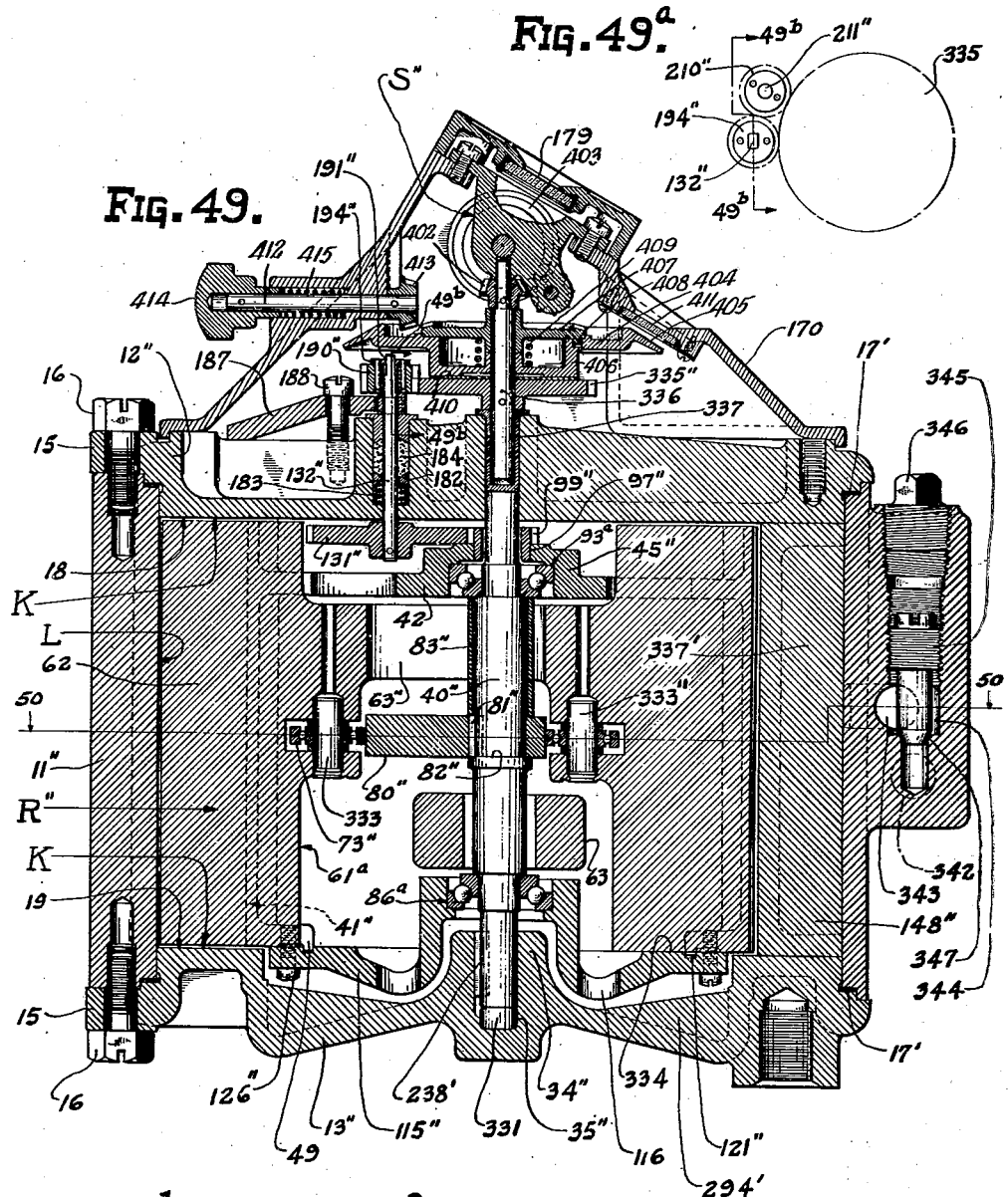
Fig. 49. Fig. 49ᵃ. Fig. 49ᵇ. Fig. 49ᶜ.
INVENTOR
Reuben Stanley Smith
BY
ATTORNEY

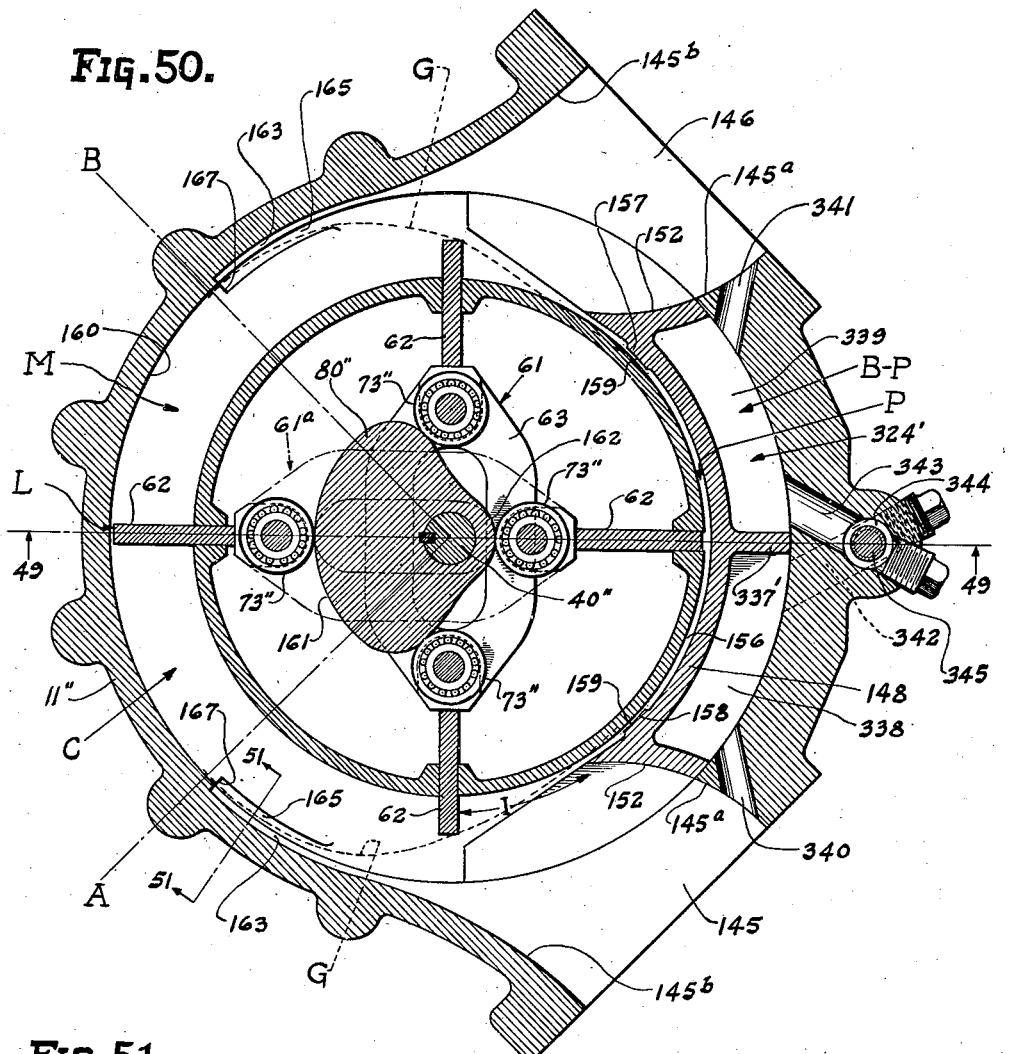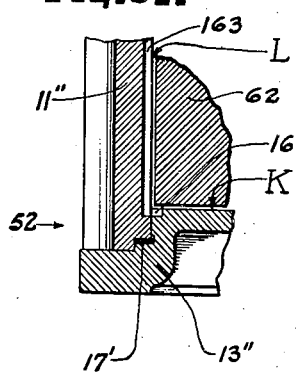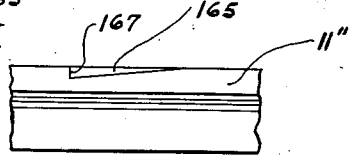

July 9, 1940.  R. S. SMITH  2,207,182
FLUID FLOW MECHANISM
Filed Oct. 15, 1934  29 Sheets-Sheet 22
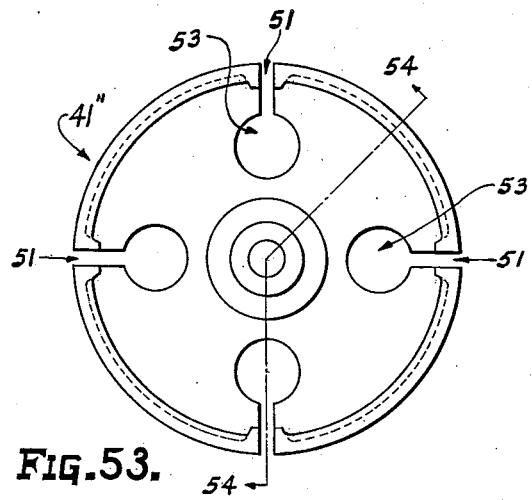
Fig.53.
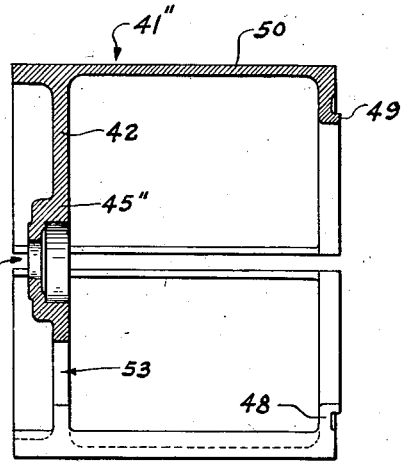
Fig.54.
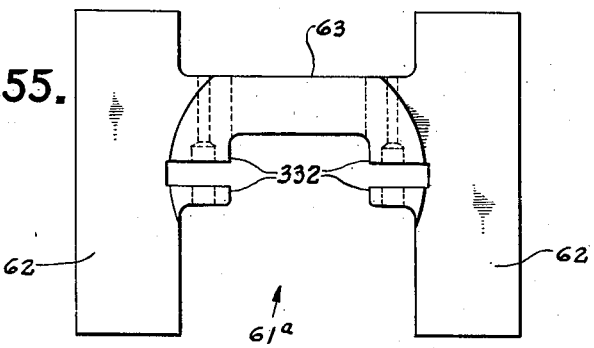
Fig.55.
Fig.56.
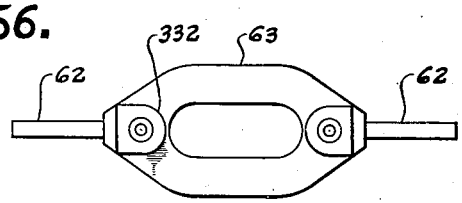
INVENTOR
Reuben Stanley Smith
BY
ATTORNEY July 9, 1940. R. S. SMITH 2,207,182
FLUID FLOW MECHANISM
Filed Oct. 15, 1934 29 Sheets-Sheet 23

INVENTOR
Reuben Stanley Smith
BY
ATTORNEY

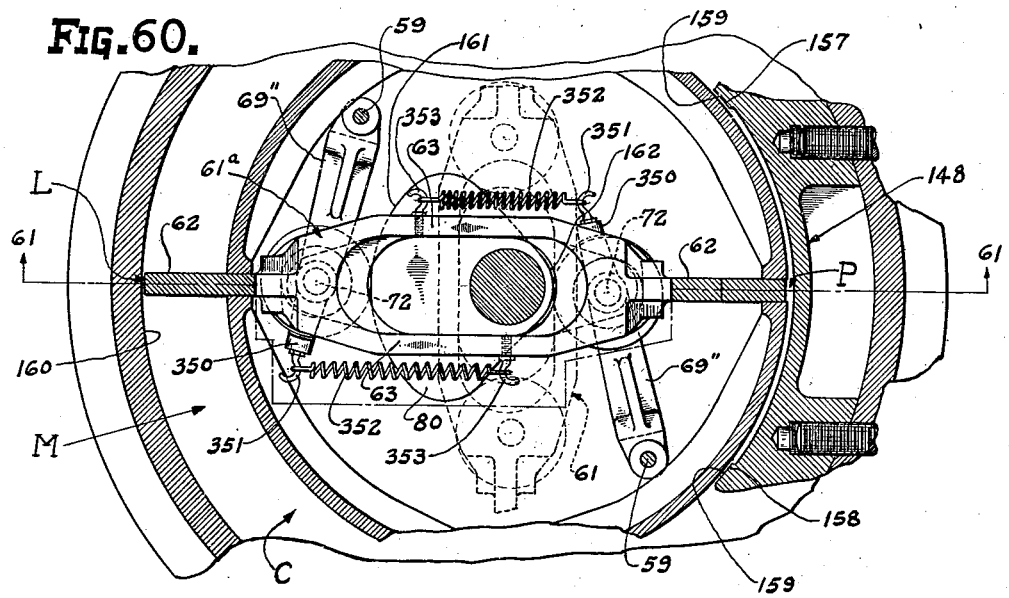
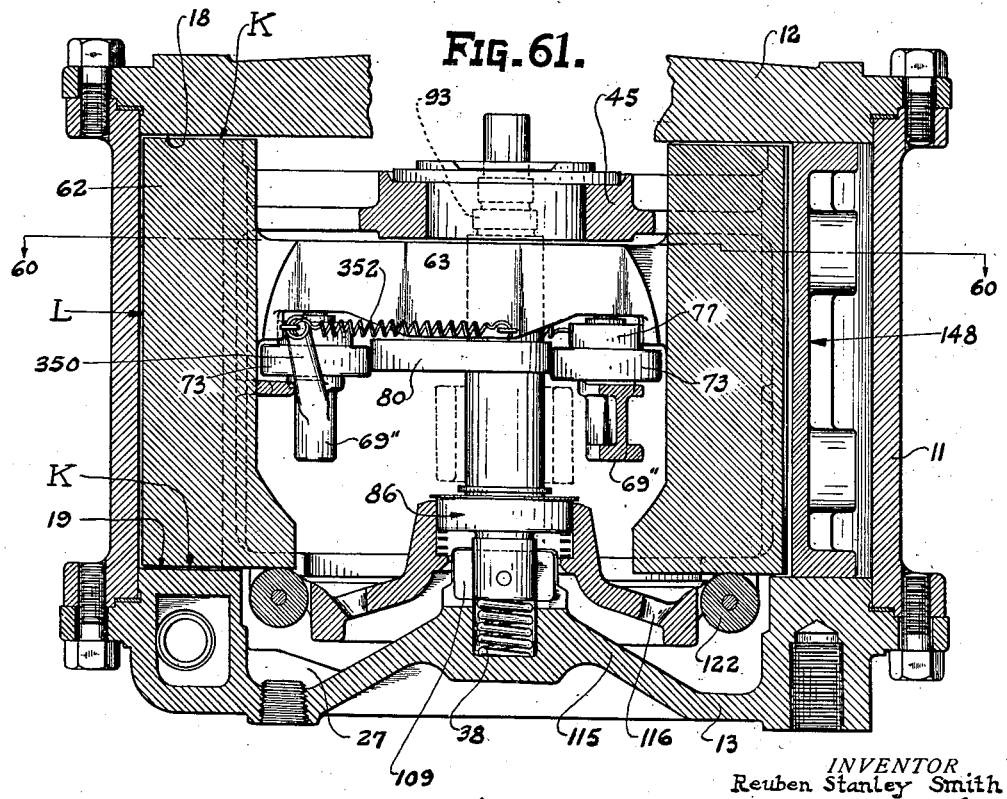

July 9, 1940.  R. S. SMITH  2,207,182
FLUID FLOW MECHANISM
Filed Oct. 15, 1934  29 Sheets-Sheet 25
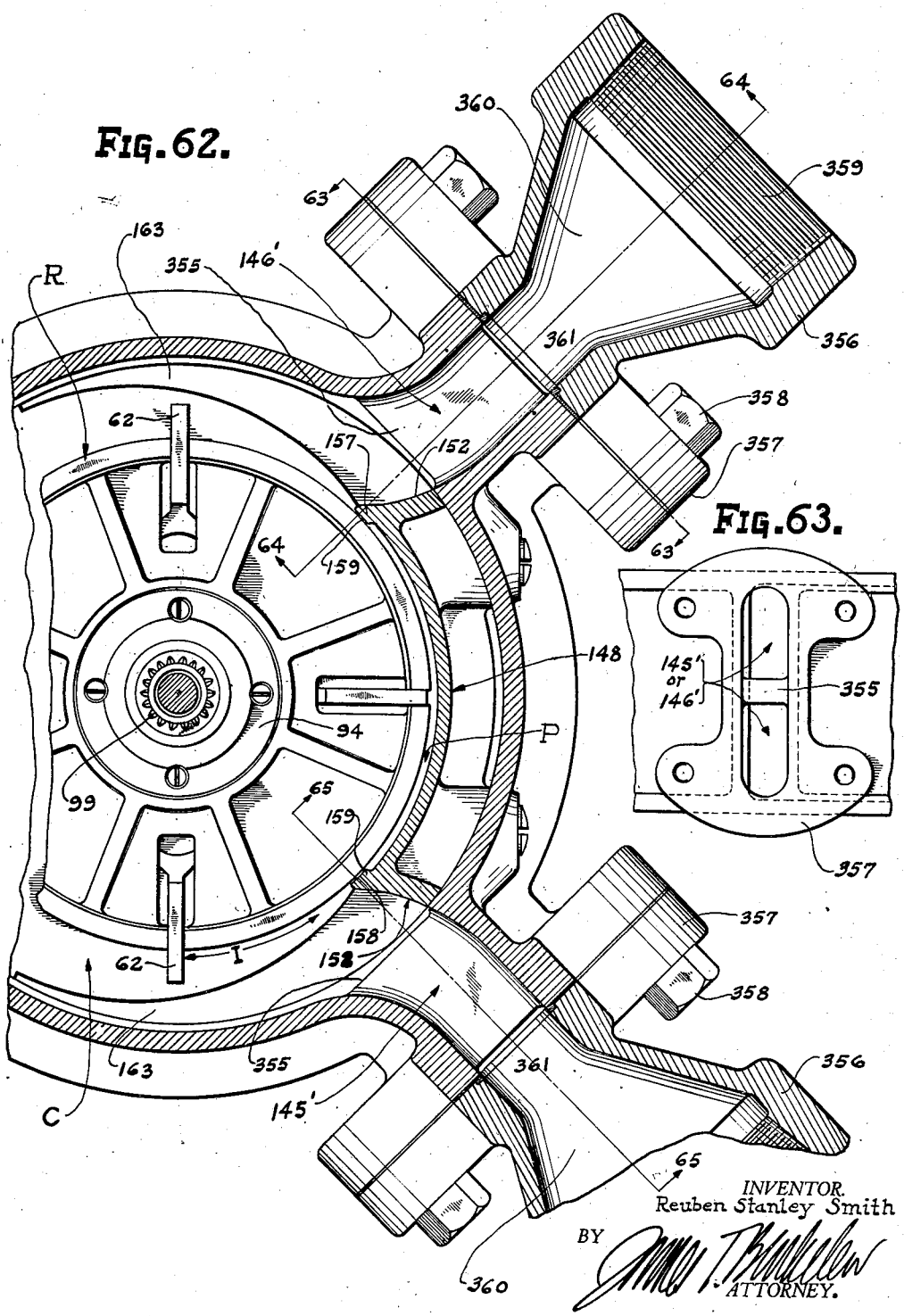
FIG. 62.
FIG. 63.
INVENTOR.
Reuben Stanley Smith
BY
ATTORNEY.

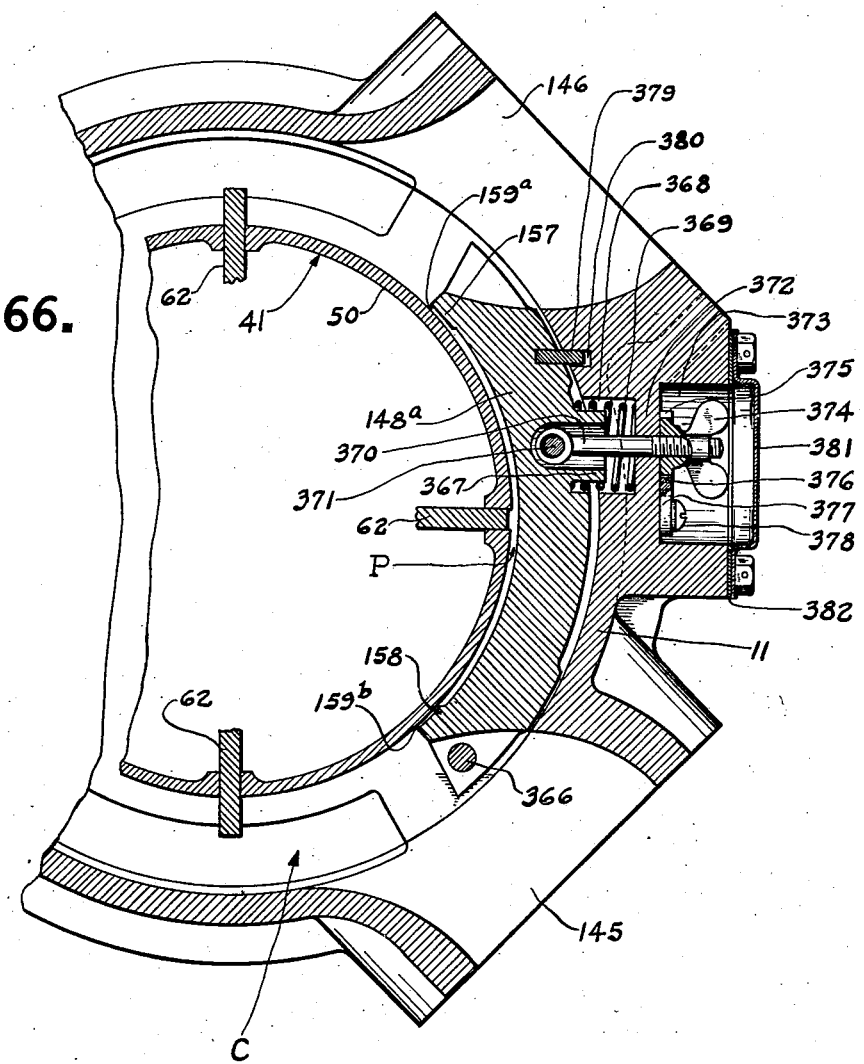

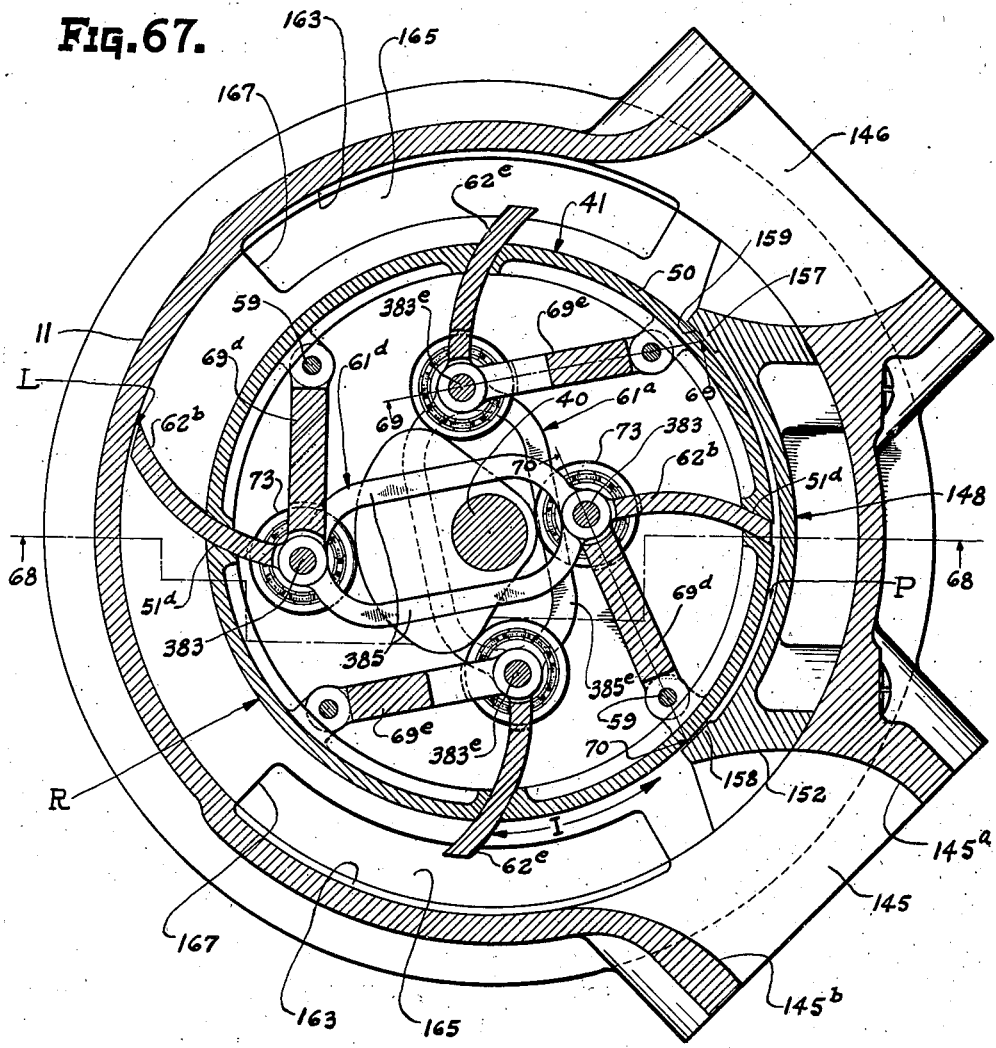

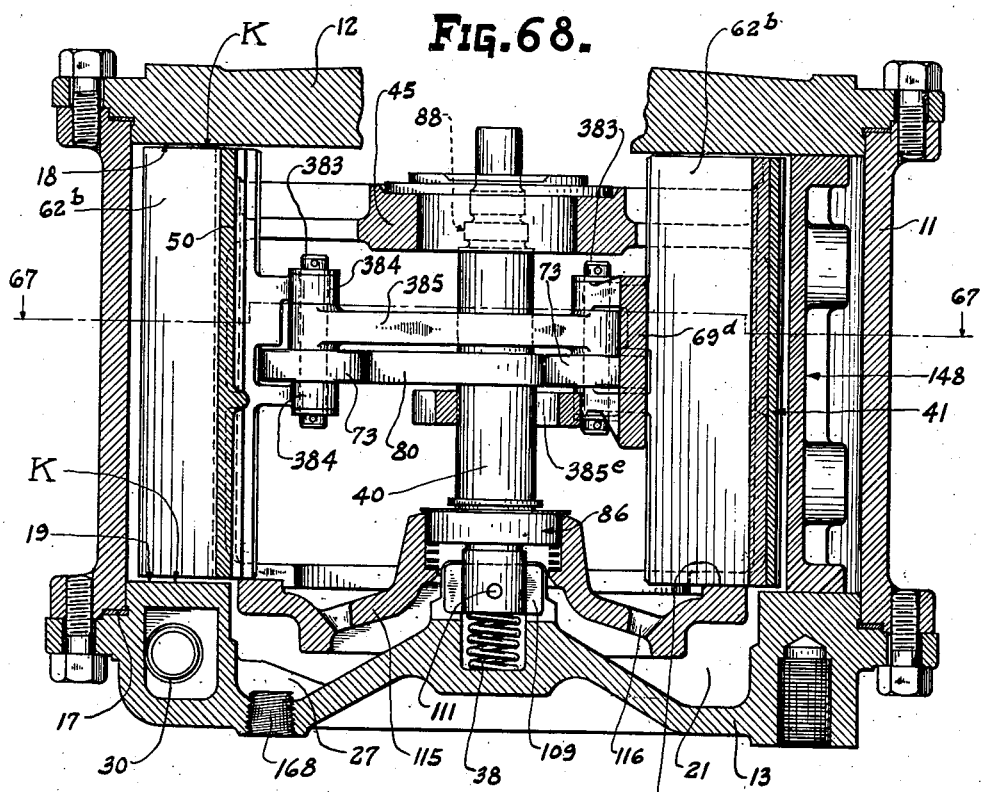
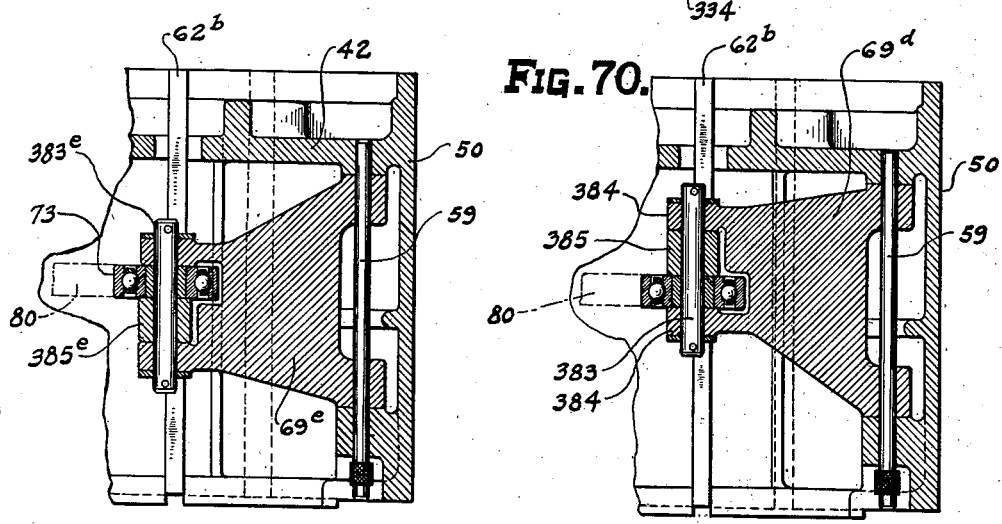

Patented July 9, 1940

2,207,182

UNITED STATES PATENT OFFICE 2,207,182

FLUID FLOW MECHANISM

Reuben Stanley Smith, Beverly Hills, Calif., assignor to Smith Meter Company, a corporation of California Application October 15, 1934, Serial No. 748,342

47 Claims. (Cl. 73—259)

This invention relates to fluid flow mechanisms adapted for use, for instance, as meters for measuring the volumetric flow of liquids. The instant application is a continuation, in part, of my application filed May 29, 1933, Serial Number 673,431 on Fluid flow mechanism.

It is among the general objects of my invention to provide a fluid flow mechanism which shall operate with a minimum amount of friction, an obvious advantage whether the device be used as a meter or motor. However, without intending to limit my broader claims thereto, the invention is herein illustrated and described as a meter mechanism particularly adapted for use in metering highly volatile fluids such as gasoline, for which it is especially well adapted, as will appear from the following description. In this connection, it is my general object to provide an extremely accurate metering mechanism.

The nature of the invention is such that the further objects and features of advantage thereof may be treated to much better advantage as the detailed discussion progresses and I will accordingly pass immediately to a description of the drawings, wherein:

Fig. 1 is a medial, vertical section of a meter, as taken on line 1—1 of Fig. 5;

Fig. 2 is an enlarged fragmentary section showing the gasket between housing parts;

Fig. 3 is a fragmentary section on line 3—3 of Fig. 1;

Fig. 4 is a plan view of Fig. 3, looking from beneath;

Fig. 5 is a section on the broken line 5—5 of Fig. 1;

Fig. 6 is a fragmentary plan section on line 6—6 of Fig. 1, certain parts being broken away to expose underlying elements;

Fig. 7 is a plan, diagrammatic view of the change-gear train;

Fig. 10 is a fragmentary plan view of the housing-base, but showing the side walls thereof in section as indicated at 10—10 on Fig. 1;

Fig. 11 is a section on line 11—11 of Fig. 1;

Fig. 12 is an enlarged detail of the bearing at the upper end of the rotor;

Fig. 13a is a section on line 13a—13a of Fig. 5;

Fig. 13 is a section on line 13—13 of Fig. 5;

Fig. 14 is a section on line 14—14 of Fig. 5;

Fig. 15 is a fragmentary section on the broken line 15—15 of Fig. 5;

Fig. 16 is a fragmentary section on the broken line 16—16 in Fig. 6, the gear indicated at the left of this figure being displaced from its actual position in order better to show certain relationships;

Fig. 17 is a fragmentary section generally similar to Fig. 16 but showing certain of the gears in changed positions, and the gear at the right of the figure being displaced from its actual position in order better to show certain relationships;

Fig. 18 is a detached top plan view of the housing with the cover removed;

Fig. 23 is a detached top plan view of the rotor cap;

Fig. 24 is a perspective view of a blade unit;

Fig. 27 is a fragmentary, sectional detail of a variational form of blade support;

Fig. 28 is a vertical, medial section through a variational meter taken on line 28—28 of Fig. 29;

Fig. 29 is a section on line 29—29 of Fig. 28 and Fig. 30;

Fig. 30 is a section on line 30—30 of Fig. 29;

Fig. 31 is a vertical medial section through another variational form of meter;

Fig. 32 is an enlarged fragmentary section of the housing gasket shown in Fig. 31;

Fig. 33 is a section on line 33—33 of Fig. 31;

Fig. 34 shows the lower end of one of the rotor blades as viewed from beneath, at line 34—34 of Fig. 31;

Fig. 35 is a diagrammatic plan view of the gear train illustrated at the upper part of Fig. 31;

Fig. 36 is a view similar to Fig. 35 but showing the reversing gear in operative position;

Fig. 37 is an enlarged, developed section along line 37—37 of Fig. 35 but showing the gear 208 as though it occupied its dotted line position and showing pinion 39′ and its associated mechanism in section;

Fig. 38 is an enlarged, developed section along line 38—38 of Fig. 36 but showing gear 208 as though it occupied its dotted line position;

Fig. 39 is a section on line 39—39 of Fig. 37;

Fig. 40 is a detached, top plan view of the housing base of Fig. 31;

Fig. 41 is an enlarged section on line 41—41 of Fig. 31;

Fig. 42 is an enlarged section on line 42—42 of Fig. 31;

Fig. 43 is an enlarged section on line 43—43 of Fig. 31;

Fig. 44 is an enlarged section on line 44—44 of Fig. 31;

Fig. 45 is a section on line 45—45 of Fig. 33;

Fig. 46 is a section on line 46—46 of Fig. 33;

Fig. 47 is a fragmentary, bottom plan view of the roller-support for the blade-unit of Fig. 31;

Fig. 48 is a section on line 48—48 of Fig. 47;

Fig. 49 is a vertical, medial section through a variational form of meter, taken on line 49—49 of Fig. 50;

Fig. 49a is a diagrammatic plan view of a portion of the gear train shown in Fig. 49.

Fig. 49b is a fragmentary section on line 49b—49b of Fig. 49 or 49a.

Fig. 49c is a view similar to Fig. 49b but showing the reversing gear in operative position.

Figure 57:
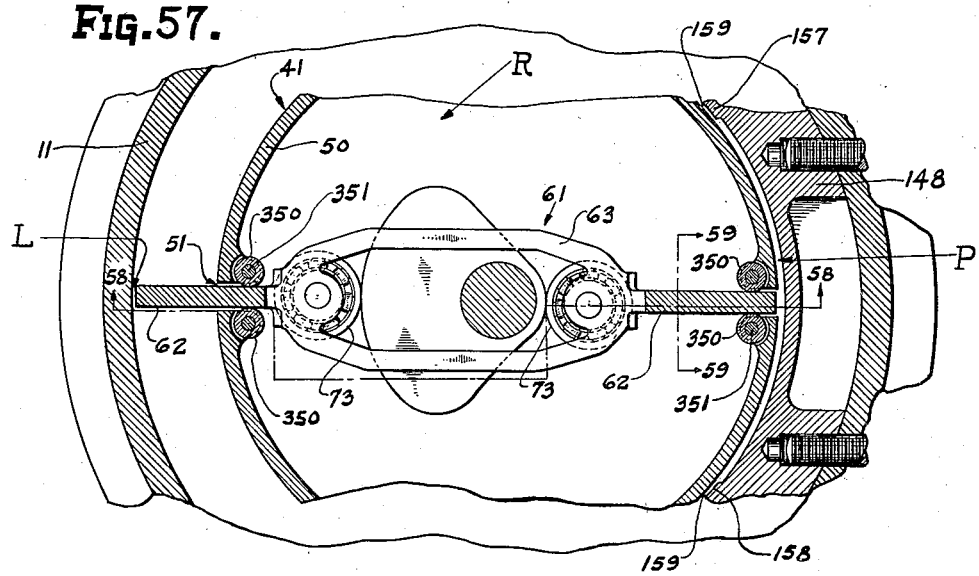
Figure 59:
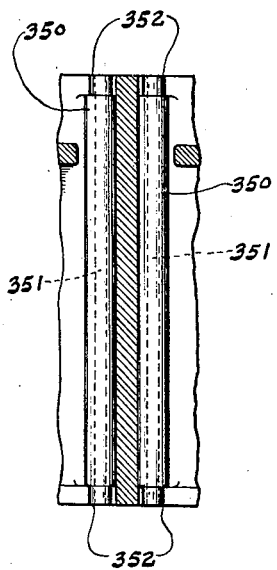
Figure 58:
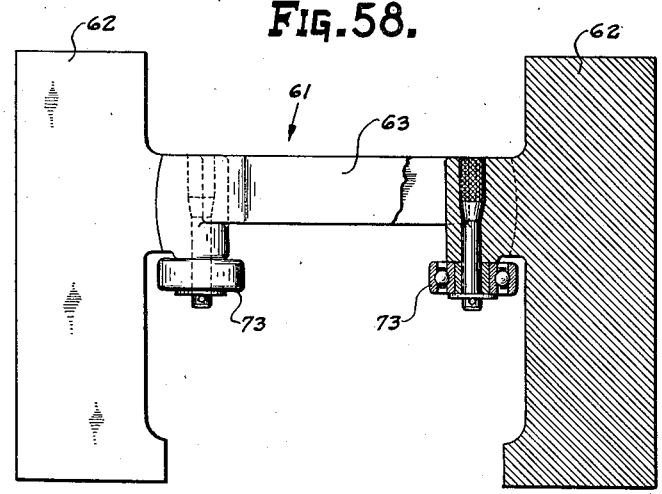
Figure 65:
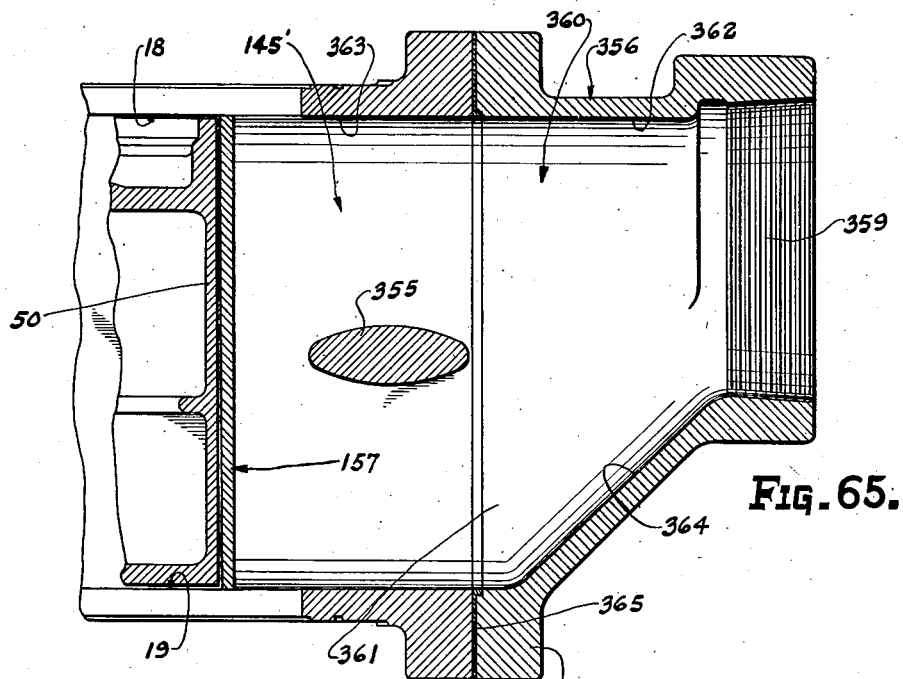
Figure 64:
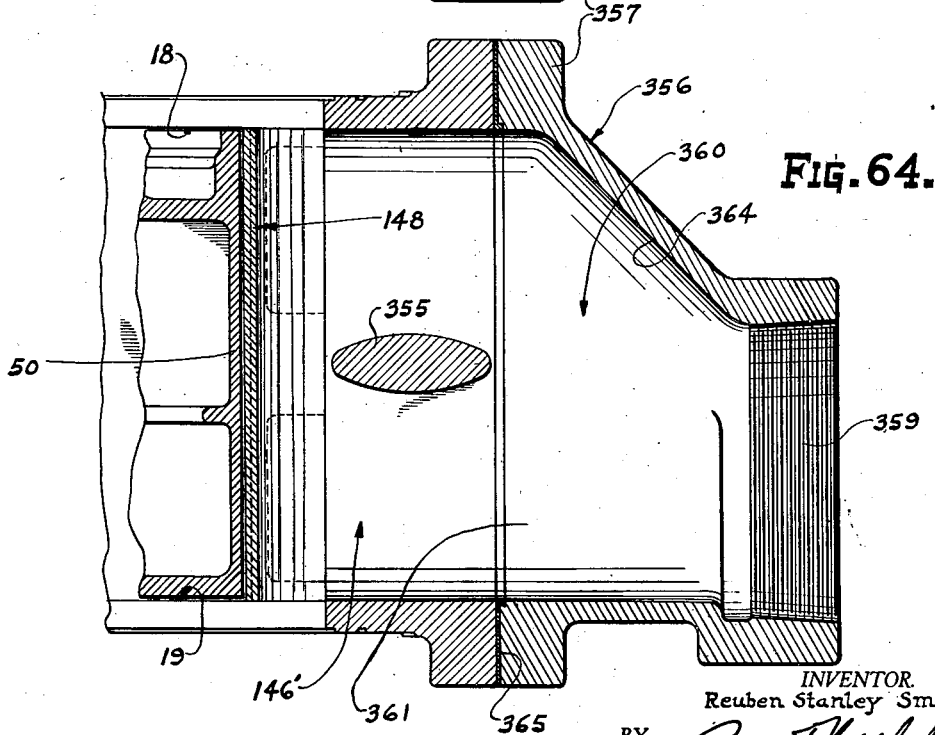

Fig. 50 is a section on line 50—50 of Fig. 49;

Fig. 51 is a fragmentary section on line 51—51 of Fig. 50;

Fig. 52 is a fragmentary side elevation of the housing base as viewed from the position of arrow 52 on Fig. 51 but with the housing annulus removed;

Fig. 53 is a top plan view of the rotor body of Fig. 49;

Fig. 54 is a section on line 54—54 of Fig. 53;

Fig. 55 is a detached elevation of a blade unit of Fig. 49;

Fig. 56 is a bottom plan view of Fig. 55;

Fig. 57 is a fragmentary plan view showing a variational type of blade-unit and blade support;

Fig. 58 is a section (partly in elevation) of the blade unit taken on the broken line 58—58 of Fig. 57;

Fig. 59 is a section on line 59—59 of Fig. 57;

Fig. 60 is a fragmentary plan section showing spring-actuated blade projectors, as taken on line 60—60 of Fig. 61;

Fig. 61 is a section on broken line 61—61 of Fig. 60;

Fig. 62 is a fragmentary plan section through a meter showing a variational form of inlet and outlet openings;

Fig. 63 is a reduced section on line 63—63 of Fig. 62;

Fig. 64 is a section on line 64—64 of Fig. 62;

Fig. 65 is a section on line 65—65 of Fig. 62;

Fig. 66 is a fragmentary plan section showing a variational type of barrier block with means for adjusting same;

Fig. 67 is a plan section on line 67—67 of Fig. 68, showing a variational type of blade unit;

Fig. 68 is a section on line 68—68 of Fig. 67;

Fig. 69 is a section on line 69—69 of Fig. 67; and

Fig. 70 is a section on line 70—70 of Fig. 67.

Referring first to the structure shown in Figs. 1 to 26, the meter housing or casing is generally indicated at 10 and includes an annular body member or barrel 11 and end plates or closures 12 and 13. Since, for reasons later to be made apparent, it is desirable that the meter be positioned with its rotor axis extending vertically, I will individually term plate 12 a cap or cover member and plate 13 a base member. However, this terminology and the illustrated vertical arrangement of the meter are not to be considered as limitative on the invention except as to such claims as specifically call for those particularities. It is further to be noted that where, in my claims, I refer to certain relationships between the rotor and parts integral with the casing, that reference is to be construed as including situations where the parts may be separate from but associated with the casing, unless it is otherwise indicated in particular claims.

Barrel 11 is flanged at 14 and plates 12, 13 are flanged at 15 to take bolts 16 whereby the casing parts are held in assembly, the end of the barrel being recessed at 4 to receive a gasket 17 which is retained on the cover by reason of its radial extension into annular groove 5 (Fig. 2) in the peripheral face 6 of the plate where it extends into the barrel bore.

As will appear, it is important that the opposed faces 18 and 19 of plates 12 and 13, respectively, be maintained accurately in predetermined spaced relation, and, of course, the joint between the barrel and end plates must be fluid-tight. Accordingly, flanges 15 are brought tightly down on flanges 14 to set faces 18 and 19 with the predetermined spacing, while gaskets 17 are of such thickness that they may be compressed sufficiently to allow this contact and yet insure a fluid-tight joint. Groove 5 is extended downwardly to provide an annular clearance recess 20 between the body member and cover to accommodate any excess packing or to receive any packing-overhang which may result from removing the cap after the initial assembly. During such removal, gaskets are ordinarily very apt to be turned over or mutilated at their edges in a manner to resist proper subsequent make-up of the joint, and therefore, in the absence of accommodation means along the lines described, it is usually necessary to substitute new gaskets. By use of the described provision, the cap may be removed repeatedly without renewing the gasket, and yet a proper joint is assured. By relieving the upper edge of the shoulder defining recess 4, as at 7, the danger of mutilating the outer edge of the gasket is eliminated. Variational expedients for accomplishing this same end will be set forth in connection with other embodiments of the invention.

Face 19 is annular, as viewed in plan (Fig. 18), the base within that annulus being depressed to form a settling chamber 21 defined by vertical wall 22 and conical wall 23.

The base is cored out at 24 (Fig. 1 and 10) to form an arcuate filtering chamber offset from and opening at its opposite ends 25 and 26 to settling chamber 21. Fluid-guiding ribs 27 extend from the settling chamber to openings 25 and 26, opening 25 being restricted by annular shoulder 28 while an offset shoulder 29 is provided adjacent opening 26. Filter 30 is in the form of a gauze sleeve 31 drawn about coil spring 32, one end of the sleeve being tied closed and tucked into the bore of the spring as at 33. When detached from the meter, the spring holds the filter straightened out, it taking the illustrated arcuate form as it is being inserted in chamber 24 through opening 26. As soon as one end of the filter engages shoulder 28, its opposite end is thrust sidewise to engage it behind shoulder 29, the inherent resiliency of the spring thereafter holding the filter releasably in position. The purpose and operation of the filter will be set forth at a later stage in the description.

Base wall 23 terminates centrally in hub 34 (Figs. 1, 10 and 11) which has an upwardly opening bore 35 intersected by a cross-cut slot 36 which opens to the top of the hub. The portion 37 of the bore below this slot provides a chamber for receiving compression spring 38, while the portion 39 above the chamber provides a positioning socket and sliding bearing for cam shaft 40 upon which the rotor assembly or impeller mechanism, generally indicated at R, is mounted.

As will appear, the rotor, cam shaft, rotor blades, operating cam, etc., are assembled to form a rotor unit which is capable of bodily insertion in or removed from housing 10 when cover 12 is detached. Accordingly, I will first set forth the make-up of that unit and follow by a description of its assembly with the housing.

Figure 21:
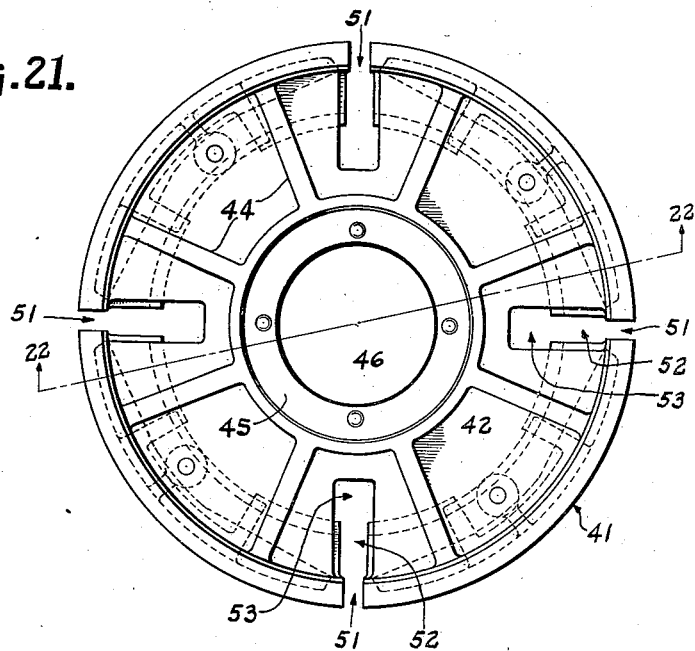
Fig. 21 is a detached plan view of the rotor body with all associated parts removed therefrom.
Figure 22:
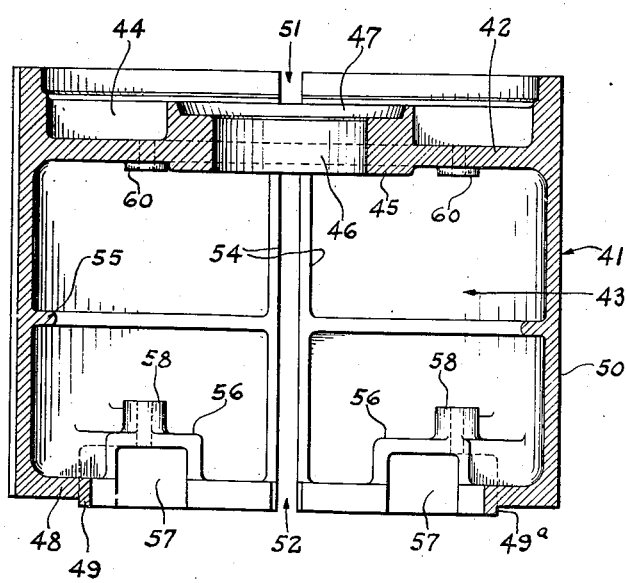
Fig. 22 is a section on line 22—22 of Fig. 21.

Referring to Figs. 21 and 22 it will be seen that the rotor includes an annular body member or carrier 41 (preferably, though not necessarily, of cast aluminum) having a web 42 extending across the bore 43 thereof at a point spaced inwardly from its upper end, the web being ribbed at 44 and supporting a hub 45 which has a bore 46 and a counterbore 47. The described location of the web provides, in effect, a recess at the upper end of the body to allow the interposition of a gear (later to be identified) between the rotor and cover 12.

An in-turned flange 48 is provided at the lower end of the body member and preferably, though not necessarily, a marginal flange 49 depends from flange 48. The annular wall 50 of annulus or body member 41 has four radial slots 51, equally spaced apart and extending from top to bottom, flange 48 and web 42 having slots 52 and 53, respectively, which register with opposite ends of slots 51. However, slots 52, 53 are somewhat wider than slots 51 to provide for greater blade-clearance, as will appear. Internal ribs 54 extend vertically along wall 50 adjacent the slots, serving not only to strengthen the structure at these points but also to increase the extent of surface presented to the side face of the blades which play through these slots, as will be described. Horizontally extending, annular ribs 55 further strengthen the structure.

Midway between each pair of slots 52, flange 48 has a raised portion 56, each of which defines a cavity 57 and supports a boss 58 which is drilled to receive a removable hinge-pin 59 (Figs. 13 and 14) adapted to project into the alined bore of boss 60 which extends downwardly from web 42.

One of the important features of the invention lies in the ease and speed with which the mechanism may be assembled, yet with an assurance of final accurate interfitting and proper operation of parts. This is particularly significant in that all working parts of the rotor assembly are compactly housed within the relatively small bore of the rotor body member, a condition which presents a very real assembly problem. It is in solving this problem that certain of the parts have been given the illustrated characteristics and therefore it will be helpful to detail the assembly procedure as the various individual units are described, although it is of course to be understood that particularities of structure and of assembly are not to be construed as limitative on the invention except insofar as they are the subject matter of individual claims.

There are provided two blades units generally designated at 61 and 61a (Figs. 1, 5 and 24), each unit embodying a pair of blades 62 connected by yoke 63, the lower ends of the blades being extended inwardly or towards each other as at 64. The two blade units are individually fashioned so that the yokes thereof will be spaced apart vertically and lie at opposite sides of section line 5—5 of Fig. 1, when, with their extended ends 64 facing downwardly in both cases, they are assembled in the rotor body. Otherwise, they are substantially similar.

Each unit has a pair of opposed shoulders 65 adjacent the inner edges of the blades and extending vertically from yoke 63. Said shoulders preferably are arcuate, as viewed in plan, being struck about the yoke axis as a center. Preferably, though not necessarily, the units are of cast aluminum, giving them requisite strength with desirable lightness, but since the shoulders 65 are to be exposed to some wear, as will be set forth, hard metal inserts 66 may be cast into the blades, being keyed thereto at 67 by the casting operation. The inserts present wear-resisting surfaces 68 at the centers of shoulders 65.

In the actual process of assembly, the body member 41 is preferably turned top for bottom, but in the following description this invention will be disregarded in order to avoid confusion. The first step is to insert blade unit 61a in the rotor body by sliding the blades through slots 51 from the open end of the annulus. Then the two L-shaped rock arms 69a (Figs. 5 and 13) are inserted in the rotor bore, their spaced and drilled lugs 70a being fitted between bosses 58 and 60 and pivot pins 59 then being thrust through the alined bores in the bosses and lugs. The pins have free, sliding fit in the bosses and lugs, and when they are thrust home, the lower, knurled ends 71 thereof are accessible within recesses 57 so they may be easily gripped for withdrawal should occasion arise subsequently for removing the rock arms. The knurled portions on ends 71 are opposed by shoulders 57a to limit the upward movement of pins 59, while said pins are held from dropping out by the application of a cover or cap removably attached to the bottom of the rotor, as will be later described.

Cast into the free ends of each rock arm is a stub shaft or spindle 72 upon which an anti-friction roller assembly 73 is mounted, this assembly consisting of bushing 74 surrounded by races 75 and balls 76. On top the inner race is mounted a roller 77 which is capable of rotation independently of the associated assembly 73, pins 78 holding the two rollers against displacement from the shaft. For purpose of later distinction, the anti-friction roller assemblies 73 will be termed "cam rollers" or followers, and rollers 77 will be termed "shuttle rollers."

Next, the rock arms are swung to the position of Fig. 5, the arms being of such effective length that rollers 77 engage shoulders 65 or, preferably, insert faces 68.

Rock arms 69 (Figs. 5 and 14) are then assembled with the rotor body in a manner similar to that described in connection with Fig. 13, these arms being generally similar to arms 69a but being turned top for bottom so their stub shafts or spindles 72 depend from the arms, with shuttle rollers 77 below cam rollers 73. However, since cam rollers 73 are in both cases located substantially centrally of their respective supporting arms, they will lie substantially in the same horizontal plane, though, by reference to Figs. 13 and 14 it will be seen that the cam rollers on arms 69a are slightly lower than those on arms 69. Removable pins 78 hold the rollers from dislodgement along their respective stub shafts.

With blade unit 61a and all rock arms 69 and 69a in place, the next step is to introduce the cam shaft 40, with which several other elements have been previously assembled as follows. A uniformly accelerated motion cam 80 is keyed to shaft 40 at 81 and is held against shaft-shoulder 82 by spacer 83 (Fig. 1) which, in turn, is held against longitudinal displacement along the shaft by collar 84 and the inner bearing-race 85 (Fig. 11) which latter has tight press-fit on the cam shaft. Race 85 is one element of the radial bearing indicated generally at 86, but it will be understood that at this stage of the assembly only race 85 is applied to the shaft.

The inner race 87 (Fig. 12) of an upper radial bearing generally indicated at 88 is press-fitted on shaft 40 against shoulder 89, ball cage 90 with its balls then being snapped over the race. Above race 87 the cam shaft has a reduced-diameter portion 91 and terminates in a portion 92 which is of still further reduced diameter.

The cam shaft, with its attached elements, as just described, is inserted in the rotor bore, the upper end of the shaft extending between the yoke arms 61d and horizontal arm-webs 61e of blade unit 61a (Fig. 24), the cam 80 being positioned in horizontal alinement with the cam rollers 73 of all the rock arms, which positioning holds arms 69a in such position that their shuttle rollers 77 are held in engagement with the blade inserts of units 61a.

The bearing unit generally indicated at 93 (Figs. 1 and 12) is next applied to the rotor, said unit having been previously assembled as follows: A container or bushing 94 is in the form of an annulus 94c having an external annular flange 96 and an internal annular flange 97, the hub 98 of pinion 99 being tightly pressed into the bore defined by flange 97. Of course, the pinion may be secured in any other suitable manner, or, as illustrated in a variational embodiment to be described, it may be integral with the container. The thrust bearing assembly generally indicated at 100 is placed within the bore of the container with its upper race engaging the under face of flange 97. A helical compression spring 101, preferably, through not necessarily, made of flat stock, is placed in the container-bore about the thrust-bearing assembly, a thin washer 102 is inserted in the bore beneath the spring, outer race 103 of bearing 88 is slipped into the bore of the container, having sliding fit therewith, and a split retention ring 104 is sprung into groove 105 in annulus 94c to hold the parts against accidental dislodgment prior to assembly of the unit with the cam shaft.

The bearing unit 93, as thus assembled, is slipped into the hub bore 46 of carrier 41, the balls in cage 90, which latter has been previously applied to the cam shaft, sliding into race 103, and the cam shaft extending with annular clearance through the upper race of bearing 100 and also with clearance through the bore of pinion 99. The unit is then secured in place by screws 106, flange 96 being taken in hub-counterbore 47.

Blade unit 61 is now inserted so its blades extend through slots 51, its shoulders 65 being engaged with shuttle rollers 77 of rock arms 69. The cam rollers 73 of these arms are thus held in engagement with the peripheral face of cam 80.

A thin protective washer 107 is slipped over collar 84 and against the flange thereon (Fig. 11) ball cage 108 of bearing 86 is snapped over race 85, and cross key 109 is inserted in slot 110 which opens to the lower end of the cam shaft, the key being removably positioned by pin 111 which is held against dislodgment by the subsequent insertion of the lower end of the cam shaft in hub bore 39.

Compression spring 112, similar to spring 101, is now dropped into the bore 113 of hub 114 provided on the upper face of rotor cap 115. Near its outer edge, the cap is provided with drainage ports 116 (Figs. 13 and 23) and has an annular flange 117 provided with four radially extending slots 118 which are adapted to register with slots 52 in the flange 48 of member 41. The cap is preferably conical and is provided with a downwardly extending annular flange 115a (Fig. 1), both these provisions serving, when the cap is applied to body 41, to stiffen the rotor structure in a manner effectively to resist relative displacement of the sections of the split rotor body.

Before the cap is applied to the rotor, outer race 119 (Fig. 11) of bearing 86 is inserted in hub bore 113 on top spring 112, said race having sliding fit within the bore and being constantly urged upwardly by spring 112.

On opposite sides of slots 118, are arranged press-fitted pins 120 (Figs. 3, 4 and 23) these pins extending through annular groove 121 is cap-flange 117 and to points above that flange.

Cap 115 is applied to the lower end of rotor body 41 with slots 118 and 52 in register, pins 120 fitting into registering holes in flange 48. Locator or pilot pins 120c are carried by the cap and extend a little higher than pins 120 for cooperation with clearance holes 120d in body-flange 48. Preferably, though not necessarily, the inner vertical extent of cap-flange 117 presents an inwardly facing, annular shoulder 121a (Fig. 23) adapted to engage the outer peripheral face 49a presented by flange 49 on rotor flange 48 (Fig. 22).

As cap 115 is applied to member 41, balls 108 (Fig. 11) slide into race 119, putting bearing 86 into the assembled condition shown in Figs. 1 and 11.

Hardened rollers 122 (Figs. 1, 3 and 4) having rotational bearing on shafts 123, are positioned in slots 118, shafts 123 lying within groove 121 and being held against longitudinal displacement by pins 120, as clearly shown in Fig. 3. Spring clips or retainers 124 are applied to the underside of cover 115 by screws 125 which extend through clearance openings 126 in the cover and into threaded engagement with flange 48, thus serving not only to hold the clips in position but also to hold the cover tightly in assembly with rotor body 41.

Tongues 127 are pressed upwardly from the mid-section of the clips into groove 121 to prevent accidental rotation of said clips about screws 125, thus holding the free ends of the clips under the ends of shafts 123 to support them in such position that the lower edges of blades 62 engage the tops of the rollers, the blades thus being antifrictionally supported from beneath to contribute to their ease of shuttling movement, as will be described. It will be seen that the inward extensions 64 of the blades assure the roller-support of said blades even when they are in their positions of greatest extension, as at the left of Fig. 1.

Pins 120 form a tie between cap 115 and annulus 41 at opposite sides of slots 51, serving to hold the slotted end of the annulus from spreading and thus definitely and permanently establishing the widths of said slots so that predetermined clearances between the slot walls and blades 62 are exactly maintained. The engagement of cap shoulder 121a with flange 49 also contributes to this effect.

With the rotor and cam shaft assembled as described above with base 13 applied to barrel 11, the rotor assembly is lowered into the housing, the end of cam shaft 40 being entered in bore 39 on top of spring 38, and key 109 occupying cross-slot 36 to prevent subsequent rotation of the cam shaft with respect to the housing.

Figure 25:
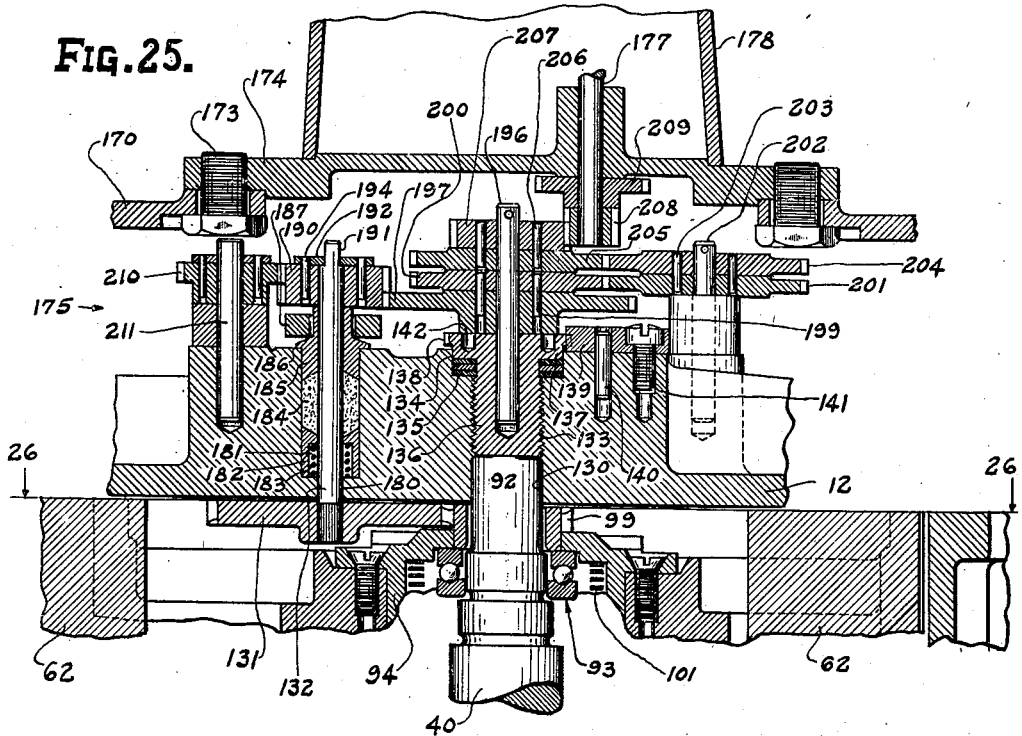
Fig. 25 is an enlarged fragmentary section of the mechanism shown at the upper center of Fig. 1, with one of the gears shown out of its actual position, as will be explained.
Figure 26:
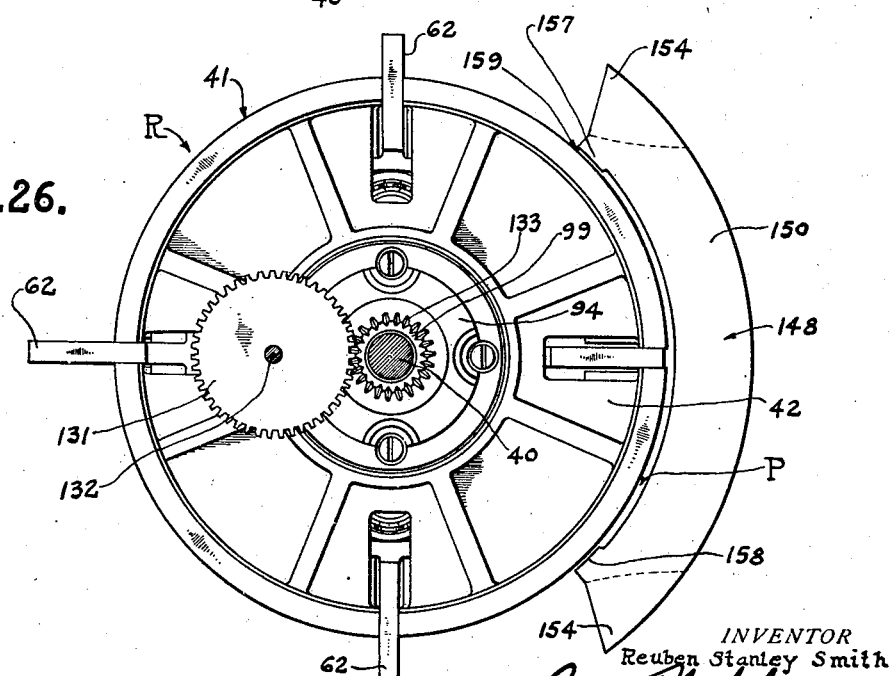
Fig. 26 is a reduced section on line 26—26 of Fig. 25.

Housing or casing cap 12 is then lowered onto annulus 11 and bolted in position, its central bore 130 receiving shaft terminal 92, and gear 131, which is supported on shaft 132 beneath the cap, dropping into mesh with pinion 99. In order to insure that the gear teeth will mesh as the cover is lowered and thus avoid mutilation of said teeth, the teeth of gear 131 and pinion 99 are beveled as shown at 133 (Figs. 25 and 26). The mounting of shaft 132 will be considered in connection with the latter description of the register-drive mechanism. However, it will be seen that gear 131 lies between the lower face of cover 12 and web 42 and thus is within the bore of the housing.

The opposite ends of blades 62 and of rotor annulus 41 are accurately machined to allow for slight clearance, indicated at K, between those ends and opposed housing faces 18 and 19. In the drawings the clearances are exaggerated, as is true of all other clearances indicated, in order that they may show up in the relatively small drawings.

The mechanism to be described is provided for the accurate vertical adjustment of the rotor annulus and its blades to locate them properly with respect to faces 18 and 19 and to preserve that relationship in spite of the constant tendency of spring 38 to urge the rotor assembly upwardly. For instance, assume that the rotor is .010" shorter than the distance between faces 18 and 19 and that it is desired that the rotor finally be positioned so there is .005" between each of its ends and the respective opposing faces 18 and 19, it being understood that this particular dimensioning, while giving satisfactory results, is not to be considered as in any way limitative on the invention but is given merely for the purposes of illustration.

Bore 130 has a threaded portion 133 (Fig. 25) which terminates at the bottom of counterbore 134 wherein is disposed compressible packing 135. An adjustment plug 136 is threaded into bore 130, being provided with downwardly facing shoulder 137 for compressing the packing and with a serrated flange 138 (Figs. 1 and 6). A locking dog 139 is removably pinned at 140 to cap 12, screw 141 serving to hold the dog in position with its point in engagement with a selected notch in flange 138.

At this stage of assembly none of the gears, illustrated in Figs. 1 and 25 as overlying plug 136, are in position, the upper end of the plug with its spanner wrench sockets 142 thus being exposed.

When cap 12 is first lowered into position, plug 136 is backed out sufficiently to insure that it will not interfere with cam shaft 40, it following that spring 38 presses the cam shaft and hence the entire rotor unit upwardly, the upper end of the rotor annulus engaging the under face 18 of the cap. Plug 136 is then screwed down sufficiently to depress the cam shaft and rotor unit against the pressure of spring 38 until the lower end of the rotor engages base-face 19, which condition can be determined by reaching through side openings 145 or 146 in body member 11 (the position of which openings will be later set forth) and noting the resistance set up when the rotor is turned by hand.

Threads 133 and the notches in flange 138 are so related that the assembler can thereafter accurately set the rotor with predetermined clearances between it and the end plates of the housing. This is done by unscrewing the plug a predetermined amount. For instance, threads 133 may be twenty to the inch and there may be fifty notches in flange 138, this example being given merely by way of illustration. Hence an angular movement of the plug equal to the extent of one flange-notch will move the plug longitudinally .001". Thus, the assembler may rotate plug 136 left-handedly (assuming threads 133 are right-hand) though an angle represented by five notches, allowing spring 38 to raise the cam shaft and rotor .005", thus creating a clearance of like distance between the bottom of the rotor and face 19, and still leaving a like clearance between the top of the rotor and face 18. Dog 139 is then entered in the registering notch in flange 138 to hold the plug in adjusted position. It will thus be seen that the down-bearing load of the blades is imposed entirely on rotor body 41 and the down-bearing load of the rotor is taken on a thrust-bearing supported from the casing, all in a manner to maintain the blades and rotor body in predetermined, vertically spaced relation with the underlying wall 19 of the casing.

The arrangement just described is, of course, operative to effect re-adjustment of the rotor unit should need for same arise during subsequent operation, it being noted that pinion 99 merely slides vertically with respect to gear 131 during this adjustment.

It will be seen that cam shaft 40 and its cam 80 are now centered in housing 10 and are held by key 109 against rotation with respect thereto, the cam shaft serving, through thrust bearing 100 and flange 97 of member 94 to support the rotor and all parts carried thereby. With the thrust bearing taking the down-bearing load of the rotor, and radial bearings 86 and 88 interposed between the shaft and rotor, it will be seen that the rotor and its parts are mounted for exceedingly free rotation, though accurately held in proper alinement both vertically and radially with respect to all associated parts. Springs 101 and 112 constantly press the sliding races toward their associated bearing elements, thus automatically taking up wear which may develop in the bearings and preventing even slight radial displacement of the rotor.

Cam 80 is, of course, held stationary with respect to housing 11, and, since the opposed rollers 73 of each blade unit engage the cam at diametrically opposite sides, rotation of rotor body 41 causes shuttling of the blades, as will be described in detail later. However, due to the interposition of shuttle rollers 77 and blade supporting rollers 122, the resistance offered to this shuttling movement and hence to bodily rotation of the rotor is reduced to a minimum.

The mounting of rollers 73 and 77 on rock arms 69 and 69a contributes greatly to the smoothness and ease of rotor rotation and eliminates much wear and undesirable pressure that would otherwise occur. It will be noted that in the showing of my previous application as herein reproduced by Figs. 49–56, inclusive, the cam bears against rollers carried directly by the blade units, it resulting that considerable side thrust is imposed by the cam on the blades and, in turn, by the blades against certain walls of the rotor-slots through which they extend. This thrust-load, particularly at high rotor-speed, is decidedly appreciable and causes undesirable wear and energy loss. However, with the rock arm construction shown in Figs. 1, 5, 13 and 14, the cam rollers 73 take the thrust of the cam, which thrust is transmitted through the rock arms and shuttle rollers 77 to the blade unit, but, as applied to a given blade unit, the thrust is only in the direction of its shuttling movement, that is, radially with respect to the rotor and hence with no side-thrust component.

It will be noted that rollers 77 through which the shuttling thrust is transmitted to the blades are, on one pair of arms 69a, above the plane of cam 80 and, on the other pair of arms 69, below that plane, in each case the rollers being located approximately in the horizontal plane in which lies the center of mass of the associated blade unit, it being noted that the yokes of the two units lie at opposite sides of cam 80. With this relationship existing there is eliminated any tendency for the blade units to tilt under thrust-load and cause contact and consequent wear between the blades and surfaces adjacent thereto. Not only is this elimination important from the standpoint of lengthening the actual life of the meter, but it is also important as a factor in preserving meter accuracy, for not only would this wear bring about an undesirable increase in certain relatively critical clearances, but also, during the period of contact causing that wear, a considerable and undesirable frictional hold-back on the rotor would result.

Since shoulders 65 are located immediately adjacent the yokes 63 (Fig. 24) which connect the blades of a given blade-unit, the tendency of rollers 77 to spring the blades apart is minimized, to obvious advantage.

The wide spread of the rock arm lugs 70 or 70a (Figs. 13 and 14) with rollers 73 in planes substantially midway between those lugs, eliminates any undesirable deflection which might otherwise arise from the fact that the thrust load is transmitted from the rollers 73 in one plane to rollers 77 in another plane.

Now it will be noted that rotor R is resiliently supported by spring 38 in predetermined, vertically spaced relation with respect to face 19. Consequently, if the rotor be exposed to a downward jar as may often be the case, particularly where it is mounted on a tank car or delivery truck, this jar as imposed on the rotor is absorbed by spring 38, the latter yielding to allow the rotor to descend through the slight clearance space between face 19 and the bottom of the rotor, thus relieving thrust bearing 100 (Fig. 12) from the solid shock to which it would otherwise be exposed. If the shock be severe, the rotor may momentarily contact face 19, but even if this happens the shock is taken evenly over the entire under face of the rotor, the possible load transmitted to the ball thrust bearing being at all times limited to the spring pressure which is well within its capacity to withstand.

In a variational embodiment to be described, the rotor and its thrust bearing are vertically spring-supported independently of the cam shaft which, in that case, is held rigidly within the housing, whereas in the present embodiment the rotor is held to the cam shaft and the latter is spring-supported. It will be seen, however, that in both cases the thrust bearing and hence the rotor are spring-supported with respect to the housing with the common end of saving the thrust bearing from shock.

The vertical disposition of the rotor shaft, in contradistinction to the horizontal shafts usual to mechanisms of this type, not only permits of the advantageous mounting of the rotor as described, but also avoids such disadvantageous effects as arise from the unbalanced condition of the rotor at various points of angular rotation which result from the shuttling of the blades. It will be apparent that, where the rotor axis is horizontal and the blades are being projecting to constantly varying distances from the rotor center, the force of gravity will impose a varying and unbalanced load effect on opposite sides of the rotor, thus giving rise to an uneven angular torque and consequent irregular angular movement.

Figure 8:
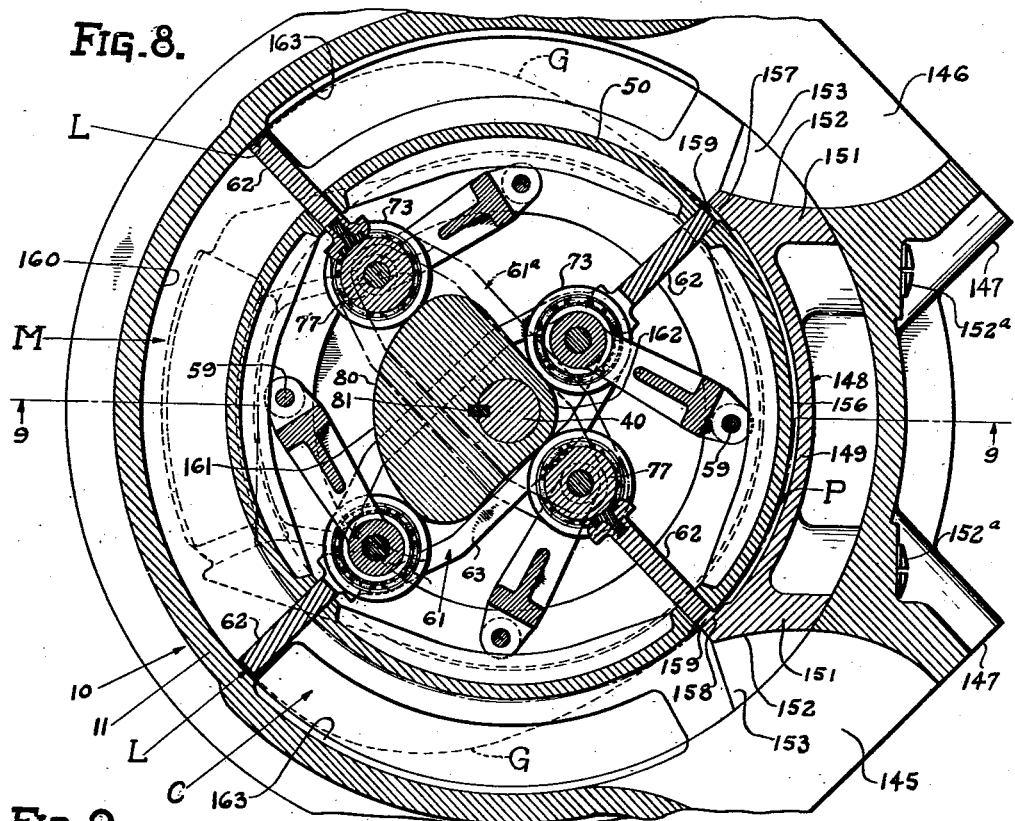
Fig. 8 is a view similar to Fig. 5 but showing the rotor in a changed position.
Figure 9:
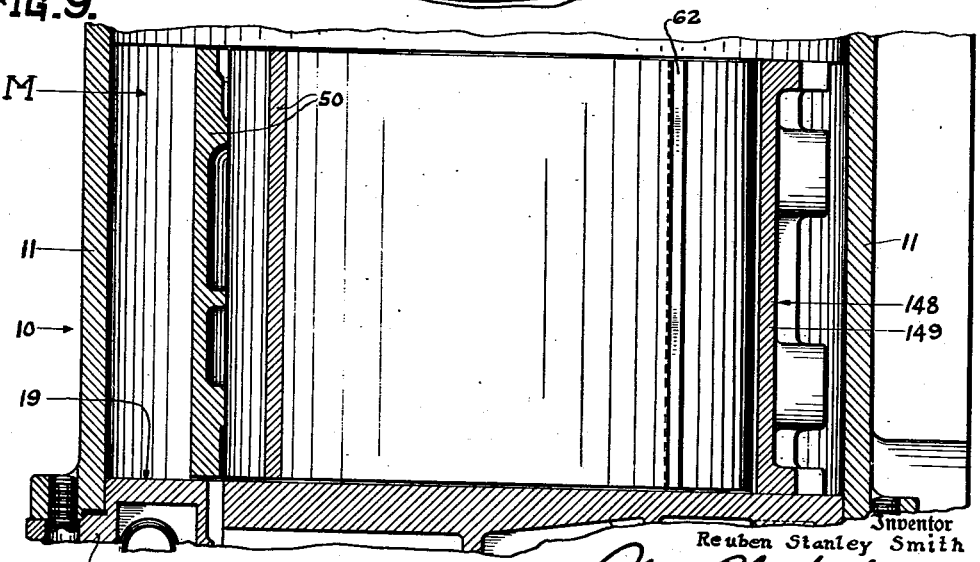
Fig. 9 is a section taken on the broken line 9—9 of Fig. 8.

Now referring to Figs. 5 and 8 it will be noted that an annular flow channel, generally indicated at C, is defined by the inner wall of casing 10 and the periphery of rotor annulus 50. Opening to this channel are housing ports 145 and 146, these ports extending through bosses 147 adapted, as at 147a (Fig. 13a) to take attachment fittings whereby flow pipes may be applied to the meter. The meter is symmetrical and functions properly irrespective of the direction of fluid flow therethrough. Consequently either port may be utilized as inlet or outlet, but, for purposes of description, it will be assumed that the rotor is to rotate in a clockwise direction, and accordingly port 145 will be considered as the inlet and port 146 as the outlet. The size and shape of the ports may vary within wide limits, as long as certain fundamental relationships are preserved, as will be set forth later, and therefore the following description is not to be considered as in any way limitative on the invention except insofar as the claims may import.

Ports 145 and 146 are spaced apart approximately 90° and, at their outer ends, are of circular cross-section (see Fig. 13a). However, as they approach the flow channel C, the ports are elongated vertically and narrowed horizontally, terminating just above face 19 and a little below face 18 (see Fig. 19). The ports are substantially arcuate as viewed in plan and their dimensions are such that, throughout their lengths, their cross-sectional areas are substantially equal to the cross-sectional area of the flow channel C, which latter is substantially of uniform cross-sectional area throughout. The significance of this relationship will be pointed out later.

Interposed in flow channel C at a point between ports 145 and 146 is a barrier block 148 (Figs. 1, 5 and 20) consisting of an arcuate plate portion 149 held in annularly spaced relation with the housing by marginal flanges, the horizontal flanges being indicated at 150 and the vertical flanges being indicated at 151. The block is detachably held in position by screws 152a extending through barrel 11, though it will be understood the block may be considered as a part of the casing. The outer faces 152 of vertical flanges 151 are arcuate as viewed in plan-section, but at their ends they curve outwardly as at 153 to meet the pointed ends 154 of flanges 150 (Figs. 20 and 26), corner edges 155 (Fig. 5)

thus fitting along the edges 154a of the associated housing ports (Fig. 19) where they open to the housing bore. Flange faces 152 thus form smooth continuations of the adjacent wall of the associated ports but terminate inwardly in narrow vertical faces 155a (Fig. 5) which extend from top to bottom of the flow chamber and are disposed at an angle, as viewed in plan, with respect both to the peripheral face of the rotor and the arcuate portions of faces 152.

Faces 152 and the adjacent faces 145a of the casing ports curve inwardly toward faces 145b, as viewed in Fig. 5 with faces 152 in a position to deliver fluid, at the inlet port, so it more or less directly impinges against the rotor at I, where, due to the described curvature of the inlet faces (of which 152 may be considered a part) the pressure of the fluid is increased at this area of impingement, while, at the outlet side, the pressure adjacent the rotor is relatively reduced, resulting in a pressure-differential that tends to increase slippage across the ends of the rotor from inlet to outlet.

Now it will be seen that fluid slippage from inlet to outlet is not only proportional to the pressure differential between ports but is also proportional to the time element. For instance, in passing 100 gals. if the flow rate be 50 gals. per minute, there are two minutes during which slip may occur. If the flow rate be 100 gals. per minute, the time for slippage is reduced to one minute. It is therefore desirable to increase the slippage at high flow speeds, for the naturally greater pressure differentials which then exist are not sufficient to produce the necessary amount of increased slippage. The provision set forth above for increasing the slippage by virtue of the curved inlet and outlet walls and the more or less direct impingement of the fluid on the rotor, accomplishes the desired end.

The face of block 148 is recessed from top to bottom to provide a clearance passageway 156 between the rotor and the block. This recession leaves vertically extending lugs 157 and 158 at the end of the block, which lugs are spaced apart slightly less than 90° and establish diminished clearance passageways 159. Taken together, passageways 159 and 156 will be considered a "return" or corrective passageway P, the significance of which will be pointed out later.

Diametrically opposite block 148, the inside of the housing wall is accurately machined at 160 throughout an angular extent of a little more than 90°, this portion of the wall and the opposite wall of the rotor annulus defining the sides of measuring chamber M which is, of course, a part of flow channel C. The measuring chamber is defined at top and bottom by faces 18 and 19 and, at its ends by adjacent rotor blades, when they are both within the limits of face 160. The dimensions of the measuring chamber are such that its volumetric capacity will have a known value to which a meter counter or register may be accommodated by operation, for instance, through a properly calculated gear train to register in any chosen unit of measure.

Cam 80 is so located that, upon rotation of the rotor, a given blade is projected to its furthest extent a few degrees before it reaches the measuring chamber, the opposite blade of that unit simultaneously reaching its position of full retraction (preferably a little below the peripheral face of the rotor to insure ample clearance with respect to the block-lugs 157, 158) just prior to reaching lug 157. The cam rollers 73 of that unit then ride over cam dwells 161 and 162 which maintain the blades in their respective positions of full projection and retraction until just after they leave the measuring chamber and lug 158, respectively. The path of a given blade during one revolution of the rotor is indicated in dotted lines G in Fig. 8.

With the described relationship of wall 160, abutment wall 149 and ports 145 and 146, it will be seen that casing 10 may be considered as having oppositely disposed segmental cylindrical walls of different radii with inlet and outlet ports intermediate the ends of said wall.

The rotor blades during their passage through measuring chamber M, preferably slightly clear the defining walls of that chamber, the rotor clears lugs 157, 158, and the side walls of the housing are cut back between the measuring chamber and ports 145, 146 as at 163 (Figs. 5 and 8) there consequently being no metal-to-metal contact to cause a frictional drag on the rotor. It has been previously made apparent that due to the cam rollers, shuttle rollers and blade-supporting rollers, together with their particular dispositions, there is little resistance offered to rotor movement by the internal mechanism thereof. It follows that the rotor is capable of smooth and easy rotation under the slightest of impulses, a factor of great importance, as will be realized. Before proceeding to a description of the register drive, I will discuss the functioning of the assembly so far set forth, for it will be realized that this does not depend upon particularities of that drive. However, for purposes of immediate reference, a registering mechanism will be designated generally at S (Fig. 1) it being understood preliminarily that register S is operated by virtue of rotor movement.

When the meter is initially connected with a source of fluid under pressure, plug 164 in cap 12 (Fig. 6) is temporarily removed to permit the escape of air which may be trapped in the upper part of the housing.

As the fluid flows through inlet 145, it is guided by the smoothly curving walls of the inlet passageway and wall 152 into flow channel C. In its passage, the fluid acts against such rotor blades as are in its path in a manner to cause rotor rotation which, in turn, shuttles the blades in the manner previously described.

Now the feature of maintaining the inlet and outlet and the flow passage C of substantially uniform cross sectional area throughout (though they may vary in shape at different points in their extents) is of decided importance. This provision allows the maintenance of a substantially constant flow-velocity through the meter, the measuring of the fluid being accomplished without stopping or retarding the flow and therefore without wasting head energy. In devices having substantial or more or less abrupt variations in the cross-sectional areas of their flow passages, corresponding serious losses of head energy result. It will be apparent that relatively narrow sections necessitate an increased velocity of fluid flow which must be attained at the expense of fluid-head-pressure. Furthermore, with the velocity necessarily dropping each time the larger cross-sections are reached, it will be seen that a large part of the energy represented by the initial acceleration is lost, and that the fluid must be re-accelerated for its further passage through subsequent narrow channels, requiring the expenditure of additional energy. This recurring loss of flow velocity with the consequent dissipation of head energy results in such meters having a very unsatisfactory flow capacity, particularly when used in gravity installations. All these disadvantageous effects are avoided in my meter by maintaining the substantial uniformity of cross-sectional area as set forth. With no substantial differential in pressure from inlet to outlet, the tendency toward variational, fluid-slippage is reduced to a minimum, the rotor movement may correspond very nearly exactly to the fluid flow, and the rotor is capable of operating under extremely low pressures.

Due to the mounting and association of the various moving parts, as explained above, but little resistance is offered to rotation of the rotor and therefore but little resistance is offered to flow of fluid through the meter. In this connection it is to be noted that, since the blades are being bodily carried in the direction of fluid flow and at practically the same velocity thereas, said blades do not, by virtue of radial movement through the fluid stream to their projected positions, appreciably retard the passage of the fluid from the inlet to the measuring chamber.

Cam 80 being of the uniformly accelerated motion type, accomplishes the shuttling movement of the blades in the manner best adapted for smooth, even shockless operation.

Centrifugal force tends to hold each blade successively outward as it is extended beyond its central position, thus holding the associated cam roller firmly in contact with the small-radius dwell 162 during movement of the given blade through the measuring chamber. This insures that the blade will clear measuring-chamber wall 160 by a predetermined extent as at L (Figs. 1 and 5) in spite of lost-motion or play in the mechanism, thus insuring predetermined slippage through the slippage clearances or channels and consequent accurate metering results.

The described nature of the cam and blade units, the free shuttling movement of the blades and the means for transmitting thrust from the cam to the blade unit, all contribute to the end that the energy transmitted to the blades from the rotor during their radial acceleration period is returned to the rotor during their deceleration period.

All the above conditions contribute greatly to the free rotation of the rotor, the result being that it responds properly even though the velocity and viscosity of the fluid vary between extremely wide limits.

The face 19 of base 13 is recessed at 165 (Figs. 5 and 15) the recesses starting at points opposite the inlet and outlet ports and thence inclining downwardly and terminating in square-cut, vertical shoulders 167 adjacent the ends of measuring chamber M. Sand or other extraneous matter in the fluid drops into the recess at the inlet side of the meter, and any matter which may have a tendency to adhere to the under edge of the blade will be scraped off by shoulder 167 and drop into the recess, thus preventing scoring of the floor of the measuring chamber or damage to the ends of the blades, and eliminating frictional drag or jamming which might otherwise occur.

There will be some slippage of the fluid through channels defined by internal housing faces and the opposed faces of the rotor and blades, and consequent leakage into the interior of the rotor, though, during operation of the meter, slippage through slots 51 into the rotor is reduced to a minimum since the blades, as they enter the fluid body, are being projected in a direction tending to counteract such slippage flow. Openings 53 and 116 in web 42 and cap 115 (Figs. 22 and 23) respectively, put the space above the rotor web and the interior of the rotor into communication with the settling chamber 21, and, assuming gasoline is the fluid being metered, water present in the fluid may be occasionally drained by removing plug 168 (Fig. 1).

Of course, all relatively heavy extraneous matter in the fluid body within the rotor sinks into the settling chamber where provision is made for its extraction, as follows, it being understood that this matter may include metal chips or core sand remaining within the meter after assembly or metal particles which may become detached during meter operation. The rotary motion of the rotor imparts swirling movement to the fluid in chamber 21 (Figs. 1 and 10), throwing it outwardly toward wall 22 and driving it through one end or the other (depending upon the direction of rotation) of filtering chamber 24. The fluid is thus forced to pass through the filter gauze 31 before it can re-enter the settling chamber, the gauze extracting such extraneous matter as may be present and thus preventing this matter from finding its way back into the rotor or between any moving parts, all to obvious advantage. When a given filter sleeve becomes impregnated with foreign matter, it may be readily replaced with a fresh sleeve.

Such fluid as slips past the blade or across the ends of the rotor (and which may be considered as passing from inlet to outlet through slippage channels K and L defined by the opposed and spaced walls of the casing and rotor elements) is, of course, unmeasured since it is not represented by an effective impulse on the rotor blades, and therefore it is unregistered on the registering mechanism operated by that rotor. However, the provision of return passage P compensates, at least in part, for this inaccuracy. That is, a certain amount of fluid clings to the outer peripheral wall of the rotor as it passes from the measuring chamber, and, rather than being delivered through the outlet, part of this fluid is carried by fluid wall-friction or cleavage through return passageway P and is thus returned to the inlet side of the flow passage whence it passes again to the measuring chamber, it being noted that the direction of fluid-travel through passageway P is opposite to that naturally expected by reason of the pressure at the inlet of the flow channel.

Now the fluid which is thus returned to the measuring chamber has been previously measured and indicated on the meter register in spite of the fact that it was not delivered through the outlet, and thus represents measured but undelivered fluid, hence having the effect of compensating for or balancing slippage fluid which has been delivered, but has not been measured. This effect may be expressed as the compensation for slippage past the blades by return of fluid past the barrier block.

The amount of return flow depends upon the clearance between the rotor and lugs 157 and 158 which, in effect, cut down, to a predetermined dimension, the thickness of the film of fluid adhering to the rotor, and the parts are proportioned and relatively positioned to give a clearance which will most nearly compensate for the average slippage of the average meter, as determined by test. For instance, where the blades clear the arcuate wall of the measuring chamber by .001", it is found that a clearance of .002" between the rotor and lugs 157 and 158 allows such return flow as will approximately compensate for the slippage arising from the specified blade clearance. Of course, these dimensions are given merely by way of example and are not to be considered as limitative. It has been found by repeated tests that the compensation effected by the return flow acts as described irrespective of the angular velocity of the rotor.

In a variational embodiment to be described later, the barrier block is adjustable in order to provide for varying the clearance between the rotor and barrier-lugs, and thereby varying the amount of return flow to compensate for slippage of different amounts. However, in the instant embodiment, the barrier block is fixed and the final adjustment of the meter to compensate accurately for the particular slippages and mechanical inaccuracies of the meter is accomplished through a change-gear mechanism to be described.

Now it will be noted that barrier 148 is of considerable angular extent and if the return passageway P were, from end to end, the width of the clearance between the rotor and the barrier lugs, the extremely narrow restriction would be of such length that considerable fluid-drag would be imposed on the rotor and thus impair the general efficiency of the meter. However, by reason of enlarged clearance 156 between the lugs, this drag is reduced to a negligible amount without destroying the benefit of the relatively small clearance between rotor and lugs. Further, the relatively narrow surface presented by the lugs render them, in effect, "self-cleaning" and prevent gumming. It is also to be noted that the narrow lugs are much more easily machined to secure accurate, predetermined spacing from the rotor body than would be surfaces of wider extent.

At 170 (Fig. 1) is indicated a ring having a downturned flange 171 whereby it is held in spaced relation to cap 12, this ring being bolted at 172 to the cap. Bolted at 173 to ring 170 and closing off the central opening of that ring, is a plate 174, the plate and ring defining with cap 12 a gear box 175. Plate 174 supports the registering mechanism generally indicated at S and, since this mechanism may be of any suitable type it is indicated merely conventionally, but it will be assumed that it is driven from gear 176 on shaft 177 which is journaled in a plate boss and extends to the interior of gear box 175. A register housing is indicated at 178, this housing having windows 179 whereby the registering mechanism S may be viewed.

Considered broadly, the drive from pinion 99 to gear 176 may be accomplished by any suitable gear train which will properly coordinate the rotor movement (considering its predetermined capacity per revolution) with the register mechanism. However, I have provided a novel change-gear mechanism which is particularly advantageous as it allows for compensation of individual inaccuracies of given meters.

It is practically impossible to machine and assemble a meter wherein the showing on the register will correspond exactly with the actual output of the meter, no matter how carefully the calculations are made or how accurately the machining and assembling are done. Each meter has its own peculiarities, one having a slightly oversize or slightly undersize measuring chamber, one allowing more or less slippage than has been calculated, one having more or less frictional drag than was estimated, etc. By virtue of the change-gear assembly to be described, measured quantities of fluid may be passed through the meter during test periods and the change-gear altered until an accurate reading is had.

In describing the gear train, reference will be had mainly to Fig. 25, since the showing in Fig. 1 is relatively small. It is to be noted that Fig. 25 is, in certain respects, a developed view; that is, a gear which lies behind the gear at the extreme left of Fig. 1 is here brought around into the sectional plane while the clamp bar at the left of Fig. 1 is swung through 90°. This is done to enable a sectional showing of the entire gear train in a single view.

Shaft 132 extends upwardly through bore 180 and counterbore 181 in cap 12 (Figs. 1, 16, 17 and 25) a gland 182 being positioned over spring 183 at the bottom of the counterbore. Packing 184 is interposed between this gland and a stationary gland 185 which is held shouldered on cap boss 186 by a clamp bar 187 bolted to the cap at 188 (Figs. 1 and 6). Spring 183 constantly urges the gland or follower 182 upwardly in a manner to compensate for packing wear and thus constantly maintains the shaft packed-off.

Pinion 190 (Figs. 1, 6, 7, 16, 17 and 25) is removably applied to shaft 132, the upper end of said shaft being flattened as at 191 (Fig. 25) to enter a complementarily formed opening in key washer 192 which has depending pins 194 entered in sockets extending vertically through the pinion. Washer 192 thus has driving connection both with shaft 132 and pinion 190, forming, in effect, a readily removable key whereby pinion 190 is driven by rotor rotation through pinion 99 and gear 131.

Set centrally in plug 136 is a stationary shaft 196 upon which is journaled a gear 197 meshing with pinion 190 and rotating on top of plug 136. Gear 197 is socketed to take pins 199 depending from any chosen gear 200 which, in turn, meshes with gear 201 journaled on stub shaft 202. Gear 201 is socketed to take pins 203 depending from gear 204, likewise mounted on shaft 202. Gear 204 meshes with gear 205 which has bearing on shaft 196 but is capable of rotation with respect to gear 200. Gear 205 is socketed to take pins 206 depending from gear 207, the latter meshing with gear 208 which is fixed on shaft 177 which carries a second gear 209. It will be noted that in Fig. 6 gear 208 and dog 139 have been shifted from the positions indicated for them in Figs. 1 and 25, this being done merely to distribute the showing of the elements in order to avoid confusion and yet showing as many associated elements as possible in single views.

It will be seen that the drive from the rotor to register shaft 177 is through the following train; pinion 99, and gears 131, 190, 197, 200, 201, 204, 205, 207, and 208. Preferably, one of the gear pins in each case is carried rigidly by one gear but may be freely slipped into or out of the socket of the companion gear. Hence the gears may be readily removed and interchanged, or other gears, similarly equipped with pins and sockets, may be substituted to give an infinite number of gear ratios and thus allow minute variations in the angular velocity of shaft 177 with respect to the angular velocity of pinion 99 and hence of rotor R. Thus, any discrepancy between the register reading and the actual output of the meter as independently measured, may be easily compensated by simple gear changes. The correction is of course originally made when the meter is assembled, but gear changes may also be made with but little trouble after the meter is in service to correct any inaccuracies which may develop from wear or the like.

It has been assumed that the rotor has a given direction of rotation which, with the gear train in the condition so far described, will drive the register shaft 177 in the direction proper for operation of the register mechanism. Now, if the inlet and outlet of the housing are connected up so the rotor is given a reverse direction of movement, means must be provided for altering the gear train so the register shaft will continue to rotate in the given direction.

Referring to Figs. 6, 16, 17 and 25, it will be noted that there is provided a pinion 210 mounted for rotation on shaft 211. In Figs. 16 and 17, gear 197 is displaced from its actual position in order better to illustrate the operative association of the gears. Pinion 210 is meshed with pinion 190 but is only half as wide, its teeth being above the plane of gear 197. Thus, pinion 210 plays no part in the gear train when in the position of Figs. 6, 16 and 25, it being mounted on shaft 211 merely so it may always be available should occasion for its use arise.

If the rotor direction is reversed, pinions 190 and 210 are interchanged, as illustrated in Fig. 17, pinion 210 then being drivingly connected to shaft 132 by key washer 192. Gear 190 now becomes an intermediate gear between pinion 210 and gear 197 and thus acts to maintain the direction of rotation of shaft 177 proper to register-operation, in spite of the fact that the direction of rotation of shaft 132 has been reversed.

In connection with the description of the several variational embodiments of the invention, most of the elements are similar to and operate in the same manner as those of the structure illustrated in Fig. 1. Accordingly, description of these parts, their assembly and operation, will not be repeated here, but the elements will be given the same reference numerals so the earlier description will apply. In some cases where only minor changes have been made, the corresponding reference numerals will be primed or given exponents.

Fig. 27 is a fragmentary sectional view taken through a lower corner of a meter, showing variational anti-frictional means for supporting the blades from the rotor. It will be understood that the structure shown in this view will be repeated beneath each blade when this particular supporting expedient is used. In place of roller 122, I here show a ball 122' confined in a radial groove 118' sunk in the upper face of flange 117', with blade 62 riding on top of the ball. The ball is limited in its movement radially of the flange by opposed shoulders 212, and preferably a dirt trap 213 is sunk at one end of the groove. It will be seen that ball 122' functions in the same general manner as that described in connection with a given roller 122 to take the weight of the overlying blade and support it for free shuttling movement. The ball-support has the advantage that it needs no axial bearing, as do the rollers of Fig. 1, thus simplifying construction and allowing freer movement.

In Figs. 28 to 30, inclusive, I have illustrated a variational embodiment wherein the entire structure is generally similar to that shown in Fig. 1 and the associated views, except that the blade units are anti-frictionally supported from the rotor body through the rock arm assembly rather than from the flange at the base of the rotor; and, in place of the shuttle rollers, the diametrically opposite rock arms are connected by a yoked link, the ends of the link serving as shoulders whereby the shuttling thrust imparted by the cam is transmitted to the blades, thus dispensing with the shuttle rollers.

Rock arms 69'' are generally similar to rock arms 69a and are mounted for swinging movement in the same manner as that described in connection with arms 69a. They differ in that shafts 78' are shown integral with the rock arms proper, and in certain provisions at the ends of these shafts.

A link 214, yoked as at 215 to clear cam shaft 40 and positioned above cam 80, has its terminals 216 drilled to have bearing fit with shafts 78', the lower faces of these terminals engaging the inner race of cam rollers 73 which, in turn, are supported on shoulders 217 of the rock arms. The end faces 218 (Fig. 29) of terminals 216 are arcuate and engage the complementary shoulders 65 of blade unit 61a. On top shafts 78' are cups 219 (Fig. 28) in which are loosely mounted balls 220, these balls engaging the under face 221 of yoke web 222, exposed to which face may be hard-metal inserts 221'; thus taking the weight of unit 61a to maintain the proper horizontal alinement of that unit and the proper clearances between the blades and associated housing and rotor parts. It will be seen that the thrust imposed on cam rollers 73 by cam 80 is transmitted to the blade unit through terminals 216, shuttling movement thus being imparted to the blade units as has been previously described.

Balls 220 on the bodily swinging rock arms thus provide for the anti-frictional support of the blade units during their shuttling movement to the advantageous ends pointed out in connection with the structure of Fig. 1, though the point of blade-support varies from that shown in said figure. The link connection between opposite rock arms does not, of course, interfere with the bodily swinging movement of the individual arms due to the pivotal connection of the link with shafts 78' and the provision of ample clearance between shaft 40 and the yoke arms of the links.

Rock arms 69' (Figs. 29 and 30) are generally similar to rock arms 69, except that shafts 78' are integral with the arms and the upper ends of those arms are socketed at 223, in axial alinement with shafts 78', to take balls 224. A yoked link 225, similar to link 214, forms a link connection between shafts 78'. In this case link 225 is positioned below cam 80 and below cam rollers 73 and the shoulders 227 of terminals 226 engage shoulders 65 of blade unit 61' to impart the shuttling thrust to that unit, while the terminals engage unit shoulders 226' to hold the link from dropping.

Lugs 228 extend radially inwardly from blades 62 and overlie balls 224, hard metal inserts 229 preferably being cast in the lugs to take the wear incidental to relative movement between the blade units and rock arms, it being understood that the weight of unit 61' is taken on balls 224 so that rock arms 69' function to provide an anti-friction support for the blade units, just as was described in connection with the showing of Fig. 28.

For reasons of assembly, lugs 228 are separable from their blades, being detachably secured thereto by bolts 230 and having portions 231 thereof set in blade recesses 232 in order to form a better tie therebetween.

In the variational embodiment illustrated in Figs. 31 to 48 inclusive, most of the parts are generally similar to corresponding parts shown in Figs. 1–26, and therefore are given the same reference numerals to avoid the necessity of repetitive description, either of their structure or operation. Outside of certain changes which will be described later, the main point of distinction presented by this variational embodiment lies in the nature of the spring-support of the rotor. In the embodiment of Fig. 1, the rotor is held positively against movement downwardly along shaft 40, while the shaft is spring-supported from the housing so it and the rotor are capable of moving downwardly as one with respect to the housing and against spring 38. In the embodiment now to be described, the cam shaft 40' is held rigidly against movement with respect to the housing while rotor R is spring supported on the cam shaft and is movable downwardly with respect thereto against the resistance of the supporting spring. Thus, in both cases, the rotor is movable downwardly with respect to the housing against spring-pressure to relieve the thrust-bearing support of the rotor from jarring effects, as explaned in connection with Fig. 1.

The hub 34' of base 13' has a bore 235 and a conical counter-bore 236, a keyway 237 being sunk in the wall of bore 235. When the rotor and its shaft are lowered into the housing, the shaft is centered by bore 235, key 238 establishing the position of the shaft and its cam 80' with relation to cooperating rotor parts, and the inner race 85 of radial bearing 86 lying between the top of hub 34' and annular shoulder 239 on shaft 40'. A longitudinally-split wedge-cone 240 is then entered in counterbore 236 about the shaft, the cone having a keyway 241 to accommodate key 238, and nut 242 is threaded on the end of the cam shaft and turned up against wedge cone 240, forcing it tightly into counterbore 236 and bringing shoulder 239 tightly against race 85, thus tying the cam shaft rigidly in centered position with respect to base 13' and barrel 11.

A lock washer 243 may be interposed between the cone and nut, with one locking lug 244 turned into keyway 241 and another locking lug 245 turned against a side face of the nut. Suitable clearances 247 and 248 are provided to prevent premature shouldering of the shaft-holding assembly, and to permit subsequent take-up of that assembly should occasion therefor subsequently arise. A protective cap 249 is bolted to the underside of the base to protect nut 242 and the end of the cam shaft, and also to seal off fluid which may leak through the cone-splits.

Cam 80' is keyed at 81 to cam shaft 40', but is here held against an integral, upwardly facing shoulder 251, rather than against the end of a spacer such as 83 in Fig. 1.

When cover 12' is placed in position, its under face engages annular shoulder 252 of the cam shaft, and a nut 253 is threaded on the end of that shaft (which in this case projects through and to a point above cover 12') to take the cover tightly down onto that shoulder 252. Thus, the cam shaft with its nuts and shoulders, serves as a tie from cover to base at the center of the meter, giving obvious structural advantage, particularly where relatively high internal fluid pressures may develop.

Surrounding shaft 40' and seated on cam 80' (which cam may from this aspect be considered as a shoulder on the shaft), is a supporting spring 38', on top of which is a sliding collar 254 (Figs. 31 and 44) carrying a cross-head 255 which is in the form of a cylindrical pin extending through a vertically elongated cross-slot 256 in the cam shaft. Intersecting slot 256 and extending therefrom axially of the shaft to the upper end thereof, is bore 257, the upper end of this bore being internally threaded at 258. A depressing plunger or actuator 259 extends through the smooth portion of the bore and projects into slot 256 where it bears at its lower end against pin or cross-head 255, the latter preferably being milled flat at 260 to receive the end of the plunger, the milling forming, in effect, a cross-head socket, and the seating of the plunger in this socket limiting longitudinal movement of the cross-head.

In order to hold cross-head 255 against rotation, which might otherwise carry flat 260 out of proper alinement with plunger 259, I provide said cross-head with a pin or key 259' (Fig. 44) which fits within the keyway or slot 260' of collar 254.

Threaded in bore 257 at 258, is an adjusting or control plug 261 having a head 262 (Figs. 31 and 43) provided with spanner-wrench sockets 262' and a serrated edge 263. A lock or jamb nut 264 is threaded on the plug against the end of the cam shaft. Nut 264 is adapted to coact with the top of the shaft to take up any thread-looseness between the adjustment plug and the shaft and thus minimize leakage through the thread-joint.

The inner race 87 of radial bearing 88 rests on top of the sliding ring 254, and thrust bearing 100 (Fig. 37) is interposed between this race and the under face 265 of plate 266, which corresponds to flange 97 of container 94 in Figs. 1 and 12, this plate being bolted at 267 to the hub 45' of rotor web 42'. In this case, the hub bore 268 directly receives radial bearing 88 and thrust bearing 100 (in place of the container 94 in Fig. 1) the outer race 103' of bearing 88 having sliding fit in the hub bore, and compression spring 101' serving automatically to take up wear in this bearing, as was described in connection with the showing of Fig. 1.

Radial bearing 88 and thrust bearing 100 are slidably mounted on the cam shaft, spring 38' exerting a constant tendency to move collar 254 and hence (through bearing race 87 and thrust bearing 100) to move the rotor with all its contained parts upwardly toward cover 12'. The upward extent of this movement is limited by plunger 259 and adjustment plug 261, it being obvious that by unscrewing that plug slightly, the spring is allowed to raise collar 254 and hence rotor R upwardly a corresponding distance, and that opposite movement of the plug depresses the sliding collar against the tension of spring 38' to allow the rotor and its parts to descend by gravity a corresponding distance. Thus, by proper manipulation of plug 261 it will be seen the rotor may be adjusted vertically within the housing, rollers 73' merely sliding vertically over the face of cam 80' during this adjustment, in order to give the desired clearances between housing faces 18, 19 and the opposite ends of the rotor, as was described in connection with Fig. 1. At the same time, it will be noted that if the meter be exposed to downward, jarring movement, spring 38' relieves thrust bearing 100 from the shock incident to such movement, to the advantageous ends spoken of in connection with the discussion of this feature as applied to the structure of Fig. 1.

It will be noted that the outer race of lower radial bearing 86 has sliding fit within the bore 270 of hub 271 which extends upwardly from rotor cap 115'. The spring 112 which lies within this bore and is interposed between the outer race and the in-turned flange 272 on the hub, serves automatically to take up bearing-wear and prevent even slight radial displacement, as was described in connection with Fig. 1. The spring also permits vertical movement of cap 115' along the shaft when the rotor, proper, is moved along that shaft either by adjustment of plug 261 or by reason of vertical jar. The extent of possible movement of the rotor along the shaft is limited, of course, by the vertical extent of slot 256, so that opposite walls 273 and 274 thereof may be considered as positive stop shoulders effective during the assembly of the rotor, while the lower end of plunger 259 may be considered as an adjustable stop shoulder, though it will be understood that after the rotor is in the housing, shoulders 273 and 274 do not contact pin 255.

Bolted to cover 12' and overlying the upper end of shaft 40' with its nuts 253, 264 and plug 261, is a cap 277 (Figs. 31, 41, 42 and 43) having internal lugs 278 (Fig. 41) and 279 (Fig. 43) serving, respectively, to engage the corners of nut 253 and the notches of head 262 to hold said nut and the adjustment plug in adjusted position. The cap also serves as a protector for the elements housed therein, and preferably a gasket 280a (Fig. 31) is interposed between cover 12' and cap 277 to prevent leakage of fluid which has found its way into the cap-interior around the shaft or through its terminal bore.

The body member or annulus 50' of rotor R is generally similar to body member 50 except for the hub characteristics previously described, the inclination of web 42' giving this member conical characteristics and thus stiffening the body member 41' better to resist the tendency of its split side-walls to be relatively displaced in a vertical direction.

Cam 80' is similar to cam 80 except that it has the hub 80'', one end of which engages shaft shoulder 251 and the other of which receives the end of spring 38'.

Rock arms 280 and 281 are generally similar to and mounted in the same manner as rock arms 69a and 69, respectively, except that shuttle rollers 77' are here shown of anti-friction type and of the same diameter as cam rollers 73'. Each roller includes a bushing 282 (Figs. 45 and 46) fitted on spindle 72' which is press-fitted into the bore of the rock arm, a bearing washer 283 spacing the rollers apart to allow their independent rotation. The rollers are retained against displacement longitudinally along the spindle by arm-shoulders 284 and wire-and-ring retainers 285 which are applied to the grooved end of the spindle.

The blade units 61 and 61a are generally similar to those shown in Fig. 1 except that the yoke arms are connected by cross ribs 285a (Figs. 31 and 44) to stiffen the yoke webs and give them casting greater torsional resistance.

Preferably, though not necessarily, hard-metal inserts 286 (Figs. 31 and 34) are cast into the lower, inwardly extending edges 64 of blades 62, providing wear shoes for engagement with ball-bearing rollers 122''. The inserts have upwardly extending and spaced lugs 287 which are pierced as at 288 so, in casting the blades, the metal will run into the piercings and between the lugs to key the shoes solidly to the blades.

Rotor cover 115' is generally similar to cover 115 except for the specified changes in hub construction, the elimination of annular shoulder 121a and the addition of a counter-groove 303 (Figs. 47 and 48) concentric with groove 121. Flange 49 is eliminated from the bottom of the rotor body, but otherwise the pin-and-screw connection between the body member and the cap is the same as that described in connection with Figs. 1 and 3. However, in this case, spring clips 124', which serve the same office as clips 124, are seated in counter-groove 303, the walls of that groove holding the clips from rotational displacement about screws 126. By this provision, the necessity of the turned-up tongues 127 of Fig. 3 is eliminated. Otherwise, the mounting of rollers 122'' is that described in connection with Figs. 3 and 4.

Extending upwardly from base 13' into settling chamber 21' are spaced bosses 289, 290 and 291 (Figs. 31 and 40). Vertical rib 292 connects bosses 289 and 290, while rib 293 connects bosses 290 and 291. A short radial rib 294 extends from hub 34' to wall 22', a rib 295 connecting this cross partition with boss 289. Extending from boss 291 toward but stopping short of cross rib 294, is a rib 296, a drain port 296a closed by plug 296b being disposed between the end of rib 296 and rib 294.

An annular baffle plate or settling-chamber cover 297 is disposed on top the bosses and the partition T formed by the several ribs which extend substantially centrally through the annular settling chamber, it being noted by reference to Fig. 31 that cross rib 294 is a little lower than the other ribs to provide clearance space 298 beneath the cover 297. Cover 297 is held in position by flush-head screws 300, the positioning being such that there are provided slight annular clearances 301 and 302 between the cover and settling-chamber walls 23' and 22', respectively.

Extraneous matter in the fluid within the rotor finds its way into the settling chamber through rotor-cap drains 116' and clearances 301 and 302, falling to the bottom of that chamber. Thereafter the fluid swirling beneath the rotor is prevented from picking up this matter and returning it to the rotor assembly. Any tendency of the swirling fluid to set up cross currents in the settling chamber, and thus carry out the debris, is checked by partition T, while partition 294 checks the tendency of the fluid to swirl circumferentially of hub 34' beneath the settling chamber cover.

Now it has been previously said that plate 266, which is bolted to the rotor hub (Fig. 31), takes the place of container-flange 97. In Fig. 1 pinion 99 was shown as press-fitted into the bore of said flange, but in the present embodiment pinion 99' (Fig. 37) is integral with plate-ring 266. The gear 131' which meshes with pinion 99' is generally similar to gear 131 in Fig. 1, but a thrust bearing 304 is interposed between the hub of this gear and the under side of cover 12'. Otherwise the mounting of the gear is the same, shaft 132 being packed-off at 186, just as described in connection with Fig. 1. However, gear 131' is provided with a port 131'' whereby, in case the flange f of the gear should engage the under face of cover 12', fluid will be admitted above the gear substantially to equalize the fluid pressure above and beneath the gear and thus prevent it from binding against the cover.

The gear train from shaft 132 to shaft 177' (corresponding to shaft 177 in Fig. 1) is essentially the same as that described in Fig. 1, and therefore the same reference numerals will be given to the gears, key-washers, etc. However, most of the numerals will be applied to the enlarged view, Fig. 37, which is in the nature of a development, to bring all meshing gears into a common sectional plane. As was noted in the brief description of the figures, Figs. 37 and 38 are developed sections on lines 37—37 of Fig. 35 and 38—38 of Fig. 36, respectively, with gear 208 and shaft 177' viewed as though they occupied the dotted line positions in Figs. 35 and 36. In this case gears 197, 200, 205 and 207 are mounted on shaft 196' which extends upwardly from the cover, proper, instead of from plug 136, as in Fig. 1, and shaft 177' is in axial alinement with cam shaft 40' (Fig. 31) instead of being offset therefrom as in Fig. 1, but generally the shaft and gear mountings may be considered as similar. In Figs. 31 and 37 the member which supports shaft 177' is integral with cap 170' instead of being provided on a separate plate member, as in Fig. 1, but it is depressed as at 305 to drop its shaft 177' into close proximity with cap 277. In order to give shaft 177' ample bearing support, a depending boss 306 is provided, the web of gear 208 (Fig. 31) inclining upwardly and outwardly from its hub and about boss 306 to bring the gear teeth in a plane to mesh properly with gear 207.

Between gear 176' and registering mechanism S' I preferably provide a safety and check mechanism indicated generally at W (Figs. 31, 37 and 39). Depending from plate 174 is a stub-shaft 307 on which a sleeve 308 is detachably held by pin 308'. Pinion 309, meshing with gear 176', and gear 310 are mounted for individual rotation on sleeve 308, the sleeve-flange 311 holding them against longitudinal displacement. Pawl 312 is pivoted on the under face of gear 310 and is spring-pressed into engagement with the teeth of pinion 309 in a manner whereby counter-clockwise rotation of the pinion (as viewed from beneath, see Fig. 39) imparts, through the pawl, like rotation to gear 310, the latter rotating gear 313 on shaft 314 in a clockwise direction. The hub of gear 315, on shaft 314, has a cam face 316 terminating in a shoulder 317, pawl 318 being spring-pressed into engagement with the hub in a manner to engage shoulder 317 and thus prevent counter-clockwise rotation of gears 313 and 315 (as viewed in Fig. 39) but yielding to allow clockwise rotation thereof. Gear 315 is thus adapted to transmit clockwise rotation to gear 319 (Fig. 31) of register mechanism S' to drive the latter.

Now assuming rotor R be rotated in a clockwise direction (Fig. 33) and that the gear train be in the condition of Figs. 35 and 37, it will be seen that gear 319 will be driven in a clockwise direction (Fig. 31) which is proper to operation of the registering mechanism, through the following train; pinion 99', gear 131', shaft 132, key-washer 194, gears 190, 197, 200, 201, 204, 205, 207, 208, shaft 177', gears 176' and 309, pawl 312, gears 310, 313, shaft 314, and gear 315. It will be noted gear 210, which is now on shaft 211, revolves idly, since it lies in a plane below gear 197. As was stated in connection with the showing of Fig. 1, the gears may be readily interchanged or other gears may be substituted to give an infinite number of gear ratios and thus allow minute variations in the angular velocity of shaft 177' with respect to the angular velocity of pinion 99' and hence of rotor R, all to the end of compensating for variable factors, as has been previously explained.

If rotor R is to be rotated in a counter-clockwise direction (Fig. 33) gears 190 and 210 are interchanged as in Figs. 36 and 38, gear 190 now serving as a reversing gear between shaft 132 and gear 197, it following that the gears from 197 to 315 are rotated in the same direction as before, in spite of the reversal of the rotor, and thus give a direction of rotation to gear 319 proper to operation of the registering mechanism.

It has been found that attempts are sometimes made to alter the meter-reading by rotating the rotor in the direction opposite to that which gives a proper additive registration on mechanism S', whether that direction be clockwise or counter-clockwise, depending upon the relative positions of gears 190 and 210. This deceptive operation has been accomplished, for instance, by directing an air blast against the rotor blades to drive the rotor and hence the registering mechanism backwards and thus subtract from the indication of fluid previously metered. These attempts are defeated by safety mechanism W for such reversal of the rotor causes pinion 309 to rotate in a clockwise direction, as viewed in Fig. 39, thus merely "clicking" pawl 312 and imparting no drive to gear 310 or the registering mechanism beyond. Pawl 318 positively prevents reverse operation of gears 315, 313 and 310 and hence of the registering mechanism but this positive stoppage of one part of the gear train, while the remainder of the train is operating reversely, has no harmful effect due to the provision of ratchet or clutch connection 309—312.

Barrier block 148' (Figs. 31 and 33) is generally similar to block 148 except that it has a pair of horizontal ribs 321 between flanges 150' and has a pair of ports 322 and 323 extending through plate portion 149, both these ports opening to space 324 between the plate portion 149 and housing annulus 11, port 322 being immediately below upper flange 150', and port 323 being approximately midway between the lower rib 321 and the bottom flange 150'. These ports prevent the trapping of air in passageway P and solid foreign matter, which may find its way into that passageway along with the fluid, is free to pass through the ports into space 324 where it settles out, the space thus serving as an auxiliary settling chamber.

In connection with Figs. 31 and 32 I have also shown a variational type of packing joint between the flanges 14' and 15' of barrel and end plates 12' and 13'. In this case gasket 17' is fitted in the groove 325 sunk in the inner face of flange 15', the fit being such that the gasket will come off with the cover when the latter is removed. Clearance grooves 326 and 327 are cut in the opposed face of flange 14', groove 327 extending to the inner peripheral face of annulus 11, though the corner is preferably chamfered as at 328, while groove 326 extends radially beyond each side of annular shoulders 329 defining the outer extent of groove 325. Any excess packing in groove 325 will be taken in clearance grooves 326 and 327 when the housing parts are initially assembled, assuring that the outer extent of the flanges may come into metal-to-metal contact and thus definitely space faces 18 and 19 (the significance of which was made apparent in connection with the description of Fig. 1). Likewise, these grooves are adapted to receive the mutilated or mashed edges of the packing which may result from removal of the cover, though the chamfer 328 and grooves 326, 327 together with the recessing of the gasket into the underface of flange 15' practically eliminates the danger of damage to the gasket during cover removal.

The various clearances between the rotor parts and the opposed housing and abutment walls, as well as the characteristics of the flow channels and ports, are substantially the same as described in connection with Figs. 1 to 29.

I will now refer to Figs. 49 to 56, inclusive, which represent views corresponding to a part of the disclosure in my aforementioned application #673,431 and the subject matter of which is made a part hereof as a continuation, in part, of that application. I will individually describe only such elements and features of operations as represent a departure from the showing of Figure 1, with the understanding that the description of Figs. 1 to 26 will apply to all similar parts (they being given the same reference numerals) and to the operation of those parts.

Here the cam shaft 40" is keyed against rotation at 238' to the hub 34" of base plate 13", bottoming on the replaceable, hardened and ground adjustment block 331 which is disposed in hub-bore 35".

Rotor assembly or impeller mechanism R" is supported on this shaft through bearings 86a and 93a in a manner to preserve clearances K, L and 159 as described in connection with foregoing views.

Cam 80" is keyed to shaft 40" at 81" and is held against shoulder 82" by spacer 83" which is positioned by the press-fitted inner race of bearing 93a. Cam rollers 73" are here carried directly by the blade units 61 and 61a (instead of on rock-arms as in Fig. 1), the ends of the yokes 63 of the latter being provided with spaced bosses 332 (Figs. 55 and 56) to take roller pins 333 (Fig. 49).

Blades 62 are supported, throughout their shuttling movement, in predetermined spaced relation with respect to wall 19 by the upper face 334 of rotor cover 115" which is secured to rotor body 41" by bolts 126", the body and cover having the interfitting flange and groove 49 and 121", respectively, to hold the body from spreading, as described in connection with flange 49 and groove 121 in Figs. 22 and 23.

Pinion 99" is press-fitted in the bore 97" of web-hub 45" and meshes with gear 131" on shaft 132" extending through cover 12". The packing of this shaft is accomplished in the same manner as that described in connection with Fig. 1. Pinion 190" on shaft 132" meshes with gear 335 on register shaft 336 which is journaled in thimble or bushing 337 in cover 12". Register mechanism S" is operated from shaft 336 but, since this mechanism may be of any suitable type, it is here indicated generally and need not be described in detail. When the flow of fluid through the meter is to be reversed, pinion 190" and reversing pinion 210" are interchanged, as in Fig. 49c to maintain the same direction of movement of the registering mechanism. Spacing collars 400 and 401, of different lengths, are placed on shafts 211" and 211 when the gear-set is in the condition of Figs. 49b and 49c, respectively, to bring gear 210" above the plane of gear 335 in Fig. 49b and to hold gear 190" in mesh with both gears 210" and 335 in Fig. 49c. Also a similar spacing collar 500 on shaft 132" in Fig. 49c supports gear 210" above the plane of gear 335.

Bevel pinion 402 is pinned to shaft 336 and meshes with gear 403 of register mechanism S" which indicates the output of the meter in gallons, for instance, and may be viewed through window 179. Disk 404, journaled on shaft 336, has an inclined flange 405 and a hollow hub 406 to the top of which a bevel gear 407, also journaled on the shaft, is keyed at 408, the gear hub engaging the hub of pinion 402 as an upward limit-stop. Compression spring 409 within the bore of hub 406 is interposed between gear 407 and disk 404 to press said disk downwardly upon friction washer 410 whereby the disk is frictionally driven from gear 335" to indicate the output of the meter in tenths of gallons, for instance; the indications, not shown, being provided on flange 405 and being viewable through window 411.

For manually resetting disk 404, I provide a shaft 412 extended through casing 170 and carrying on its inner and outer ends, respectively, bevel pinion 413 and handle 414. Spring 415 normally holds shaft 412 to the left, in Fig. 49, and thus retains pinion 413 out of mesh with gear 407. When it is desired to reset the disk, shaft 412 is thrust to the right for engaging pinion 413 with gear 407, whereupon rotation of the shaft rotates the gear and hence, because of key 408, rotates disk 404 to "zero" position, the disk slipping with relation to gear 335" during such rotation.

As was noted previously, such elements of the device as are substantially similar to corresponding elements of the first-described embodiment are given the same reference numerals, and the initial description of those elements, their operation and relationships may be considered as applied to the present embodiment. Thus it will be seen that slippage through channels L and K or elsewhere is partially, at least, compensated by liquid returned through corrective or return passage P.

In place of the change-gear mechanism previously described for compensating individual meter inaccuracies or variations in slippage, temperature changes, etc., there is here utilized a fluid by-passing system. Barrier block 148" has a vertically extending, central rim 337' which divides space 324' into two chambers 338 and 339. Passageway 340 opens from inlet 145 to chamber 338, and passageway 341 opens from chamber 339 to outlet 146, while passageways 342 and 343 open from chambers 338 and 339, respectively, to the vertical bore 344 at different horizontal levels (see Fig. 49). A valve member 345 (accessible after removing plug 346) is adjustable towards and away from seat 347 to vary the effective opening of by-pass B—P which extends from inlet to outlet and includes the following passageways and chambers: 340, 338, 342, 344, 343, 339, and 341.

By varying this effective opening, more or less fluid may be by-passed through the meter to bring the register reading into correspondence with actual meter flow as determined by test runs. Passageways 340 and 341 are so angularly disposed with reference to the inlet and outlet ports that a varying pressure differential will be developed between chambers 338 and 339 and which may be made to vary approximately in correspondence with the square of the velocity of the main flow of liquid through the meter. This will result in the by-pass flow doubling when the velocity of the main flow through the meter is doubled and hence cause the by-pass automatically to pass more or less fluid in exact correspondence with the main flow through the meter.

In Figs. 57–59, inclusive, I have illustrated rollers 350 mounted on shafts 351 which are, in turn, supported in bosses 352 provided at top and bottom of the rotor at opposite sides of slots 51, the rollers engaging opposite sides of blades 62 to serve both as blade alining members whereby the clearance between the blades and the defining walls of slots 51 may be maintained constant, and to reduce wear and the effects of side thrust. Since the effects of side thrust on the blades are thus cared for, the need for rock arms such as 69 and 69a is minimized, and hence cam rollers 73 are supported directly by the blade unit, as shown in Fig. 58.

In Figs. 60 and 61 I have illustrated a variation particularly adapted for use where the rotor is operated comparatively slowly or where the liquid being metered or pumped has a relatively high degree of viscosity. In either of these instances, centrifugal force cannot be depended upon to project the blades to their fullest extent and thus positively preserve proper clearances L, in the event there be lost motion between rock-arms and blade-units. The following arrangement insures such projection irrespective of rotor speed and fluid viscosity.

Rock arms 69" are extended beyond the roller shafts 72 as at 350 and terminate in hooks 351 to which helical extension springs 352 are attached. The opposite ends of the springs are applied to hooks 353 on the yoke 63 of the associated blade-unit 61a.

As the rotor revolves (for instance in a clockwise direction) and after cam roller 73 leaves dwell 162 the arm originally at the right of Fig. 60 is positively swung by cam 80 in a clockwise direction about its pivot 59 and this movement acts through shuttle roller 77 to project the right hand blade 62. However, since hook 351 is extended beyond the effective point of contact of the rock arm assembly with the blade unit, hook 351 moves outwardly faster than does the blade unit, having the effect of moving hooks 351 and 353 further apart and thus putting spring 352 under additional tension. At the same time the opposite spring 352 has diminishing effect as its associated rock arm leaves dwell 161 and consequently swings in a counter-clockwise direction. Thus, when the cam roller on the right hand rock arm reaches dwell 161, its spring 352 has been fully stretched to the extent shown in connection with the left hand rock arm and remains so stretched as long as the roller is on the dwell. That spring thus over-powers the opposite spring and resiliently urges the blade unit outwardly in a direction to take up any lost motion existing between the blade unit and rollers 77, this condition existing throughout the travel of a given blade through measuring chamber M and thus maintaining clearance or slippage passageway L at the desired and predetermined dimension.

I will now describe several variational provisions which may be incorporated with any one of the several meters so far described, it being unnecessary to discuss the elements associated with the variational features since they will be understood to be the same as before. However, such reference numerals have been applied to those associated parts as will tie them in to the detailed description previously given.

In Figs. 62 to 65, inclusive, I have illustrated modified housing ports. Here, again, ports 145' and 146' may be used either as inlet or outlet ports, but for purposes of description port 145' will be considered the inlet and port 146' as the outlet. These ports are precisely the same, in each case being elongated vertically and contracted horizontally as compared to the showing in Fig. 13a, a central rib 355, stream-lined to disturb the fluid-flow as little as possible, extending across each port midway of its height to tie the defining walls of the ports together against internal pressure.

Figure 19:
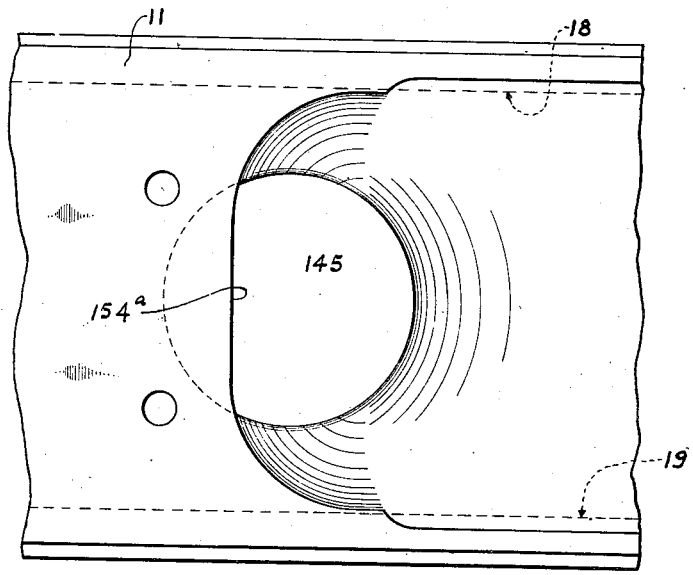
Fig. 19 is a detached fragmentary view of the housing-annulus as viewed from the position of line 19—19 of Fig. 18, the barrier block being omitted.
Figure 20:
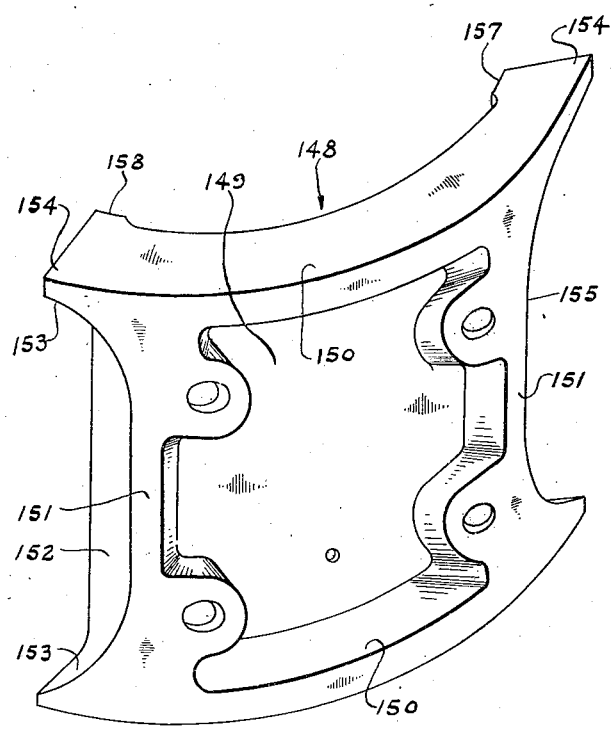
Fig. 20 is a perspective view of a barrier block.

Ports 145' and 146' extend vertically from face 18 to face 19, thus insuring that the fluid, when it is initially admitted to the meter after a shut-down, will sweep before it all air within the meter housing and thus eliminate air-trapping which may possible occur when the tops of the ports are spaced somewhat below wall 18, as indicated in Fig. 19.

In each case, ports 145' and 146' are fashioned so their cross sectional areas, at all points, will be substantially equal to that of flow passage C, for reasons given in connection with the description of Fig. 1, the web or rib 355 being taken into account when calculating the contour of the ports.

With the ports having these peculiar characteristics, it is desirable to have couplings or adapters whereby standard pipe may be attached to the meter housing without losing the benefits of the specified port-characteristics. For this purpose, I have provided couplings or adapters 356, one for each port. At one end, each adapter is provided with attachment flange 357 for taking bolts 358, and at its other end has an internally threaded socket 359 to take standard pipe. The passageway 360 extends from end to end of the adapter, the inner end 361 of the passageway being shaped to conform with the inlet passageway of the meter housing, and the passageway thence varying in shape to terminate finally in accordance with the circular shape of the threaded bore 359, care being taken that throughout the extent of this passageway there is no substantial variance in cross sectional area from that of the associated housing ports and consequently of flow passage C.

Now instead of centering threaded bores 359 with respect to webs 355, these bores are vertically offset so the top of the bore of a pipe (not shown) to be inserted in the bore of the adapter at the inlet will be approximately in horizontal line with the top 362 of passageway 360 and hence with the top 363 of port 145'. This arrangement, while it preserves the uniformity of cross sectional area from the bore of the inlet pipe clear to the bore of the outlet pipe, eliminates any shoulders between the inlet pipe and port 145' behind which air might be trapped and thus destroy the accuracy of the meter, it having previously been pointed out that the alinement of face 18 and the upper ends 363 of the ports prevents the trapping of air above the rotor.

While the adapter applied to the outlet port of the meter may be arranged in the same aspect as the one applied to the inlet, it is sometimes preferable to reverse it top for bottom as shown in Fig. 64, which reversal does not disturb the uniformity of flow or elimination of air trapping in any degree but has the advantage of eliminating any chance of dirt or water which has found its way through the meter from settling along inclined wall 364 of the adapter, which, in case the outlet adapter were arranged as in Fig. 65 would incline upwardly and outwardly from the bottom of the outlet port.

Gaskets 365 may be interposed between the housing and adapters to insure fluid tight fits.

I have previously stated that the compensation for unmeasured slippage fluid may be varied by altering the clearance between the outer peripheral face of the rotor and lugs 157 and 158. In Fig. 66 I have shown means whereby the barrier block 148a may be adjusted to alter this clearance. In this case, the barrier block is pivotally mounted within the flow channel C on hinge pin 366. Block 148a has a hollow boss 367 which projects, with annular clearance, into opposed bore 368 in housing barrel 11, spring 369 being positioned in said bore about boss 367 and thus tending constantly to swing block 148a in a counterclockwise direction, as viewed in Fig. 66. Adjustably limiting the extent of swinging movement is an eye bolt 370 which extends through the bore of boss 367 into lost-motion connection with pin 371 supported by the block, bolt 370 extending in the opposite direction through housing wall 372 into cavity 373, where it takes wing-nut 374. It will be apparent that adjustment of nut 374 serves either to swing block 148a against the tension of spring 369 or to release that block for swinging movement by said spring, thus varying the effective size of return passageway P and, particularly, the effective sizes of the clearance passages 159a and 159b between the rotor annulus 50 and lugs 157 and 158, respectively.

In order to set wing-nut 374 and hence swinging barrier 148a in adjusted position, the hub of the wing-nut is serrated as at 375, the point 376 of a locking dog 377 being adapted to be extended into a registering notch 375 and then to be clamped in position by screw 378 to hold it against subsequent accidental movement.

A sealing blade 379 is carried by block 148a and projects with sliding fit into a recess 380 in barrel 11, serving to close off the passageway between the housing and the back of the block in all its positions of adjustment. Cap 381 is bolted to the housing over cavity 373 for protective purposes, there preferably being a gasket 382 interposed between housing and cap to give a fluid-tight joint and thus prevent leakage of any fluid which may have found its way to that cavity.

In Figs. 67–70, inclusive, I have shown a variational embodiment wherein the rotor blades are integral with the rock arms and, as regards a given blade unit, curve oppositely, there being a link connection between the rock arms to effect the retraction of one blade as its companion blade is being projected by the cam.

Thus the blades 62b of a given unit 61d curve oppositely and are integral with their associated rock arms 69d, the arms being pivotally connected to rotor body 50 at 59 and the curve of blades 62b being struck about the associated pins 59 as centers. The slots 51d in rotor 50 are curved to accommodate the blades.

Cam rollers 73 are carried on spindles 383 mounted in the vertically spaced lugs 384 which are integral with a given rock arm and its blade, at their point of intersection. A link 385, looped to accommodate cam shaft 40 with clearance, connects the two rock arms and blades of unit 61d by way of spindles 383.

Blade unit 61a is fashioned the same as unit 61d, the blades being indicated at 62e, the rock arms at 69e, the link at 385e, and the roller spindles at 383e.

All side thrust imposed on the blade units by cam 80 is transmitted through arms 69d and 69e to pins 59 and thence to body 50, thus relieving blades 62b and 62e from the effects of this thrust where they pass through the rotor body, to obvious advantage.

While I have shown and described preferred embodiments of my invention, it will be understood they are to be considered as illustrative of and not limitative on the broader claims appended hereto, for various changes in design, structure and arrangement may be made without departing from the spirit and scope of those claims.

I claim:

1. In a fluid flow mechanism, a casing having inlet and outlet ports, a rotor body mounted for rotation within the casing about a vertical axis, said casing and rotor body defining a flow channel extending between the ports, and rotor blades mounted for shuttle movement transversely of the flow channel and above and in facial opposition to a portion of the casing which defines the bottom of the flow channel, means for imparting shuttle movement to the blades upon rotation of the rotor body, the down-bearing load of said blades being imposed entirely on said rotor body throughout their shuttling movement and said rotor body supporting the blades in predetermined, vertically spaced relation with respect to the underlying portion of the casing.

2. In a fluid flow mechanism, a casing having inlet and outlet ports, a rotor body mounted for rotation within the casing about a vertical axis and above a portion of the casing, said casing and rotor body defining a flow channel extending between the ports, rotor blades mounted for shuttle movement transversely of the flow channel and above and in facial opposition to a portion of the casing which defines the bottom of the flow channel, means for imparting shuttle movement to the blades upon rotation of the rotor body, the down-bearing load of said blades being imposed entirely on said rotor body whereby said rotor body supports the blades in predetermined, vertically spaced relation with respect to the underlying portion of the casing, and a thrust bearing supported from said casing and taking the down-bearing load of the rotor body and supporting said rotor body in predetermined, vertically spaced relation with respect to the underlying portion of the casing.

3. In a fluid flow mechanism, a casing embodying a vertical barrel and end walls closing the bore of the barrel, said casing having inlet and outlet ports opening to a flow channel defined within the casing, a shaft extending within and axially of the casing, a rotor mounted on the shaft for rotation within the barrel and between the end walls, said rotor having blades adapted to have shuttle movement transversely of the flow channel during rotor rotation, said rotor embodying an annulus, a transverse wall across the annulus bore near one end thereof, a thrust-bearing between the shaft and said transverse wall and holding the rotor in predetermined relation with said end walls, a second transverse wall across the annulus bore near the other end thereof, and a radial bearing between said shaft and said second transverse wall to hold the rotor in predetermined relation with respect to the casing barrel.

4. In a rotor for fluid flow mechanisms, a body member including an annulus, a web across the annulus bore and spaced from one end thereof, the annulus having a plurality of slots extending longitudinally thereof and from end to end, an inturned flange at the other end of the annulus, said web and flange having radial slots registering, one each, with the annulus slots, and a cap applied to said flange and of smaller outside diameter than is the annulus.

5. A fluid flow mechanism comprising a casing having a cylindrical wall and having end closures constituting a fluid tight chamber, a vertically disposed rotor shaft fixed against rotation in the end closures, a rotor having anti-friction bearings journalled on said shaft concentric with and spaced from the cylindrical side wall to provide a flow passage, blades slidably mounted in said rotor and supported thereby, opposite blades being joined by yokes, and means operative in response to movement of the rotor for subjecting said blades to shuttle movement in such a manner that energy transmitted to the blades from the rotor during their acceleration period is returned to the rotor during their deceleration period of operation.

6. In a fluid flow mechanism, a casing having oppositely disposed segmental cylindrical walls of different radii with inlet and outlet ports intermediate the ends of said walls and having closure members at the top and bottom of said walls, a vertical shaft disposed between said closure members having journals thereon, a carrier suspended on the journals of said shaft out of contact with the walls and closures of the casing and forming flow passages with said walls, blades mounted for sliding movement in said carrier and supported entirely by said carrier, a cam mechanism in constant engagement with said blades to subject them to shuttle movement in response to movement of said carrier and to limit such shuttle movement to prevent contact of the blades with the walls, whereby the rotor and blades are constituted an anti-friction unit, the ports and flow passages being of substantially the same cross sectional area to cause fluid flow between the inlet and outlet ports to be at constant pressure and velocity.

7. A fluid flow mechanism comprising a casing having a cylindrical wall and having end closures constituting a fluid tight chamber, a vertically disposed rotor shaft fixed against rotation in the end closures, a rotor having anti-friction bearings journaled on said shaft and concentric with and spaced from the cylindrical side wall to provide a flow passage, blades slidably mounted in said rotor, rollers interposed between the blades and rotor and supporting the blades from the rotor for their sliding movement, opposite blades being joined by yokes, and means operative in response to movement of the rotor for subjecting said blades to shuttle movement in such a manner that energy transmitted to the blades from the rotor during their acceleration period is returned to the rotor during their deceleration period of operation.

8. In a fluid flow meter, a casing having angularly spaced inlet and outlet ports, a rotor body mounted for rotation within the casing, one side of the rotor body being positioned adjacent a portion of the casing between the ports, said rotor body and said casing defining a flow channel extending between the ports from opposite sides of said portion, rotor blades mounted for shuttle movement transversely of the flow channel during rotor rotation, and means holding said blades from contact with the casing walls and thus establishing slippage channels through which fluid may pass, there being a corrective passage provided between the rotor body and said portion of the casing and of a size to allow return passage of fluid from the outlet side of the flow channel to the inlet side thereof in an amount substantially equal to the flow of fluid through said slippage channels, said corrective passage being formed as a peripheral recess in said casing-portion, with narrower passages defined by said portion and the rotor body extending from opposite ends of the recess to the flow channel at opposite sides of said casing-portion.

9. In a fluid flow mechanism, a casing having inlet and outlet ports and a flow channel extending between ports, a vertically arranged shaft within the casing, a spring supporting the shaft from the casing, a hollow rotor body supported by said shaft, blades supported entirely by said body for shuttle movement transversely of the flow channel and extending through slots in the rotor body into the rotor hollow, and a cam on the shaft and positioned within the rotor hollow, said cam coacting with the blades to effect their shuttling movement upon rotor rotation.

10. In a fluid flow mechanism, a casing having inlet and outlet ports and a flow channel extending between ports, a vertically arranged shaft within the casing, a spring supporting the shaft from the casing, a hollow rotor body supported by said shaft, rollers supported by said body, blades riding on said rollers for shuttle movement transversely of the flow channel and extending through slots in the rotor body into the rotor hollow, and a cam on the shaft and positioned within the rotor hollow, said cam coacting with the blades to effect their shuttling movement upon rotor rotation.

11. In a fluid flow mechanism, a casing having inlet and outlet ports, a rotor body mounted for rotation within the casing, said casing and rotor body defining a flow channel extending between the ports, rollers supported by said rotor body, and rotor blades carried by said body and riding on said rollers for shuttle movement transversely of the flow channel during rotor rotation, said blades overlying a portion of the casing, and said rollers supporting said blades in vertically spaced relation with said portion.

12. In a fluid flow mechanism, a casing having inlet and outlet ports and a flow channel between ports, a hollow rotor body mounted for rotation within the casing, said casing and rotor defining a flow channel between ports, a roller supported by the rotor body, a rotor blade riding on said roller and adapted to have shuttle movement thereover transversely of the flow channel and extending through a slot in the body into the rotor hollow, a rock arm pivotally connected to the rotor body within its hollow, and a cam supported within the rotor hollow, said rock arm cooperating with the cam and blade to impart shuttling movement to the blade upon relative rotation of the rotor body and cam.

13. In a fluid flow mechanism, a casing having inlet and outlet ports and a flow channel extending between ports, a rotor body mounted for rotation within the casing, said casing and rotor body defining a flow channel between ports, blades slidably mounted in said rotor body and adapted to have shuttle movement transversely of the flow channel when the rotor is revolved, rock arms carried by the rotor and having rollers engaging the blades, and a stationary cam adapted to swing the rock arms to and fro during rotor rotation.

14. In a fluid flow mechanism, a casing having inlet and outlet ports and a flow channel extending between ports, a rotor body mounted for rotation within the casing, said casing and rotor body defining a flow channel between ports, there being radial slots in said rotor body, a plurality of blades in said slots and arranged in oppositely disposed pairs, yokes connecting the oppositely disposed blades of each pair, said yokes being in superposed relation, rock arms hingedly mounted on the rotor, a stationary cam in cooperative alinement with all said rock arms, a pair of rollers on each of said arms, one roller of each pair engaging an associated blade, and the other roller engaging the cam so that each connected pair of blades is simultaneously controlled by a pair of rock arms.

15. In a rotor for fluid flow mechanisms, a body member including an annulus, a web across the annulus bore near the upper end thereof, an inturned flange at the lower end of the annulus, a cap detachably secured to the lower end of the annulus, said annulus having a slot extending longitudinally thereof and the flange and cap having radial slots registering with the longitudinal slot, a roller supported by the cap and positioned in the cap-slot, and a blade riding on said roller for shuttle movement radially of the annulus through said annulus slot.

16. In a rotor for fluid flow mechanisms, a body member including an annulus, a cap detachably secured to the lower end of the annulus, said annulus having a slot extending longitudinally thereof and the cap having a radial slot registering with the longitudinal slot, there being a recess in said cap at opposite sides of the cap-slot, a shaft positioned in said recess and extending across the cap-slot, a roller on said shaft and extending upwardly into said cap-slot, and a blade riding on said roller for shuttle-movement radially of the annulus through said annulus slot.

17. In a rotor for fluid flow mechanisms, a body member including an annulus, a cap detachably secured to the lower end of the annulus, said annulus having a slot extending longitudinally thereof and the cap having a radial slot registering with the longitudinal slot, there being a recess in said cap at opposite sides of the cap-slot, a shaft positioned in said recess and extending across the cap-slot, a spring supporting said shaft, a roller on said shaft and extending upwardly into said cap-slot, and a blade riding on said roller for shuttle-movement radially of the annulus through said annulus slot.

18. In a rotor for fluid flow mechanisms, a body member including an annulus, a cap detachably secured to the lower end of the annulus, said annulus having a slot extending longitudinally thereof and the cap having a radial slot registering with the longitudinal slot, a shaft extending across and beneath said cap-slot, a pair of retention clips engaging, one each, the opposite ends of the shaft, common means securing the cap to the annulus and the clips to the cap, a roller on said shaft and extending upwardly into the cap-slot, and a blade riding on said roller for shuttle movement radially of the annulus through said annulus slot.

19. In an impeller mechanism for fluid flow devices, a hollow, cylindrical rotor body having a slot extending longitudinally thereof, a cam within the hollow of the body, a blade mounted for movement radially of the body through said slot and having its inner edge within the body-hollow, and a rock arm within the body hollow and pivoted to said body about an axis parallel to the body axis, means near the free end of said arm cooperating with the cam and blade to transmit thrust radially of the body from the cam to the blade upon relative rotation of the body and cam, said means being located in a plane substantially midway between the ends of the pivotal support of the rock arm.

20. In an impeller mechanism for fluid flow devices, a hollow, cylindrical rotor body having a slot extending longitudinally thereof, a cam within the hollow of the body, a blade mounted for movement radially of the body through said slot and having its inner edge within the body-hollow, and a rock arm within the body hollow and pivoted on said body about an axis parallel to the body axis, a roller on said rock arm and in contact with said blade, and a second roller on said rock arm and in contact with said cam.

21. In an impeller mechanism for fluid flow devices, a hollow, cylindrical rotor body having a pair of diametrically opposite slots extending longitudinally thereof, a cam within the hollow of the body, a pair of blades mounted, one each in said slots for movement radially of the body, a yoke connecting said blades, whose inner edges extend within the body hollow, and a pair of diametrically opposite rock arms pivoted to the rotor body and cooperating with the cam and blades to transmit shuttling movement, radially of the body, to said blades by virtue of relative rotation of the body and cam.

22. In an impeller mechanism for fluid flow devices, a hollow, cylindrical rotor body having a pair of diametrically opposite slots extending longitudinally thereof, a cam within the hollow of the body, a blade-unit including a pair of blades mounted, one each in said slots for movement radially of the body, and a yoke connecting said blades, whose inner edges extend within the body hollow; a pair of diametrically opposite rock arms pivoted to the rotor body, and means near the free ends of the rock arms cooperating with the cam and blade-unit to transmit shuttling movement to said blade unit, radially of the body, by virtue of relative rotation of the body and cam, said means being located in a plane substantially coincident with the plane in which lies the center of gravity of the blade-unit.

23. In a fluid flow mechanism, a casing embodying a barrel and end walls closing the bore of the barrel, said casing having inlet and outlet ports opening to a flow channel defined within the casing, a vertically shiftable shaft non-rotatably and centrally mounted in the casing, a rotor supported on and mounted for rotation about said shaft, a gear carried centrally on the upper end of the rotor, a second gear meshing with the first mentioned gear and positioned between the rotor and one of said end walls, a shaft for said second gear extending through and packed off from said end wall, and means for vertically shifting said vertical shaft.

24. In a fluid flow mechanism, a casing having inlet and outlet ports opening to a flow channel defined within the casing, a slotted vertically arranged, hollow rotor body mounted for rotation within the casing, a cam within the body-hollow, rock arms pivotally mounted on the rotor body and having their free ends in engagement with the cam, vertical blades extending through the slots in the rotor body and into the body hollow, means supporting said blades from said rock arms to maintain the lower edges of the blades spaced above underlying portions of the casing, and members on said rock arms engaging the inner side edges of the blades.

25. In a fluid flow mechanism, a casing having inlet and outlet ports opening to a flow channel defined within the casing, a slotted vertically arranged, hollow rotor body mounted for rotation within the casing, a cam within the body-hollow, rock arms pivotally mounted on the rotor body and having their free ends in engagement with the cam, vertical blades extending through the slots in the rotor body and into the body hollow, rollers carried by said arms and supporting the blades in a position to maintain their lower edges spaced above underlying portions of the casing, and members on said rock arms engaging the inner side edges of the blades.

26. In a fluid flow mechanism, a casing having inlet and outlet ports opening to a flow channel defined within the casing, a slotted, vertically arranged, hollow rotor body mounted for rotation within the casing, a cam within the body-hollow, a pair of diametrically opposite rock arms pivotally mounted on the rotor body, rollers on the free ends of the arms and in contact with opposite sides of the cam, a link connecting the rock arms, and a pair of blades, a yoke connecting the blades, said blades extending through diametrically opposite slots in the body with their inner edges lying within the body hollow and in engagement with the opposite ends of said link.

27. In a fluid flow mechanism, a casing having inlet and outlet ports opening to a flow channel defined within the casing, a slotted vertically arranged, hollow rotor body mounted for rotation within the casing, a cam within the body-hollow, a pair of diametrically opposite rock arms pivotally mounted on the rotor body, rollers on the free ends of the arms and in contact with opposite sides of the cam, a link connecting the rock arms, and a pair of blades, a yoke connecting the blades, said blades being supported by said rock arms, said blades extending through diametrically opposite slots in the body with their inner edges lying within the body hollow and in engagement with the ends of said link.

28. In a fluid flow mechanism, a casing having inlet and outlet ports and a flow channel extending between ports, a hollow rotor body mounted for rotation within said casing about a vertical axis, a blade unit carried by the rotor body and embodying a pair of blades extending, one each, through slots extending vertically of the rotor body, and a yoke connecting the blades; a cam within the rotor body, a pair of rock arms pivoted to the rotor body and cooperating with the blades and said cam to transmit radial shuttling movement to said unit when the body and cam are relatively rotated, said unit being moved by the cam simultaneously to project one blade beyond the body into the flow channel and retract the other blade from the flow channel and into the body, and a pair of springs extending, one each, from said rock arms to said yoke, the spring applied to a given rock arm being effective, when the associated blade is projected, to urge said unit in the same direction beyond the capacity of the cam so to project it.

29. In a fluid flow mechanism, a casing having inlet and outlet ports and a flow channel extending between ports, a hollow rotor body mounted for rotation within said casing about a vertical axis, a blade unit carried by the rotor body and embodying a pair of blades extending, one each, through slots extending vertically of the rotor body, and a yoke connecting the blades, a cam within the rotor body and operatively associated with the blades to transmit radial shuttling movement to said unit when the body and cam are relatively rotated, said unit being moved by the cam simultaneously to project one blade beyond the body into the flow channel and retract the other blade from the flow channel and into the body, and spring means associated with the unit and effective to urge a given blade in the direction of its projection when the unit has been moved by the cam in a manner so to project the given blade.

30. In a fluid flow mechanism, a casing having inlet and outlet ports and a flow channel extending between ports, a hollow rotor body mounted for rotation within said casing about a vertical axis, a blade unit carried by the rotor body and embodying a pair of blades extending, one each, through slots extending vertically of the rotor body, and a yoke connecting the blades, a cam within the rotor body and operatively associated with the blades to transmit radial shuttling movement to said unit when the body and cam are relatively rotated, said unit being moved by the cam simultaneously to project one blade beyond the body into the flow channel and retract the other blade from the flow channel and into the body, and spring means associated with the unit and effective to urge a given blade in the direction of its projection beyond the capacity of the cam so to project it, said spring means being effective when the unit has been moved by the cam in a manner so to project the given blade.

31. In a fluid flow mechanism, a casing having inlet and outlet ports and a flow channel extending between ports, a hollow rotor body mounted for rotation within said casing about a vertical axis, a blade unit carried by the rotor body and embodying a pair of blades extending, one each, through slots extending vertically of the rotor body, and a yoke connecting the blades; a cam within the rotor body, a pair of rock arms pivoted to the body at opposite sides of the unit, each rock arm extending from its pivotal connection to a point beyond the opposite side of the yoke, means on the rock arms cooperating with the cam and unit whereby shuttling thrust is transmitted to the unit upon relative rotation of the body and cam, said means being located intermediate the ends of the rock arms, and a pair of extension springs applied, one each, to the free ends of the rock arms and extending thence to points of attachment with the unit.

32. In a fluid flow mechanism, a casing having inlet and outlet ports and a flow channel extending between ports, a rotor mounted for rotation within the casing, said rotor embodying a hollow cylindrical body, a pair of rock arms pivotally mounted within the rotor at diametrically opposite sides thereof, a pair of diametrically opposite and oppositely curving, arcuate blades, one on each of the rock arms, each blade being concentric with the pivotal axis of the associated rock arm, a link connecting said rock arms, said blades extending through complementary slots in the body, and a cam in said hollow body and coacting with said rock arms in a manner simultaneously to swing said rock arms about their axes and thereby simultaneously project one blade into said flow channel and retract the other blade from said channel.

33. In a fluid flow mechanism, a casing, a shaft positioned within said casing, ball bearings on said shaft, a rotor body revolubly supported on said bearings, means normally and yieldably supporting said shaft in a position to hold the rotor body out of contact with the casing walls, said means being adapted to yield sufficiently to permit said rotor body to engage underlying casing walls under abnormal conditions of stress.

34. In a fluid flow mechanism, a casing having inlet and outlet ports, a rotor body mounted for rotation within the casing, said casing and rotor body defining a flow channel extending between the ports, rollers supported by said rotor body, and rotor blades carried by said body and supported vertically by said rollers for shuttle movement transversely of the flow channel during rotor rotation, said blades overlying a portion of the casing which portion defines the bottom of said flow channel, and said rollers supporting said blades in vertically spaced relation with said portion.

35. In a fluid flow mechanism, a casing having inlet and outlet ports, a rotor body mounted for rotation within said casing and about a vertical axis, said casing and rotor body defining a flow channel extending between the ports, anti-friction members supported by said rotor body, and rotor blades carried by said body and supported vertically by said members for shuttle movement transversely of the flow channel and radially with respect to the rotor body during rotor rotation, said blades overlying a portion of the casing which portion defines the bottom of said flow channel, and said members supporting said blades in vertically spaced relation with said portion.

36. In a fluid flow mechanism, a casing having inlet and outlet ports, a rotor body mounted for rotation within said casing and about a vertical axis, said casing and rotor body defining a flow channel extending between the ports, replaceable anti-friction members supported by said rotor body, and rotor blades carried by said body and supported vertically by said members for shuttle movement transversely of the flow channel and radially with respect to the rotor body during rotor rotation, said blades overlying a portion of the casing which portion defines the bottom of said flow channel, and said members supporting said blades in vertically spaced relation with said portion.

37. In a fluid flow mechanism, a casing having inlet and outlet ports, a vertically arranged rotor body within the casing, a spring vertically resiliently supporting the rotor body in predetermined position with respect to the casing, said casing and rotor body defining a flow channel extending between ports, members supported by said rotor body, and rotor blades carried by said body and supported vertically by said members for shuttle movement transversely of the flow channel and radially with respect to the rotor body during rotor rotation, said blades overlying a portion of the casing which portion defines the bottom of said flow channel, and said members supporting said blades vertically spaced a predetermined extent above said portion when the rotor body is in said predetermined position, said spring, under predetermined conditions of vertical shock, yielding to allow the rotor to descend and thereby cause the blades to approach said portion, the spring thereafter acting to restore the rotor and blades to their original positions.

38. In a fluid flow mechanism, a casing having inlet and outlet ports and a flow channel between ports, a hollow rotor body mounted for rotation within the casing, said casing and rotor defining a flow channel between ports, a rotor blade mounted for shuttle movement radially with respect to the rotor body and transversely of the flow channel and extending through a slot in the body into the rotor hollow, a rock arm pivotally connected to the rotor body independently of the blade mounting and within the rotor hollow, the arm and blade being capable of relative movement, and a cam supported within the rotor hollow, said rock arm cooperating with the cam and blade to impart shuttling movement to the blade upon relative rotation of the rotor body and cam.

39. In a fluid flow mechanism, a casing having inlet and outlet ports and a flow channel between ports, a hollow rotor body mounted for rotation within the casing, said casing and rotor defining a flow channel between ports, a pair of connected rotor blades mounted for shuttle movement transversely of the flow channel and extending, one each, through diametrically opposite slots in the body into the rotor hollow, a rock arm for each blade and pivotally connected to the rotor body within its hollow, and a cam supported within the rotor hollow, said rock arms cooperating with their associated blades and with the cam to impart shuttling movement to the blades upon relative rotation of the rotor body and cam.

40. In a fluid flow mechanism, a casing having inlet and outlet ports and a flow channel extending between ports, a rotor body mounted for rotation within the casing, said casing and rotor body defining a flow channel between ports, blades slidably mounted in said rotor body and adapted to have shuttle movement radially with respect to the body and transversely of the flow channel when the rotor is revolved, rock arms carried by the rotor and mounted independently of the blade mountings, said arms being movable independently of the blades, and a cam, said rock arms cooperating with the cam and blades to impart said shuttle movement to said blades during rotor rotation.

41. In a fluid flow mechanism, a casing having inlet and outlet ports and a flow channel extending between ports, a rotor body mounted for rotation within the casing, said casing and rotor body defining a flow channel between ports, there being radial slots in said rotor body, a plurality of blades in said slots and arranged in oppositely disposed pairs, yokes connecting the oppositely disposed blades of each pair, said yokes being in superposed relation, rock arms hingedly mounted on the rotor, and a stationary cam in cooperative alinement with all said rock arms, said rock arms cooperating with the cam and blades to impart shuttling movement to said blades upon relative rotation of the rotor body and cam, each connected pair of blades being simultaneously controlled by a pair of rock arms.

42. In a rotor for fluid flow mechanisms, a body member including a vertically arranged annulus, a cap detachably secured to the lower end of the annulus, said annulus having a slot extending vertically thereof and the cap having a radial slot registering with the vertical slot, an anti-friction member supported by the cap and positioned in the cap-slot, and a blade riding on said anti-friction member for shuttle movement radially of the annulus through said annulus slot.

43. In a rotor for fluid flow mechanisms, a body member including a vertically arranged annulus, a cap detachably secured to the lower end of the annulus, said annulus having a slot extending vertically thereof and the cap having a radial slot registering with the vertical slot, an anti-friction member positioned in the cap-slot, spring-means vertically supporting the anti-friction member from the cap, and a blade riding on said anti-friction member for shuttle movement radially of the annulus through said annulus slot.

44. In an impeller mechanism for fluid flow devices, a hollow, cylindrical rotor body having a slot extending longitudinally thereof, a cam within the hollow of the body, a blade mounted for movement radially of the body through said slot and having its inner edge within the body-hollow, and a rock arm independent of said blade, said arm being positioned within the body hollow and pivoted to said body for movement independently of the blade about an axis parallel to the body axis, said rock arm cooperating with the cam and blade to transmit thrust radially of the body from the cam to the blade upon relative rotation of the body and cam.

45. In a fluid flow mechanism, a casing having inlet and outlet ports opening to a flow channel defined within the casing, a slotted, vertically arranged, hollow rotor body mounted for rotation within the casing, a cam within the body-hollow, a pair of diametrically opposite rock arms pivotally mounted on the rotor body and adapted to cooperate with opposite sides of the cam whereby rotation of the body about the cam moves the rock arms pivotally, a link connecting the rock arms for simultaneous pivotal movement, a pair of blades, and a yoke connecting the blades, said blades extending through diametrically opposite slots in the body with their inner edges lying within the body hollow and being movable radially of the body to and fro across the flow channel by virtue of pivotal movement of the rock arms.

46. In a rotor for fluid mechanisms, a cylindrical, vertically arranged body member having a plurality of slots extending longitudinally thereof and opening to the lower end thereof, a plurality of blades arranged, one each, in said slots for shuttle movement radially of the body member, the blades extending to the lower end of the body member, a detachable cover applied to said lower end of the body member but of smaller outside diameter than is the body member whereby the outer annular portion of the lower end face of the body member is exposed, and anti-friction means on said cap adapted to maintain the lower ends of the blades substantially in horizontal alinement with said exposed face.

47. In a fluid flow mechanism, a casing embodying a vertical barrel and end walls closing the bore of the barrel, said casing having inlet and outlet ports opening to a flow channel defined within the casing, a shaft extending within and axially of the casing, a rotor mounted on the shaft for rotation within the barrel and between the end walls, said rotor having blades adapted to have shuttle movement transversely of the flow channel during rotor rotation, said rotor embodying an annulus, a transverse wall across the annulus bore near one end of the rotor, a thrust-bearing between the shaft and said transverse wall and holding the rotor in predetermined relation with said end walls, a radial bearing between said shaft and said transverse wall to hold said one end of the rotor in predetermined spaced relation with respect to the casing barrel, a second transverse wall across the annulus bore near the other end of the rotor, and a radial bearing between said shaft and said second transverse wall to hold said other end of the rotor in predetermined relation with respect to the casing barrel.

REUBEN STANLEY SMITH.